(12) United States Patent
Naganawa et al.

(10) Patent No.: US 10,971,713 B2
(45) Date of Patent: Apr. 6, 2021

(54) ELECTRIC STORAGE DEVICE AND SPACER

(75) Inventors: Nobuyuki Naganawa, Kyoto (JP);
Tomonori Kishimoto, Kyoto (JP);
Masamitsu Tononishi, Kyoto (JP);
Shinsuke Yoshitake, Kyoto (JP);
Yasunori Okuno, Kyoto (JP)

(73) Assignees: GS YUASA INTERNATIONAL LTD., Kyoto (JP); HONDA MOTOR CO., LTD., Tokyo (JP)

( * ) Notice: Subject to any disclaimer, the term of this patent is extended or adjusted under 35 U.S.C. 154(b) by 1076 days.

(21) Appl. No.: 13/536,780

(22) Filed: Jun. 28, 2012

(65) Prior Publication Data
US 2013/0004824 A1 Jan. 3, 2013

(30) Foreign Application Priority Data

| Jul. 1, 2011 | (JP) | JP2011-147456 |
| Dec. 26, 2011 | (JP) | JP2011-283807 |
| Dec. 26, 2011 | (JP) | JP2011-283811 |
| Dec. 26, 2011 | (JP) | JP2011-283812 |
| Dec. 26, 2011 | (JP) | JP2011-283815 |

(51) Int. Cl.
*H01M 2/18* (2006.01)
*H01M 2/26* (2006.01)
(Continued)

(52) U.S. Cl.
CPC ............ *H01M 2/18* (2013.01); *H01M 2/263* (2013.01); *H01M 2/347* (2013.01);
(Continued)

(58) Field of Classification Search
CPC ............................ H01M 2/10; H01M 2/347
See application file for complete search history.

(56) References Cited

U.S. PATENT DOCUMENTS

| 5,397,659 A | 3/1995 | Imhof et al. |
| 2006/0024568 A1 | 2/2006 | Lee |

(Continued)

FOREIGN PATENT DOCUMENTS

| EP | 2 063 474 A | 5/2009 |
| EP | 2 309 569 A | 4/2011 |

(Continued)

OTHER PUBLICATIONS

Extended European Search Report dated Jun. 26, 2015.

*Primary Examiner* — Barbara L Gilliam
(74) *Attorney, Agent, or Firm* — McGinn I.P. Law Group, PLLC.

(57) ABSTRACT

An electric storage device includes: an electrode assembly including a positive electrode plate and a negative electrode plate that are insulated from each other; a pair of current collectors each of which includes a connecting portion and is connected to a corresponding one of the positive electrode plate and the negative electrode plate at the connecting portion; a case that houses the electrode assembly and the pair of current collectors, the electrode assembly being supported by the pair of current collectors in the case; and a distance retaining member that retains a distance between portions more distal than the respective connecting portions of the pair of current collectors.

9 Claims, 52 Drawing Sheets

(51) Int. Cl.
*H01M 2/34* (2006.01)
*H01M 10/0525* (2010.01)
*H01M 10/04* (2006.01)

(52) U.S. Cl.
CPC .... *H01M 10/0431* (2013.01); *H01M 10/0525* (2013.01); *H01M 2220/20* (2013.01); *Y02E 60/10* (2013.01)

(56) References Cited

U.S. PATENT DOCUMENTS

| | | |
|---|---|---|
| 2006/0024578 A1 | 2/2006 | Lee |
| 2011/0039152 A1 | 2/2011 | Kim et al. |
| 2011/0081573 A1 | 4/2011 | Kim et al. |
| 2011/0104559 A1* | 5/2011 | Kim .................... H01M 2/021 429/163 |
| 2011/0117402 A1 | 5/2011 | Kim et al. |
| 2011/0135999 A1 | 6/2011 | Kwak et al. |
| 2011/0136000 A1* | 6/2011 | Moon ................ H01M 2/0285 429/163 |
| 2011/0136002 A1 | 6/2011 | Cho et al. |
| 2011/0136003 A1 | 6/2011 | Kim et al. |
| 2011/0136004 A1 | 6/2011 | Kwak et al. |
| 2011/0195286 A1 | 8/2011 | Aota et al. |
| 2011/0250491 A1* | 10/2011 | Kim .................... H01M 2/0207 429/176 |

FOREIGN PATENT DOCUMENTS

| | | |
|---|---|---|
| EP | 2 317 588 A | 5/2011 |
| EP | 2 333 867 A | 6/2011 |
| JP | H 01-137569 A | 5/1989 |
| JP | 2001-068166 A | 3/2001 |
| JP | 2001-160390 A | 6/2001 |
| JP | 2002-231297 A | 8/2002 |
| JP | 2005-032477 A | 2/2005 |
| JP | 2006-040899 A | 2/2006 |
| JP | 2006-040901 A | 2/2006 |
| JP | 2009-037818 A | 2/2009 |
| JP | 2010-146872 A | 7/2010 |
| JP | 2010-231945 A | 10/2010 |
| JP | 2011-014276 A | 1/2011 |
| JP | 2011-040381 A | 2/2011 |
| JP | 2011-082162 A | 4/2011 |
| JP | 2011-108644 A | 6/2011 |
| JP | 2011-119264 A | 6/2011 |
| JP | 2011-119265 A | 6/2011 |
| JP | 2011-165437 A | 8/2011 |

* cited by examiner

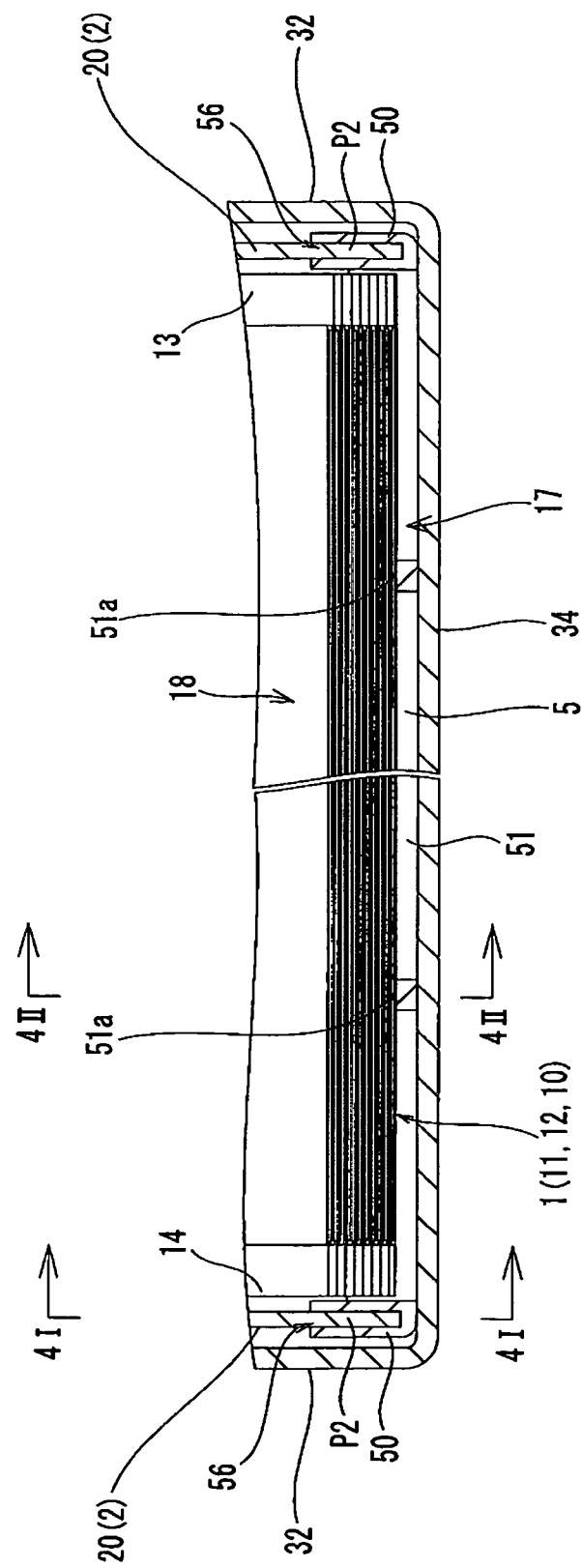

F I G. 7
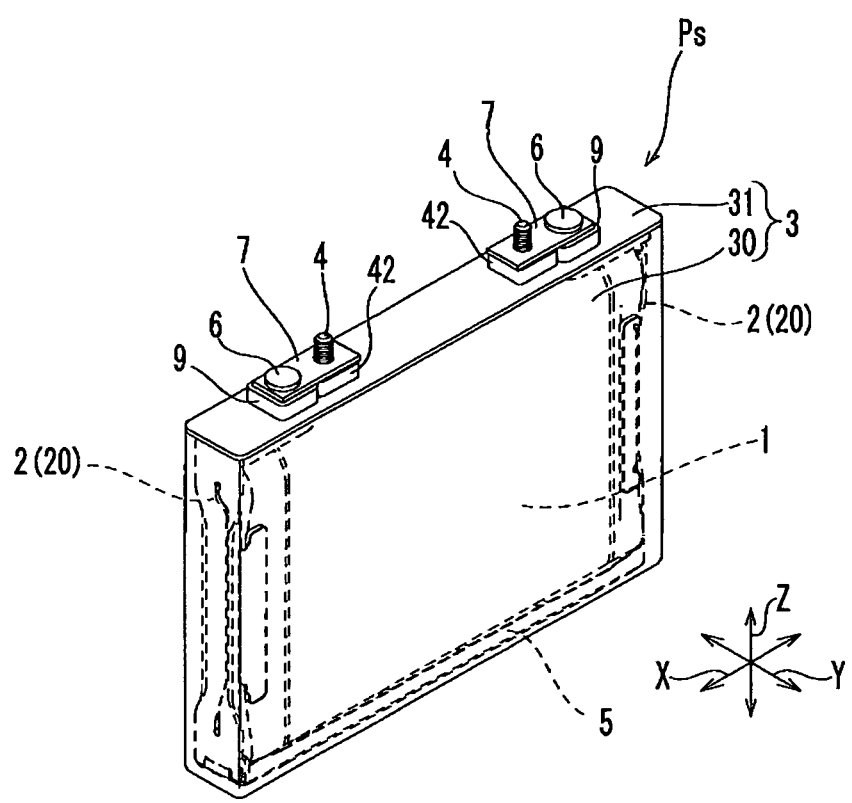

FIG. 27
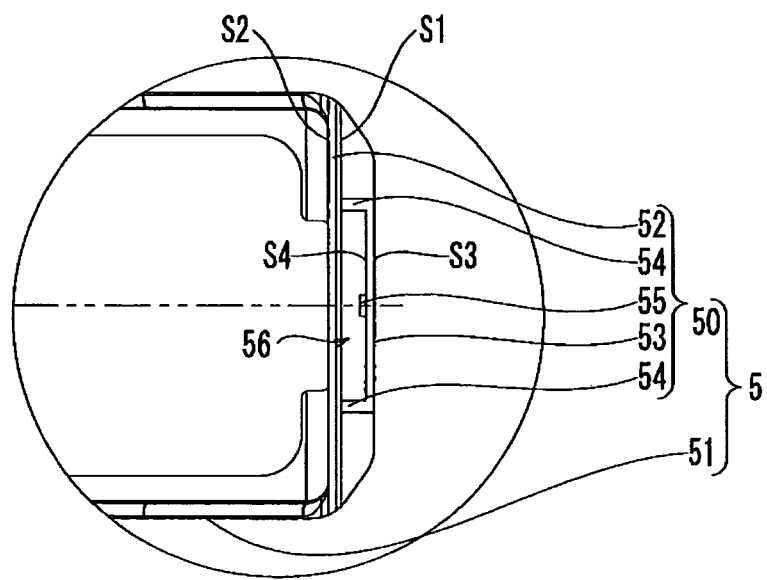
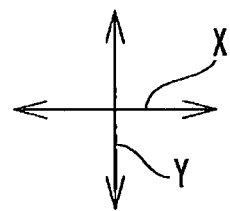

ELECTRIC STORAGE DEVICE AND SPACER

CROSS-REFERENCE TO RELATED APPLICATIONS

This application claims priority to Japanese Patent Application Nos. 2011-147456, 2011-283807, 2011-283811, 2011-283812 and 2011-283815, the disclosures of which are incorporated herein by reference in their entirety.

FIELD OF THE INVENTION

The present invention relates to an electric storage device capable of being recharged, and a spacer used in the electric storage device. In particular, the present invention relates to an electric storage device having a configuration in which a current collector fixed to a case supports an electrode assembly in the case, and a spacer used in the electric storage device.

BACKGROUND ART

In recent years, electric storage devices capable of being recharged have been adopted as power sources of various devices. The electric storage device includes: an electrode assembly; a pair of current collectors electrically connected to the electrode assembly; a case housing the electrode assembly and the pair of current collectors; and a pair of external terminals disposed outside the case.

The electrode assembly includes: an electrically insulating separator; and a positive electrode plate and a negative electrode plate that are stacked together sandwiching the separator. The positive and negative electrode plates are disposed while being positionally displaced from each other in a first direction. Accordingly, a positive-electrode lead portion in which only the positive electrode plates are stacked is formed on one end portion of the electrode assembly in the first direction. Meanwhile, a negative-electrode lead portion in which only the negative electrode plates are stacked is formed on the other end portion of the electrode assembly in the first direction.

The current collector includes: a first connecting portion connected to the positive-electrode lead portion or the negative-electrode lead portion of the electrode assembly; and a second connecting portion that extends from the first connecting portion and is connected to an external terminal while being fixed to the case. This allows the positive electrode plate of the electrode assembly and the external terminal to conduct to each other via the current collector, and allows the negative electrode plate of the electrode assembly and the external terminal to conduct to each other via the current collector (Patent Document 1: Japanese Patent Application Laid-open No. 2011-14276).

There are cases of mounting the electric storage devices as power sources of apparatuses that cause vibrations when being driven (e.g., various apparatuses, such as hybrid electric vehicles (HEV), electric vehicles (EV), electric motorcycles, aircraft, and vessels). Mounting of the electric storage device having the above configuration on such an apparatus causes a possibility that vibrations of the apparatus break the current collector or the electrode assembly.

More specifically, the electrode assembly is held suspended from the pair of current collectors fixed to the case. Accordingly, the electrode assembly sways in the case together with the current collectors due to the vibrations of apparatus. Along therewith, a bending stress (bending action) is repeatedly caused at the second connecting portion of each current collector or in proximity to a boundary between the second connecting portion and the first connecting portion. This causes a possibility of fatigue breakdown (rupture) of the current collectors.

As described above, when the electrode assembly sways together with the current collectors, the disposition between the electrode assembly and the first connecting portion of each current collector relatively vary. This twists the connecting portion between the electrode assembly and the first connecting portion of each current collector. Accordingly, there is a possibility that the positive electrode plate or the negative electrode plate is broken at this connecting portion.

SUMMARY OF THE INVENTION

In view of such actual situations, it is an object of the present invention to provide an electric storage device capable of preventing breakage of a current collector and the electrode assembly connected to the current collector due to vibrations, and a spacer used in the electric storage device.

An electric storage device according to the present invention includes:

an electrode assembly including a positive electrode plate and a negative electrode plate that are insulated from each other;

a pair of current collectors each of which includes a connecting portion and is connected to a corresponding one of the positive electrode plate and the negative electrode plate at the connecting portion;

a case that houses the electrode assembly and the pair of current collectors, the electrode assembly being supported by the pair of current collectors in the case; and a distance retaining member that retains a distance between portions more distal than the respective connecting portions of the pair of current collectors.

A spacer according to the present invention for connecting a pair of current collectors each of which is connected to a corresponding one of a positive electrode plate and a negative electrode plate, includes:

a pair of couplers coupled to the respective current collectors; and a bridge portion connecting the pair of couplers, wherein the bridge portion is flexible so that a total length of the bridge portion extends by bending.

Another spacer according to the present invention for connecting a pair of current collectors each of which is connected to a corresponding one of a positive electrode plate and a negative electrode plate, includes:

a pair of couplers coupled to the respective current collectors; and a bridge portion connecting the pair of couplers, wherein at least one of the pair of couplers includes a deformable portion that expands by cooperation with the current collector, and a total length of the spacer extends by expansion of the deformable portion.

BRIEF DESCRIPTION OF THE DRAWINGS

FIG. 4 is a partially enlarged sectional view of a bottom portion of the battery cell;

FIG. 7 is an overall perspective view of the battery cell according to second to fifth embodiments;

FIG. 27 is an enlarged view of a G part in FIG. 24;

DETAILED DESCRIPTION OF THE PREFERRED EMBODIMENTS

Figure 1:
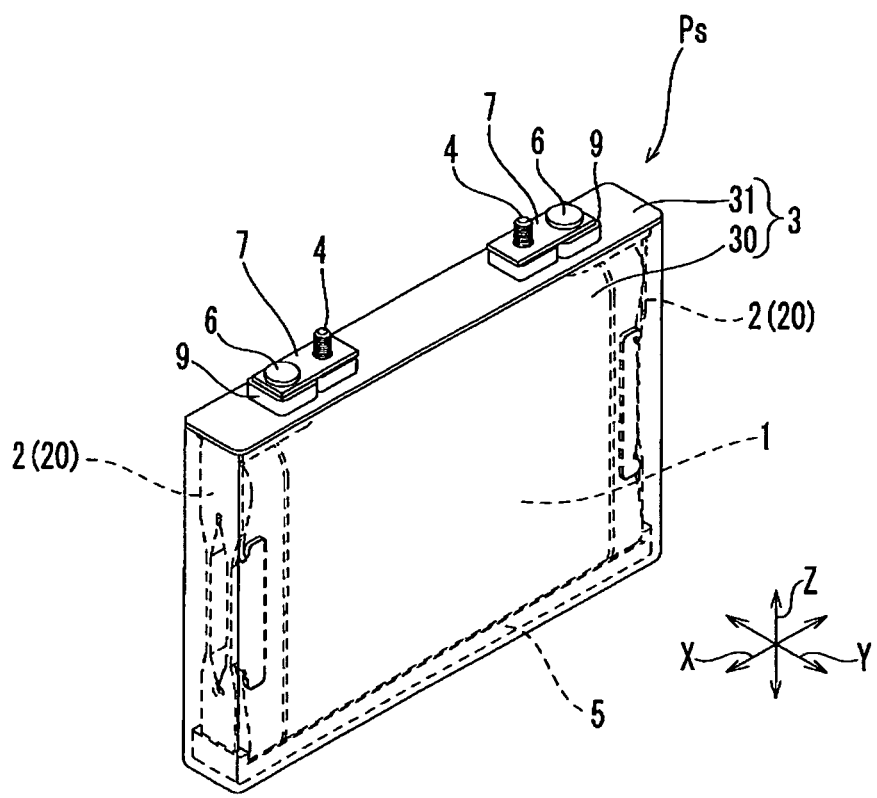
FIG. 1 is an overall perspective view of a battery cell according to a first embodiment.

A battery cell as an embodiment of an electric storage device according to the present invention will now be described. First, an overview of the battery cell according to this embodiment will be described.

An electric storage device according to this embodiment, includes:

an electrode assembly including a positive electrode plate and a negative electrode plate that are insulated from each other;

a pair of current collectors each of which includes a connecting portion and is connected to a corresponding one of the positive electrode plate and the negative electrode plate at the connecting portion;

a case that houses the electrode assembly and the pair of current collectors, the electrode assembly being supported by the pair of current collectors in the case; and a distance retaining member that retains a distance between portions more distal than the respective connecting portions of the pair of current collectors The above configuration allows the distance retaining member to maintain the distance between the portions on the distal end sides of the pair of current collectors to be constant or substantially constant. More specifically, the distance retaining member prevents or reduces inward displacement of the portions on the distal end sides of the current collectors (in the direction toward the corresponding current collectors, i.e., the direction in which the electrode assembly is compressed). Accordingly, the distance retaining member maintains the relative arrangement of the current collectors and the electrode assembly. With this configuration, even when the electric storage device is installed in a vibrating environment and the current collectors and the electrode assembly vibrate (sway), this arrangement can prevent breakage of the current collectors and the electrode assembly connected to the current collectors due to vibrations.

In one configuration of this embodiment, the electric storage device may have a configuration in which:

the distance retaining member is a spacer that connects the pair of current collectors in the case.

The above configuration allows the spacer to maintain the distance between the portions on the distal end sides of the pair of current collectors to be constant or substantially constant. More specifically, the spacer prevents or reduces inward displacement of the portions on the distal end sides of the current collectors (in the direction toward the corresponding current collectors, i.e., the direction in which the electrode assembly is compressed). Accordingly, the spacer maintains the relative arrangement of the current collectors and the electrode assembly. With this configuration, even when the electric storage device is installed in a vibrating environment and the current collector and the electrode assembly vibrate (sway), this arrangement can prevent breakage of the current collectors and the electrode assembly connected to the current collectors due to vibrations.

In the above configuration, the electric storage device may have a configuration in which:

the spacer is disposed in contact directly or indirectly with an inner surface of the case.

The above configuration allows the spacer connecting the pair of current collectors to be in contact directly or indirectly with the inner surface of the case. This can prevent breakage of the current collectors and the electrode assembly connected to the current collectors due to vibrations.

In the above configuration, the electric storage device may have a configuration in which:

the spacer fits tightly against the inner surface of the case, and is fixed in the case.

The above configuration allows the spacer connecting the pair of current collectors to be effectively fixed in the case. This can more effectively prevent breakage of the current collectors and the electrode assembly connected to the current collectors due to vibrations.

In another configuration of this embodiment, the electric storage device may have a configuration in which:

the spacer is flexible, extends to a total length of an extent capable of fitting tightly against the inner surface of the case by bending, and is fixed in the case.

According to the above configuration, the total length extends by the bending of the spacer connecting the pair of current collectors. This can increase the pressing force of the spacer against the inner surface of the case when the spacer is bent, in comparison with the spacer in ordinary states.

In still another configuration of this embodiment, the electric storage device may have a configuration in which:

the spacer has opposite end portions and a central portion therebetween, the central portion being convex with reference to the opposite end portions; and the spacer is bent with the central portion being supported by the inner surface of the case and with the opposite end portions being applied with a force directly or indirectly from the pair of current collectors.

The above configuration allows the spacer to be bent by receiving a force directly or indirectly from the current collectors coupled with the spacer. Thus, the current collector can be used as a member for bending the spacer. The central portion has a broad meaning that is intended to be any portion or site between the opposite end portions of the central portion. Accordingly, the most convex site or portion may be at a site or portion displaced from the center of the spacer to any of the opposite end portions of the spacer.

In the above configuration, the electric storage device may have a configuration in which:

the case includes an opening into which the electrode assembly, the pair of current collectors and the spacer are inserted, and a bottom portion opposite to the opening;

the spacer has opposite end portions and a central portion therebetween, the central portion being convex with reference to the opposite end portions; and the spacer is bent with the central portion being supported by the inner surface of the case and with the opposite end portions being applied with a force directly or indirectly from the pair of current collectors inserted into the opening.

The above configuration allows the spacer to be bent by receiving a force directly or indirectly from the current collectors inserted from the opening of the case. Accordingly, when the current collectors have not been inserted, the total length of the spacer does not extend. This allows the spacer to be smoothly inserted into the case.

In yet another configuration of this embodiment, the electric storage device may have a configuration in which:

the spacer has opposite end portions and a central portion therebetween, the central portion being concave with reference to the opposite end portions; and the spacer is bent with the opposite end portions being supported by the inner surface of the case and with the central portion being applied with a force directly or indirectly from the pair of current collectors.

The above configuration allows the spacer to be bent by receiving a force directly or indirectly from the current collectors coupled with the spacer. For instance, when the spacer receives the force from the current collectors via the electrode assembly, that is, when the electrode assembly applies the force to the spacer to thereby bend the spacer, the electrode assembly necessarily housed in the case can be used as a member for bending the spacer.

In the above configuration, the electric storage device may have a configuration in which:

the case includes an opening into which the electrode assembly, the pair of current collectors and the spacer are inserted, and a bottom portion opposite to the opening;

the spacer has opposite end portions and a central portion therebetween, the central portion being concave with reference to the opposite end portions; and the spacer is bent with the opposite end portions being supported by the inner surface of the case and with the central portion being applied with a force directly or indirectly from the pair of current collectors inserted into the opening.

The above configuration allows the spacer to be bent by receiving a force directly or indirectly from the current collectors inserted from the opening of the case. For instance, when the spacer receives the force from the current collectors via the electrode assembly, that is, when the electrode assembly applies the force to the spacer to thereby bend the spacer, the spacer is bent by receiving the force from the electrode assembly inserted from the opening of the case. Accordingly, when the electrode assembly has not been inserted yet, the total length of the spacer does not extend. This allows the spacer to be smoothly inserted into the case.

In another configuration of this embodiment, the electric storage device may have a configuration in which:

the spacer includes a pair of couplers coupled to respective distal portions of the current collectors, and a bridge portion connecting the pair of coupler; and the bridge portion is flexible.

According to the above configuration, the amplitude of vibrations at the distal portions of the current collectors is the largest. Accordingly, the nearer to the distal portion of the current collector the corresponding electrode plate is connected, the more likely the electrode plate is broken. However, in the spacer, the total length of the bridge portion connecting the pair of couplers coupled to the distal portions of the pair of current collectors extends by bending of the bridge portion. Accordingly, the distance between the distal portions of the pair of current collectors can be kept constant, and breakage of the current collectors and the electrode assembly connected to the current collectors due to vibrations can be effectively prevented.

In still another configuration of this embodiment, the electric storage device may have a configuration in which:

the spacer includes a pair of couplers, each of which is coupled to a corresponding one of the pair of current collectors;

at least one of the pair of couplers includes a deformable portion that expands by cooperation with the current collector; and the spacer fits tightly against the inner surface of the case by expansion of the deformable portion, and is fixed in the case.

The above configuration allows the spacer connecting the pair of current collectors to be fixed in the case by expansion of the deformable portion included in the spacer. Accordingly, breakage of the current collectors and the electrode assembly connected to the current collectors due to vibrations can be prevented.

In the above configuration, the electric storage device may have a configuration in which:

the spacer extends to a total length of an extent capable of fitting tightly against the inner surface of the case by expansion of the deformable portion, and is fixed in the case.

This configuration allows the total length to extend by expansion of the deformable portion of the spacer connecting the pair of current collectors. This can increase the pressing force of the spacer against the inner surface of the case when the deformation portion expands, in comparison with the spacer in ordinary states.

In yet another configuration of this embodiment, the electric storage device may have a configuration in which:

the deformable portion expands by interfering with the current collector.

According to the above configuration, the spacer interferes with the current collector connected by the spacer, thereby allowing the deformable portion to expand. Thus, the current collector can be used as a member for expanding the deformable portion.

In the above configuration, the electric storage device may have a configuration in which:

at least one the pair of couplers includes:

a main wall portion;

the deformable portion facing the main wall portion with a distance therebetween; and a side portion that connects the main wall portion and the deformable portion and allows a distal portion of the current collector to be inserted into between the main wall portion and the deformable portion; and the deformable portion expands by interfering with the distal portion of the current collector inserted into between the main wall portion and the deformable portion.

According to the above configuration, the deformable portion of the spacer can expand by interfering with the current collector at a separation portion between the deformable portion and the main wall portion for allowing the current collector to be inserted thereinto. Thus, the current collector can be more effectively used as a member for expanding the deformable portion.

In the above configuration, the electric storage device may further have a configuration in which:

at least one of the pair of couplers includes:

the main wall portion;

the deformable portion;

the side portion; and a protrusion provided for at least one of the main wall portion and the deformable portion so as to protrude toward the remaining one of the at least one of the main wall portion and the deformable portion; and the deformable portion expands by interfering between the distal portion of the current collector inserted into between the main wall portion and the deformable portion and the protrusion.

According to the above configuration, the simple configuration of providing the protrusion at any one of the main wall portion and the deformable portion allows the deformable portion to expand.

In another configuration of this embodiment, the electric storage device may have a configuration in which:

the case includes an opening into which the electrode assembly, the pair of current collectors and the spacer are inserted, and a bottom portion opposite to the opening;

the spacer is disposed at the bottom portion; and the deformable portion expands by inserting the distal portion of the current collector into the separation portion between the main wall portion and the deformable portion, the distal portion of the current collector having been inserted through the opening.

The above configuration allows the deformable portion of the spacer to expand by inserting, into the separation portion, the distal portion of the current collector having been inserted through the opening of the case. Accordingly, when the distal portion has not been inserted into the current collector, the total length of the spacer does not extend. This allows the spacer to be smoothly inserted into the case.

In still another configuration of this embodiment, the electric storage device may have a configuration in which:

each of the pair of couplers includes a deformable portion.

According to the above configuration, each of the pair of couplers connected with the respective pair of current collectors includes the deformable portion that expands. This allows the total length of the spacer connecting the pair of current collectors to more effectively extend. Accordingly, breakage of the current collectors and the electrode assembly connected to the current collectors due to vibrations can be more effectively prevented.

In yet another configuration of this embodiment, the electric storage device may have a configuration in which:

the spacer includes a pair of couplers and a bridge portion connecting the pair of couplers; and the pair of couplers are coupled to the respective distal portions of the current collectors.

According to the above configuration, the amplitude due to vibrations at the distal portions of the current collectors is the largest. Accordingly, the nearer to the distal portion of the current collector the corresponding electrode plate is connected, the more likely the electrode plate is broken. However, in the spacer, the total length of the bridge portion connecting the pair of couplers coupled to the distal portions of the pair of current collectors extends by bending of the bridge portion. Accordingly, the distance between the distal portions of the pair of current collectors can be kept constant, and breakage of the current collectors and the electrode assembly connected to the current collectors due to vibrations can be effectively prevented.

In another configuration of this embodiment, the electric storage device may have a configuration in which:

the spacer includes a first coupler coupled to a predetermined portion of one of the pair of current collectors, and a second coupler coupled to a predetermined portion of the other of the pair of current collectors; and at least one of the first and second couplers can be coupled only to the predetermined portion of a corresponding one of the pair of current collectors.

In the above configuration, the electric storage device may further have a configuration in which:

the predetermined portion of one current collector and the predetermined portion of the other current collector are different from each other in at least one of shape, size and arrangement.

In still another configuration of this embodiment, the electric storage device may have a configuration in which:

the first coupler and the second coupler are different from each other in at least one of shape, size and arrangement.

In yet another configuration of this embodiment, the electric storage device may have a configuration in which:

the spacer further includes a bridge portion that connects the first coupler and the second coupler.

In another configuration of this embodiment, the electric storage device may have a configuration in which:

the spacer includes a pair of couplers, each of which is coupled to a corresponding one of the pair of current collectors, and a bridge portion connecting the pair of couplers;

the bridge portion includes:

a pair of beam portions that connect the respective pair of couplers and are disposed with a distance from each other; and at least one beam connecting portion that connects the pair of beam portions to each other.

According to the above configuration, the beam portions are connected to each other by the beam connecting portion, which improves the rigidity of the bridge portion and prevents the bridge portion from being deformed. This allows the spacer to securely constrain the pair of current collectors, and can securely prevent the current collector and the electrode assembly from being broken.

In the above configuration, the electric storage device may further have a configuration in which:

the spacer includes a plurality of beam connecting portions.

The above configuration allows the rigidity of the bridge portion to be secured. Accordingly, the pair of current collectors can be securely constrained, which can more securely prevent the current collector and the electrode assembly from being broken.

In still another configuration of this embodiment, the electric storage device may have a configuration in which:

the distance retaining member is a fixation structure that is formed in the case and fixes a surface of a portion on a distal end side of each of the pair of current collectors, the surface facing the opposite current collector.

According to the above configuration, the distance between the portions on the distal end sides of the pair of current collectors can be kept constant or substantially constant by the fixation structure formed in the case. More specifically, inward displacement of the portions on the distal end sides of the current collectors (in the direction toward the corresponding current collectors, i.e., the direction in which the electrode assembly is compressed) is prevented or reduced by the fixation structure in the case. Accordingly, the relative arrangement of the current collector and the electrode assembly is maintained by the fixation structure in the case. With this configuration, even when the electric storage device is installed in a vibrating environment and the current collectors and the electrode assembly vibrate (sway), this arrangement can prevent breakage of the current collectors and the electrode assembly connected to the current collectors due to the vibrations.

In the above configuration, the electric storage device may further have a configuration in which:

the fixation structure further fixes a surface opposite to the surface of the portion on the distal end side of each of the pair of current collectors, the latter surface facing the opposite current collector.

In general, the electrode assembly is weaker in the compressing direction than in the tensile direction. Accordingly, the risk that the electrode assembly is broken is higher when a force in the compressing direction acts on the electrode assembly than in the event where a force in the tensile direction acts on the electrode assembly. Thus, a first object of the fixation structure in the case is to constrain inward displacement of the portions on the distal end sides of the current collectors (in the direction toward the corresponding current collectors, i.e., the direction in which the electrode assembly is compressed). However, it is preferred to take measures against the event where a force acts in the tensile direction on the electrode assembly. The fixation structure fixes the surface opposite to the surface of the portion on the distal end side of each of the pair of current collectors, the latter surface facing the opposite current collector. This can also prevent or reduce outward displacement of the portions on the distal end sides of the current collectors (in the direction away from the corresponding current collectors, i.e., the direction in which the electrode assembly is pulled).

In yet another configuration of this embodiment, the electric storage device may have a configuration in which:

the case includes an opening into which the electrode assembly and the pair of current collectors are inserted, and a bottom portion opposite to the opening, and the fixation structure is a step portion formed at the bottom portion.

According to the above configuration, the surfaces facing the respective opposite current collectors in the portions on the distal end sides of the pair of current collectors are fixed to the step portion formed at the bottom portion of the case.

This can prevent or reduce the displacement of the portion on the distal end side of the current collector.

According to another aspect of this embodiment, there is provided a spacer for connecting a pair of current collectors each of which is connected to a corresponding one of a positive electrode plate and a negative electrode plate, including:

a pair of couplers coupled to the respective current collectors; and a bridge portion connecting the pair of couplers, wherein the bridge portion is flexible so that a total length of the bridge portion extends by bending.

The above configuration allows the total length of the spacer for connecting the pair of current collectors to extend by bending the bridge portion connecting the pair of couplers connected to the current collectors. Accordingly, breakage of the current collectors and the electrode plates connected to the current collectors due to vibrations can be prevented.

In one configuration of this embodiment, the spacer may have a configuration in which:

the bridge portion has opposite end portions and a central portion therebetween, the central portion being convex with reference to the opposite end portions.

The above configuration allows the spacer to have a shape where the central portion of the bridge portion is convex. Accordingly, application of a force to the central portion bends the bridge portion, thereby allowing the total length of the spacer to extend.

In another configuration of this embodiment, the spacer may have a configuration in which:

the bridge portion has opposite end portions and a central portion therebetween, the central portion being concave with reference to the opposite end portions.

The above configuration allows the spacer to have a shape where the central portion of the bridge portion is concave. Accordingly, application of a force to the opposite end portions bends the bridge portion, thereby allowing the total length of the spacer to extend.

Another spacer according to this embodiment for connecting a pair of current collectors each of which is connected to a corresponding one of a positive electrode plate and a negative electrode plate, includes:

a pair of couplers coupled to the respective current collectors; and a bridge portion connecting the pair of couplers, wherein at least one of the pair of couplers includes a deformable portion that expands by cooperation with the current collector, and a total length of the spacer extends by expansion of the deformable portion.

According to the above configuration, in the spacer for connecting the pair of current collectors, at least one of the pair of couples includes the deformable portion that expands by cooperation with the current collector. This can prevent breakage of the current collectors and the electrode plates connected to the current collectors due to vibrations.

In still another configuration of this embodiment, the spacer may further have a configuration in which:

at least one of the pair of couplers includes:
a main wall portion;
the deformable portion facing the main wall portion with a distance therebetween; and
a side portion that connects the main wall portion and the deformable portion and allows a distal portion of the current collector to be inserted into between the main wall portion and the deformable portion, and the deformable portion expands by interfering with the distal portion of the current collector inserted into between the main wall portion and the deformable portion.

The above configuration allows the deformable portion of the spacer to expand by interfering with the current collector at the separation portion between the deformable portion and the main wall portion into which the current collector is inserted. Accordingly, the current collector can be effectively used as a member for expanding the deformable portion.

In the above configuration, the spacer may further have a configuration in which:

at least one of the pair of the couplers includes:
the main wall portion;
the deformable portion;
the side portion; and
a protrusion provided for at least one of the main wall portion and the deformable portion so as to protrude toward the remaining one of at east any one of the main wall portion and the deformable portion, and the deformable portion expands by interfering between the distal portion of the current collector inserted into between the main wall portion and the deformable portion and the protrusion.

According to the above configuration, the simple configuration where at least any one of the main wall portion and the deformable portion is provided with the protrusion allows the deformable portion to expand.

As described above, this embodiment can prevent breakage of the current collectors and the electrode assembly connected to the current collectors due to vibrations.

First to ninth embodiments of battery cells according to this embodiment will now be described with reference to the accompanying drawings. In each embodiment, a lithium-ion battery cell (hereinafter, simply referred to as a battery cell) will be described as an example of the battery cell.

First Embodiment

Figure 2:
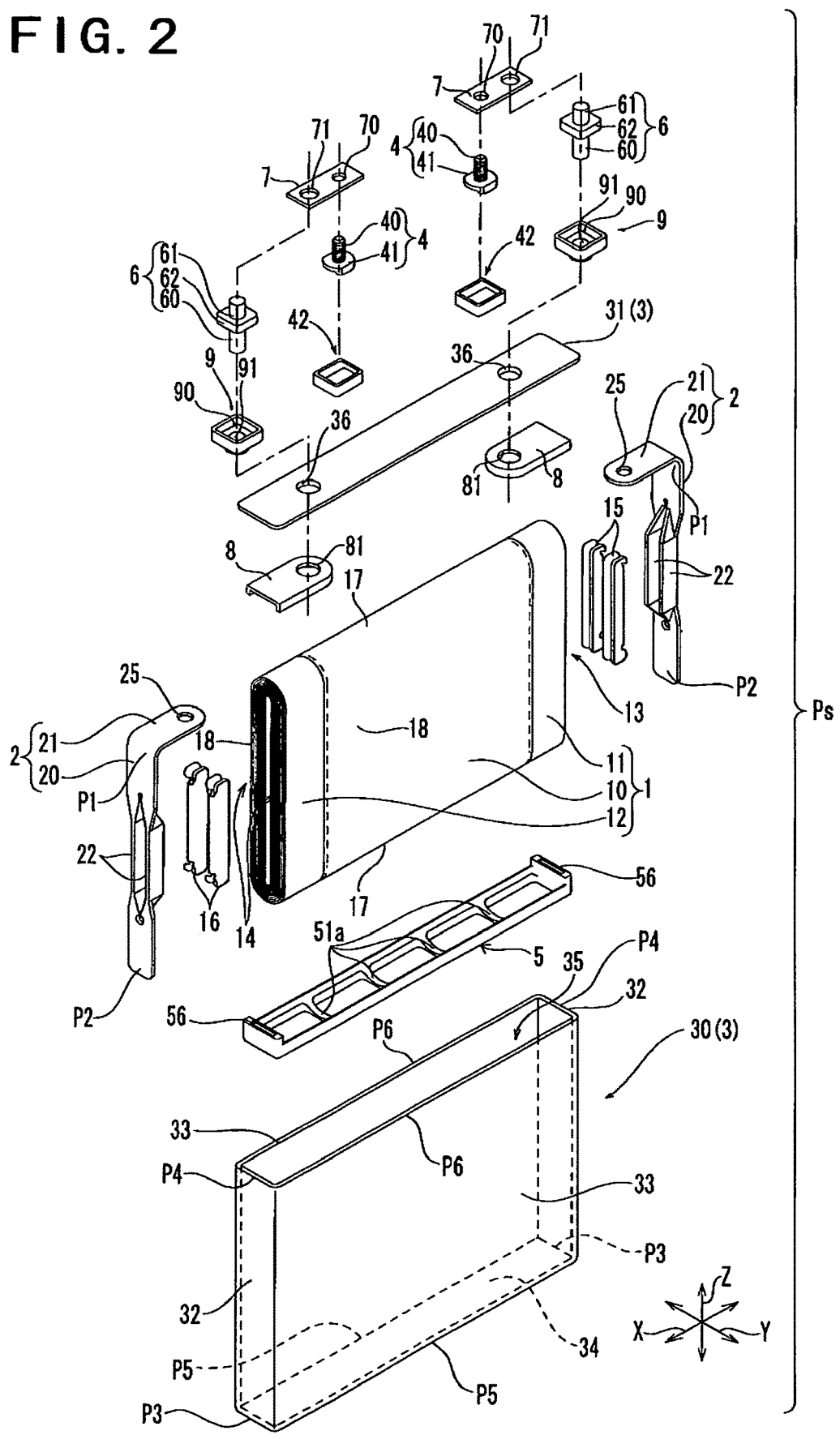
FIG. 2 is an exploded perspective view of the battery cell.
Figure 3:
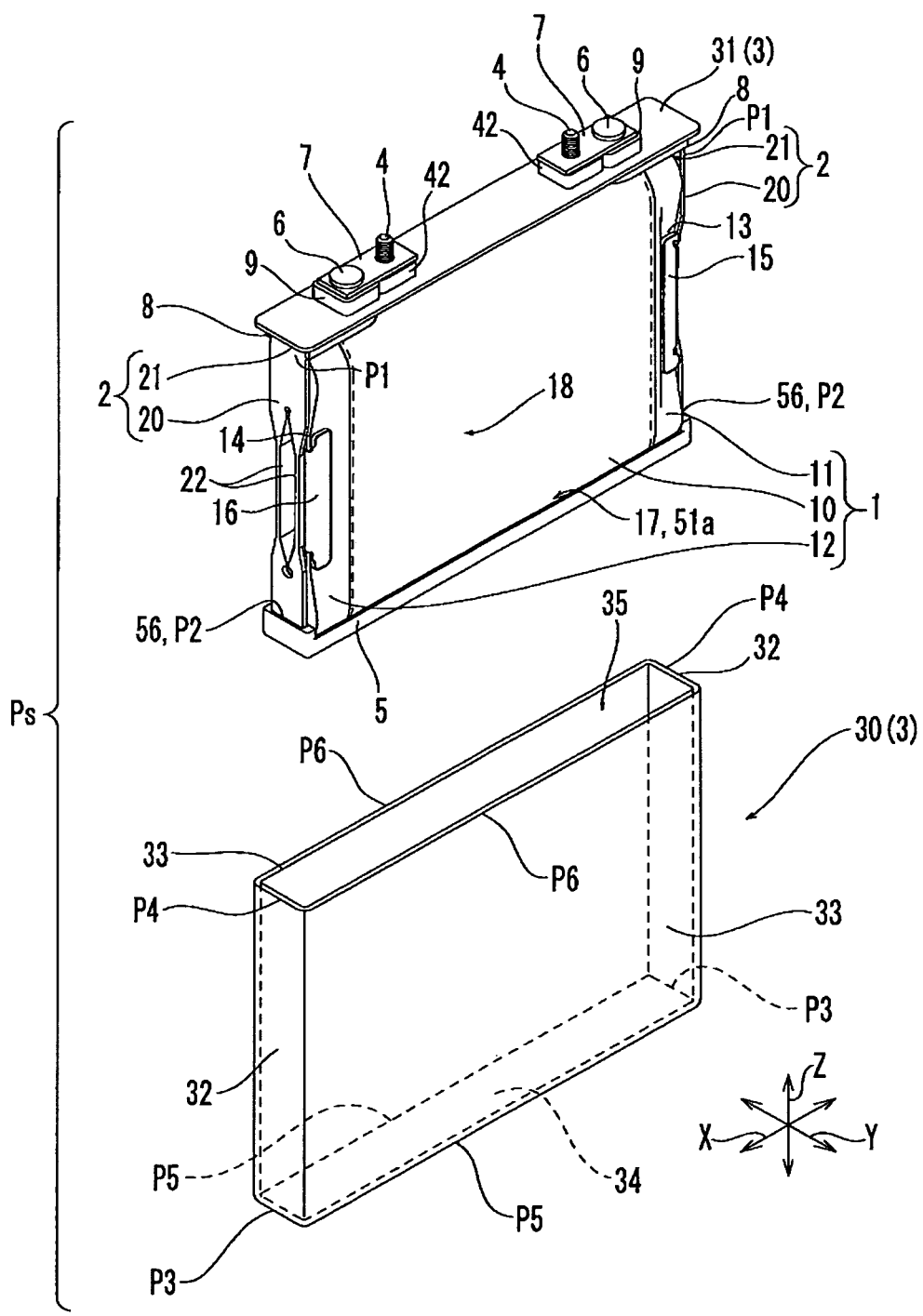
FIG. 3 is a partially exploded perspective view of the battery cell in which an electrode assembly, current collectors and a spacer are taken out of a case body.

As shown in FIGS. 1 to 3, a battery cell Ps according to this embodiment includes: an electrode assembly 1 including an electrically insulating separator 10, and a positive electrode plate 11 and a negative electrode plate 12 that sandwich the separator 10; a pair of current collectors 2 and 2 each electrically connected to the electrode plate having the corresponding polarity of the positive electrode plate 11 and the negative electrode plate 12 of the electrode assembly 1; a case 3 housing the electrode assembly 1 and the pair of current collectors 2 and 2; a pair of external terminals 4 and 4 disposed outside the case 3; and a spacer 5 connecting the pair of current collectors 2 and 2 to each other in the case 3. The battery cell Ps further includes: a pair of rivets 6 and 6 that are connection conductors each being connected to the current collector 2 having the corresponding polarity of the pair of current collectors 2 and 2; and a pair of connection strips 7 and 7 that are connection conductors each connecting the external terminal 4 having the corresponding polarity of the pair of external terminals 4 and 4 to the rivet 6 having the corresponding polarity of the pair of rivets 6 and 6. Along therewith, the battery cell Ps further includes: a pair of inner gaskets 8 and 8 each disposed along an inner surface of the case 3 so as to correspond to the arrangement of the corresponding rivet 6 of the pair of rivets 6 and 6; and a pair of external gaskets 9 and 9 each disposed along an external surface of the case 3 so as to correspond to the arrangement of the corresponding rivet 6 of the pair of rivets 6 and 6.

The positive electrode plate 11 and the negative electrode plate 12 of the electrode assembly 1 are disposed while being positionally displaced from each other in a first direction (X-axis direction in the Figures). Along therewith, a positive-electrode lead portion 13 where only the positive electrode plate 11 resides is formed on one end portion of the electrode assembly 1 in the first direction, and a negative-electrode lead portion 14 where only the negative electrode plate 12 resides is formed on the other end portion of the electrode assembly 1 in the first direction.

The positive electrode plate 11, the negative electrode plate 12 and the separator 10 are formed into a band-like shape. The positive electrode plate 11, the negative electrode plate 12 and the separator 10 overlap with each other while being matched in the longitudinal direction, and are wound in the longitudinal direction. More specifically, the positive electrode plate 11 and the negative electrode plate 12 overlap with each other while being relatively displaced in a direction orthogonal to the longitudinal direction (a direction corresponding to the first direction), and are wound in the longitudinal direction. The positive electrode plate 11, the negative electrode plate 12 and the separator 10 are wound into a flat shape. Accordingly, the shape of the electrode assembly 1 viewed in the first direction has a short axis in a second direction (Y-axis direction in the Figures) orthogonal to the first direction, and a long axis in a third direction (Z-axis direction in the Figures) orthogonal to the first and second directions. In conformity with the winding (curve) of the positive electrode plate 11, the negative electrode plate 12 and the separator 10, a pair of circular arc portions 17 and 17 are formed on the opposite ends of the electrode assembly 1 in the third direction. The positive-electrode lead portion 13 where piles of only the positive electrode plate 11 are formed along the third direction at one end portion of the electrode assembly 1 in a winding center direction (the direction corresponding to the first direction). The negative-electrode lead portion 14 where piles of only the negative electrode plate 12 are formed along the third direction at the other end portion of the electrode assembly 1 in the winding center direction. Along therewith, the battery cell Ps further includes: a positive electrode clip member 15 that bundles the piles of the positive-electrode lead portion 13; and a negative electrode clip member 16 that bundles the piles of the negative-electrode lead portion 14.

The electrode assembly 1 is formed into a flat shape. Accordingly, the electrode assembly 1 includes: a pair of straight portions 18 and 18 extending straightly to the respective opposite end portions with respect to the winding center viewed from the winding center direction; and the pair of circular arc portions 17 and 17 connecting the pair of straight portions 18 and 18 to each other. Along therewith, the straight portions 18 and 18 at one end portion of the electrode assembly 1 in the winding center direction serve as the positive-electrode lead portion 13. The straight portions 18 and 18 on the other end portion of the electrode assembly 1 in the winding center direction serve as the negative-electrode lead portion 14.

The length of the separator 10 in the longitudinal direction is longer than the lengths of the positive electrode plate 11 and the negative electrode plate 12 in the longitudinal direction. The length of the separator 10 in the direction orthogonal to the longitudinal direction (width in the direction corresponding to the first direction) is slightly longer than the length (width) of the direction orthogonal to the longitudinal direction of the overlap region of the overlapping positive electrode plate 11 and negative electrode plate 12.

Accordingly, the separator 10 is disposed over the entire overlap region of the overlapping positive electrode plate 11 and negative electrode plate 12. The separator 10 is wound more than the positive electrode plate 11 and the negative electrode plate 12. This disposes the separator 10 at the outermost position in the electrode assembly 1.

One of the current collectors (hereinafter, referred to as a positive electrode current collector) 2 is formed by bending a metal plate. The positive electrode current collector 2 includes: a first connecting portion (hereinafter, referred to as a positive electrode first connecting portion) 20 that is an electrode-assembly-accompanying portion and disposed along the third direction; and a second connecting portion (hereinafter, referred to as a positive electrode second connecting portion) 21 that is a fixation piece and extends from the positive electrode first connecting portion 20.

The positive electrode first connecting portion 20 is connected to one end portion of the electrode assembly 1 in the first direction. That is, the positive electrode first connecting portion 20 is connected to the positive-electrode lead portion 13. The positive electrode first connecting portion 20 includes: a first end portion P1 connected to the positive electrode second connecting portion 21; and a second end portion P2 opposite to the first end portion P1. The positive electrode first connecting portion 20 is set to have a length in the third direction allowing the second end portion P2 to be disposed in proximity to a later-mentioned bottom portion 34 of the case 3.

The positive electrode first connecting portion 20 further includes connection pieces (hereinafter, positive electrode connection pieces) 22, 22 between the first end portion P1 and the second end portion P2. The positive electrode connection pieces 22, 22 are formed so as to extend in the first direction. This allows the positive electrode connection pieces 22, 22 to be inserted into the winding center at the end portion of the electrode assembly 1 in the first direction. The positive electrode first connecting portion 20 is welded to the positive electrode clip member 15 at the positive electrode connection piece 22. Accordingly, the battery cell Ps is in the state where the positive electrode current collector 2 and the electrode assembly 1 (positive electrode plate 11) are electrically connected while being mechanically connected to each other.

The electrode assembly 1 is formed into a flat scroll. Accordingly, the piles of the lead portions 13 and 14 at the opposite end portions with respect to the winding center are clamped in a collected manner by the clip members 15 and 16, respectively. The positive electrode connection pieces 22 and 22 of the positive electrode current collector 2 are inserted into the winding center of the electrode assembly 1 along the positive-electrode lead portion 13 (straight portions 18 and 18), and mechanically and electrically connected to the positive electrode clip members 15 and 15 disposed outside of the respective positive electrode connection pieces 22 and 22.

The clip members 15 and 16, the connection pieces 22, 22 and the lead portions 13 and 14 are connected by means of any of various types of welding, such as supersonic welding and laser welding. That is, means for connecting conductive members to each other may be means capable of achieving mechanical and electrical connection. Various types of welding can be adopted.

The positive electrode second connecting portion 21 is fixed to the case 3 and electrically connected to the external terminal (later-mentioned positive electrode external terminal) 4. The positive electrode second connecting portion 21 extends from the positive electrode first connecting portion 20 perpendicularly to a plane connecting the first end portion P1 and the second end portion P2 of the positive electrode first connecting portion 20. The positive electrode second connecting portion 21 is formed into a plate shape such that the longitudinal direction is oriented in the first direction. The positive electrode second connecting portion 21 is provided with a through-hole 25 into which the rivet 6 is to be inserted.

More specifically, the current collector 2 is formed such that, in the state where the second connecting portion 21 is fixed to a wall (cover plate 31) of the case 3, the second end portion P2 of the first connecting portion 20 is disposed in proximity to another wall (bottom portion 34) opposite to the cover plate 31 to which the second connecting portion 21 is fixed. Along therewith, the length of the first connecting portion 20 in the longitudinal direction is slightly shorter than the length between the walls (between the cover plate 31 and the bottom portion 34) opposed to define the inner space of the case 3.

As described above, the first connecting portion 20 includes the connection pieces 22 and 22 insertable into the winding center of the electrode assembly 1, between the first end portion P1 and the second end portion P2. The connection pieces 22 and 22 are formed by twisting both outsides of a slit formed extending in the longitudinal direction that are portions of a metal plate configuring the current collector 2.

Thus, the connection pieces 22 and 22 that extend in the longitudinal directions and are separated in a direction orthogonal to the longitudinal direction are formed at the first connecting portion 20. The connection pieces 22 and 22 are formed extending in the direction identical to that of the second connecting portion 21.

The other current collector (hereinafter, referred to as a negative electrode current collector) 2 has a basic form in common with that of the positive electrode current collector 2. Accordingly, the description on the positive electrode current collector 2 can serve as description on the negative electrode current collector 2 by means of changing "positive electrode" in the sentences into "negative electrode". Thus, the description on the positive electrode current collector 2 serves as the description on the negative electrode current collector 2.

Here, the matters or features of the negative electrode current collector 2 different from those of the positive electrode current collector 2 will herein be described. Typically, from an electrochemical viewpoint, the negative electrode current collector 2 is made of copper or a copper alloy, and the positive electrode current collector 2 is made of aluminum or an aluminum alloy. Along therewith, in a viewpoint of mechanical strength, the thickness of the positive electrode current collector 2 is larger than the thickness of the negative electrode current collector 2. That is, the negative electrode current collector 2 is made of a metal plate thinner than the positive electrode current collector 2.

The case 3 includes a case body 30 and a cover plate 31. The case body 30 includes: a pair of first walls 32 and 32, each of which has a first end portion P3 and a second end portion P4 opposite to the first end portion P3, face each other with a distance in the first direction; a pair of second walls 33 and 33, each of which has a first end portion P5 and a second end portion P6 opposite to the first end portion P5, face each other with a distance in the second direction between the pair of first walls 32 and 32; and a bottom portion 34 that encloses a region surrounded by the first end portions P3 and P3 of the pair of first walls 32 and 32 and the first end portions P5 and P5 of the pair of second walls 33 and 33. Accordingly, an opening 35 corresponding to the bottom portion 34 is formed at a region surrounded by the second end portions P4 and P4 of the pair of first walls 32 and 32 and the second end portions P6 and P6 of the pair of second walls 33 and 33.

The case body 30 can house the electrode assembly 1 connected with the current collectors 2 and 2 such that the longitudinal direction of the bottom portion 34 matches with the winding center direction of the electrode assembly 1. The size of the case body 30 is set such that, in the state where the case body 30 houses the electrode assembly 1, a spacing is formed between the pair of first walls 32 and 32 and the current collectors 2 and 2 and a spacing is formed between the pair of second walls 33 and 33 and the periphery of the electrode assembly 1.

The cover plate 31 covers the opening 35. Both the case body 30 and the cover plate 31 are made of metal. The cover plate 31 is welded to the case body 30, thereby forming the inner space of the case 3 airtight. The cover plate 31 is provided with a pair of through-holes 36 and 36 (hereinafter, one of the through-holes is referred to as a positive electrode through-hole 36, and the other through-hole is referred to as a negative electrode through-hole 36) separated in the first direction. The cover plate 31 is formed into a rectangular shape. Along therewith, the positive electrode through-hole 36 and the negative electrode through-hole 36 are arranged with a distance therebetween in the longitudinal direction (first direction).

The external terminal 4 is connected to an electric load or another battery cell. The one external terminal (hereinafter, referred to as a positive electrode external terminal) 4 includes a shaft-shaped terminal 40, and a head 41 connected to one end of the terminal 40. The positive electrode external terminal 4 has an outwardly threaded portion on the periphery of the terminal 40 to be threadingly engaged with a non-illustrated inwardly threaded member (e.g., a nut). That is, a bolt terminal is adopted as the positive electrode external terminal 4. In conformity with the adoption of the bolt terminal as the positive electrode external terminal 4, the battery cell Ps includes a turn stopper 42 fixed on the case 3 (cover plate 31). The engagement between the head 41 of the positive electrode external terminal 4 and the turn stopper 42 prevents accompanying rotation of the positive electrode external terminal 4 caused by threading engagement of the inwardly threaded member.

The other external terminal (hereinafter, referred to as a negative electrode external terminal) 4 is formed into a shape identical to that of the positive electrode external terminal 4. Accordingly, the description on the positive electrode external terminal 4 can serve as description on the negative electrode external terminal 4 by means of changing "positive electrode" in the sentences into "negative electrode". The description on the positive electrode external terminal 4 thus serves as the description on the negative electrode external terminal 4.

One rivet (here after, referred to as a positive electrode rivet) 6 includes a shaft-shaped first rivet portion 60, a shaft-shaped second rivet portion 61, and a body 62 connecting the first rivet portion 60 and the second rivet portion 61 to each other. The first rivet portion 60 and the second rivet portion 61 each are configured such that at least the distal end portion can be plastic-deformed or can be subjected to a caulking process. The first rivet portion 60 and the second rivet portion 61 are disposed concentric with each other. The body 62 has a diameter wider than that of the first rivet portion 60 and the second rivet portion 61.

The other rivet (hereinafter, referred to as a negative electrode rivet) 6 is formed into a shape identical to that of the positive electrode rivet 6. Accordingly, the description on the positive electrode rivet 6 can serve as description on the negative electrode rivet 6 by means of changing "positive electrode" in the sentences into "negative electrode". Here, the description on the positive electrode rivet 6 thus serves as the description on the negative electrode rivet 6.

One connection strip (hereinafter, referred to as a positive electrode connection strip) 7 is a strip of a metal plate. The positive electrode connection strip 7 is provided with a pair of through-holes 70 and 71 (hereinafter, one through-hole is referred to as a first hole 70, and the other through-hole is referred to as a second hole 71) separated in the longitudinal direction. The terminal 40 of the positive electrode external terminal 4 is inserted into the first hole 70. The first rivet portion 60 of the positive electrode rivet 6 is inserted into the second hole 71.

The other connection strip (hereinafter, referred to as a negative electrode connection strip) 7 is formed into a shape identical to that of the positive electrode connection strip 7. Accordingly, the description on the positive electrode connection strip 7 can serve as description on negative electrode connection strip 7 by means of changing "positive electrode" in the sentences into "negative electrode". The description on the positive electrode connection strip 7 thus serves as the description on the negative electrode connection strip 7.

One inner gasket (hereinafter, referred to as positive electrode inner gasket) 8 is a plastic molded product having electric insulating and sealing properties. The positive electrode inner gasket 8 is set to a size or dimension that can be opposed to the entire positive electrode second connecting portion 21 of the positive electrode current collector 2. The positive electrode inner gasket 8 is provided with a through-hole 81 matching with the through-hole 25 of the positive electrode second connecting portion 21.

The other inner gasket (hereinafter, referred to as a negative electrode inner gasket) 8 is formed into a shape identical to that of the positive electrode inner gasket 8. Accordingly, the description on the positive electrode inner gasket 8 can serve as description on the negative electrode inner gasket 8 by means of changing "positive electrode" in the sentences into "negative electrode". The description on the positive electrode inner gasket 8 thus serves as the description on the negative electrode inner gasket 8.

One external gasket (hereinafter, referred to as a positive electrode external gasket) 9 is a plastic molded product having electrically insulating and sealing properties as with the positive electrode inner gasket 8. The positive electrode external gasket 9 is provided with a recess 90 capable of accommodating the body 62 of the positive electrode rivet 6. The positive electrode external gasket 9 is provided with a through-hole 91 into which the first rivet portion 60 of the positive electrode rivet 6 can be inserted in the state where the body 62 of the positive electrode rivet 6 is housed in the recess 90.

The other external gasket (hereinafter, referred to as a negative electrode external gasket) 9 is formed into a shape identical to that of the positive electrode external gasket 9. Accordingly, the description on the positive electrode external gasket 9 can serve as description on the negative electrode external gasket 9 by means of changing "positive electrode" in the sentences into "negative electrode". The description on the positive electrode external gasket 9 thus serves as the description on the negative electrode external gasket 9.

According to the above configuration, the first rivet portion 60 of the positive electrode rivet 6 is sequentially inserted into the through-hole 91 of the positive electrode external gasket 9, the positive electrode through-hole 36 of the cover plate 31, the through-hole 81 of the positive electrode inner gasket 8, and the through-hole 25 of the positive electrode second connecting portion 21 of the positive electrode current collector 2. A distal portion of the first rivet portion 60 that protrudes inwardly from the positive electrode second connecting portion 21 of the positive electrode current collector 2 is subjected to a caulking process. The second rivet portion 61 of the positive electrode rivet 6 is inserted into the second hole 71 of the positive electrode connection strip 7. A distal portion of the second rivet portion 61 that protrudes from the positive electrode connection strip 7 is subjected to a caulking process. Accordingly, the positive electrode rivet 6 fixes the positive electrode current collector 2 to the cover plate 31 of the case 3 while connecting the positive electrode current collector 2 to the positive electrode external terminal 4 via the positive electrode connection strip 7.

As described above, the configuration on the positive electrode side is common to the configuration on the negative electrode side. The description on the connection between the positive electrode current collector 2 and the positive electrode connection strip 7 and the connection between the positive electrode connection strip 7 and the positive electrode external terminal 4 by the positive electrode rivet 6 can serve as description on the connection between the negative electrode current collector 2 and the negative electrode connection strip 7 and the connection between the negative electrode connection strip 7 and the negative electrode external terminal 4 by the negative electrode rivet 6, by means of changing "positive electrode" in the sentences into "negative electrode". The description on the connection between the positive electrode current collector 2 and the positive electrode connection strip 7 and the connection between the positive electrode connection strip 7 and the positive electrode external terminal 4 by the positive electrode rivet 6 thus serves as the description on the connection between the negative electrode current collector 2 and the negative electrode connection strip 7 and the connection between the negative electrode connection strip 7 and the negative electrode external terminal 4 by the negative electrode rivet 6.

The spacer 5 is a plastic molded product having electrically insulating properties. As shown in FIG. 4, the spacer 5 is disposed so as to straddle or extend over the first connecting portions 20 and 20 of the current collectors 2 and 2. The opposite end portions of the spacer 5 are connected to the first connecting portions 20 and 20. More specifically, the spacer 5 includes: a pair of couplers 50 and 50 that are connected to the second end portions P2 and P2 of the first connecting portions 20 and 20; and a bridge portion 51 connecting the pair of couplers 50 and 50 to each other while keeping the distance between the pair of couplers 50 and 50 constant or substantially constant.

More specifically, the second end portions P2 and P2 (distal portions) of the first connecting portions 20 and 20 are inserted into the pair of couplers 50 and 50, respectively, thereby allowing the spacer 5 to connect the pair of current collectors 2 and 2. Thus, each coupler 50 is provided with a receiving portion 56 into which the second end portion P2 of the first connecting portion 20 can be inserted.

Accordingly, the second end portions P2 and P2 of the first connecting portions 20 and 20 suspended down from the cover plate 31 of the case 3 are prevented or reduced from moving in the first and second directions in the receiving portions 56 and 56 of the spacer 5 held inserted in the receiving portions 56 and 56.

Figure 5A:
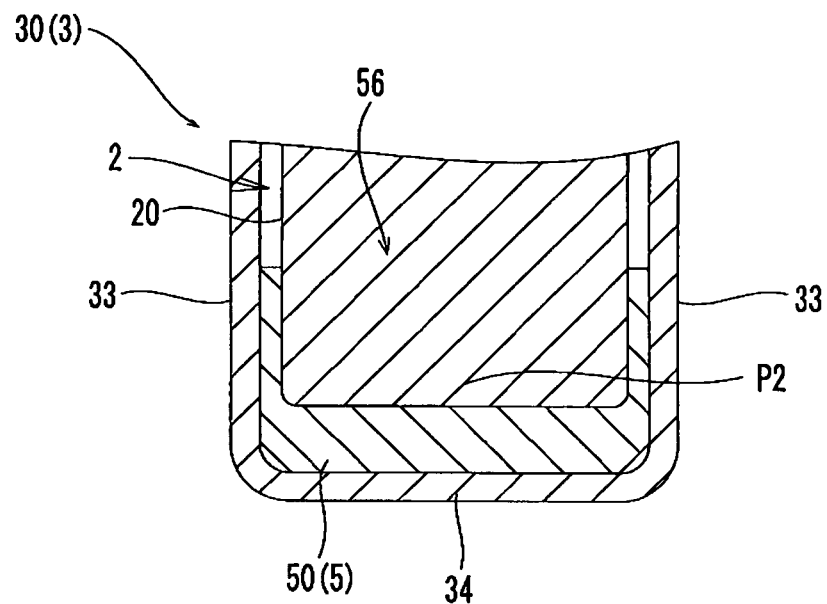
FIG. 5A is a sectional view of FIG. 4 taken along 4I-4I.
Figure 5B:
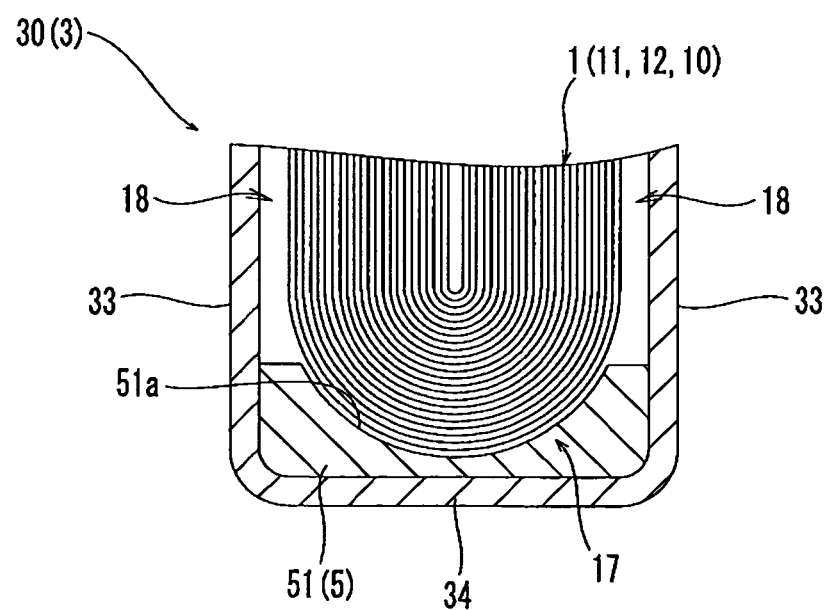
FIG. 5B is a sectional view of FIG. 4 taken along 4II-4II.

The spacer 5 is mounted on the bottom portion 34 in the case 3. Along therewith, as shown in FIGS. 4 and 5B, the bridge portion 51 is opposed to the electrode assembly 1. The bridge portion 51 of the spacer 5 includes an electrode-assembly facing surface 51a that faces the electrode assembly 1.

Figure 6B:
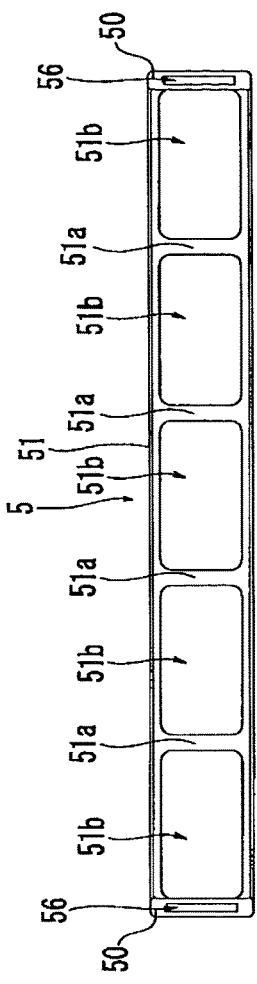
FIG. 6B is a plan view of the spacer.
Figure 6C:
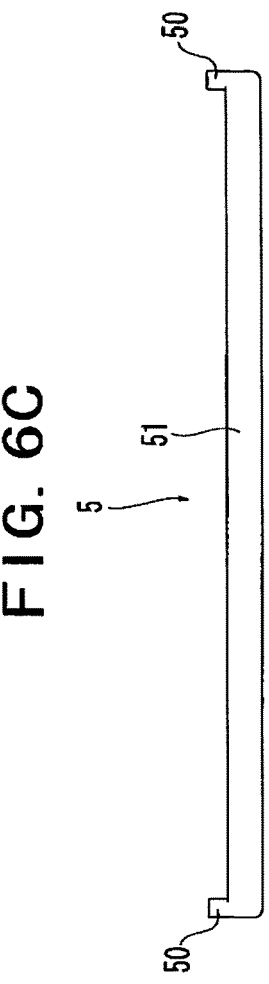
FIG. 6C is a front view of the spacer.
Figure 6D:
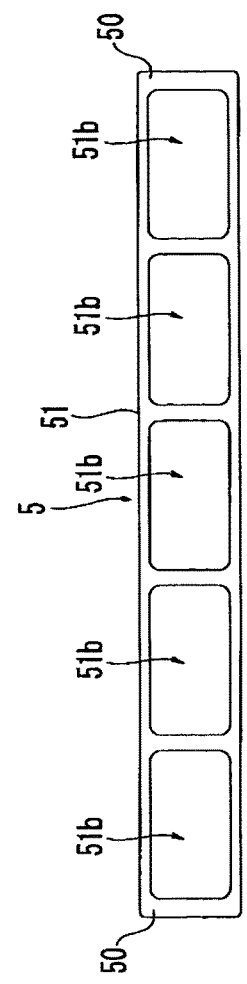
FIG. 6D is a bottom view of the spacer.
Figure 6A:
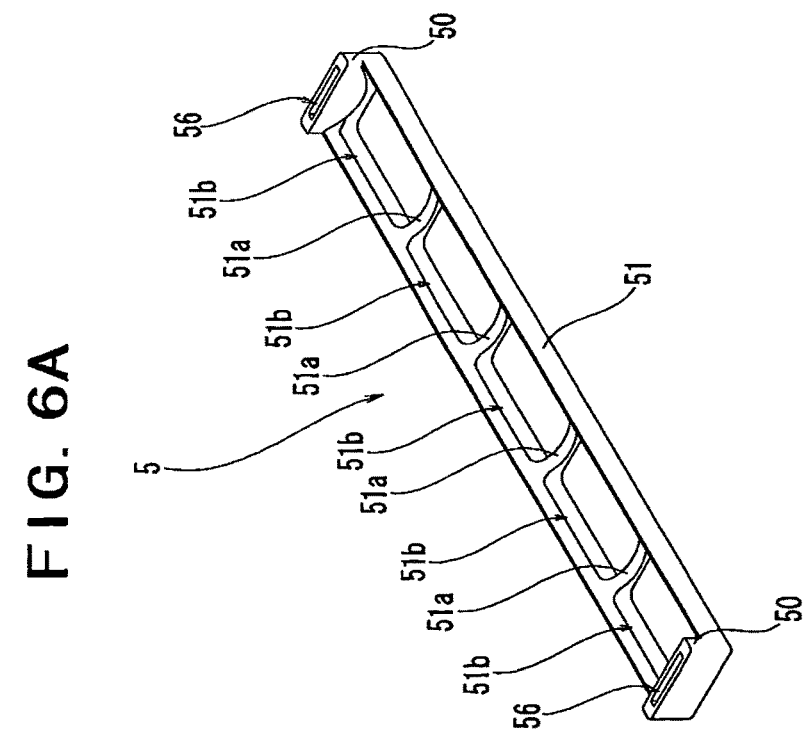
FIG. 6A is an overall perspective view of the spacer.

As shown in FIGS. 5B and 6A, the electrode-assembly facing surface 51a of the spacer 5 has a recess having a circular arc shape in conformity with the external surface of the circular arc portion 17 of the electrode assembly 1. The electrode-assembly facing surface 51a of the spacer 5 is not in contact with the electrode assembly 1.

In order to facilitate reduction in weight, as shown in FIG. 6, the spacer 5 includes a less thickness portion 51b made of a through-hole or a recess, on at least one position on the bridge portion 51. In this embodiment, a plurality of less thickness portions 51b are formed at intervals. The less thickness portions 51b, . . . are formed at intervals in the direction (corresponding to the first direction) in which the pair of couplers 50 and 50 are arranged. Each less thickness portion 51b is formed into a substantially rectangular shape in plan view. The spacer 5 is thus formed into a ladder-like shape by alternately disposing the opposite surfaces 51a and the less thickness portions 51b in the first direction As shown in FIGS. 4 and 5, the spacer 5 interferes (is in contact) with the inner surface of the case 3 while being held inserted into the case 3. More specifically, the surface of the spacer 5 opposite to the surface facing the electrode assembly 1 (electrode-assembly facing surface 51a) is formed into a planar shape. The planar shape and planar size of the spacer 5 are formed in conformity with the planar shape and planar size of the inner surface of the bottom portion 34 of the case 3. Along therewith, the opposite ends (external surfaces of the pair of couplers 50 and 50) in the longitudinal direction of the spacer 5 interfere with the inner surfaces of the pair of first walls 32 and 32, and the opposite ends (at least any of the external surfaces of the pair of couplers 50 and 50 and the bridge portion 51) in the direction orthogonal to the longitudinal direction of the spacer 5 interfere with the inner surfaces of the pair of second walls 33 and 33. This prevents or reduces movement of the spacer 5 in the first and second directions owing to interference with the inner surface of the case 3.

The battery cell Ps according to this embodiment is configured as described above. According to the battery cell Ps of this embodiment, the first connecting portions 20 and 20 of the current collectors 2 and 2 connected to the pair of couplers 50 and 50 of the spacer 5 can be kept to have a constant or substantially constant distance owing to the spacer 5. That is, the current collector 2 connected via the spacer 5 constrains the opposite current collector 2 and prevents or reduces swaying or movement of the opposite current collector 2.

Accordingly, in the case where the battery cell Ps is installed in a vibrating environment, even when the current collectors 2 and 2 and the electrode assembly 1 vibrate (sway), the spacer 5 prevents or reduces movement or swaying of the current collectors 2 and 2, and further prevents or reduces movement or swaying of the electrode assembly 1 connected to the current collectors 2. This allows the relative positioning between the current collectors 2 and 2 and the electrode assembly 1 to be kept constant or substantially constant.

As a result, even when the battery cell Ps is used in a vibrating environment, bending hardly occurs at the second connecting portions 21 and 21 of the current collectors 2 and 2 supporting the electrode assembly 1 and in proximity to the boundary of the second connecting portions 21 and 21 and the first connecting portions 20 and 20. Furthermore, even when the battery cell Ps is used in a vibrating environment, the connecting portions of the electrode assembly 1 and the first connecting portions 20 and 20 are hardly twisted. Accordingly, the battery cell Ps can prevent the current collectors 2 and 2 and the electrode assembly 1 from being broken.

As described above, according to the spacer 5, the pair of couplers 50 and 50 kept with a constant or substantially constant distance by the bridge portion 51 are connected with the first connecting portions 20 and 20 of the current collectors 2 and 2. Thus, the second end portions P2, which are the distal portions of the first connecting portions 20 and 20, are not free ends. This allows the overall swaying (movement) of the current collectors 2 and 2 to be securely prevented or reduced. Accordingly, the battery cell Ps can prevent or reduce the overall swaying (movement) of the current collectors 2 and 2 and the electrode assembly 1 in the case 3, and securely prevent the current collectors 2 and 2 and the electrode assembly 1 from being broken.

Thus, even in the case where the battery cell Ps according to this embodiment is installed in a vibrating environment, this battery cell can prevent the current collectors 2 and 2 and the electrode assembly 1 from being broken, and exert excellent effects allowing electric power to be stably supplied to devices.

The present invention is not limited to the embodiment. Instead, it is a matter of course that the present invention can be appropriately modified within a scope without departing the gist of the present invention.

In the embodiment, the opposite surfaces 51a, . . . of the spacer 5 are formed in conformity with the circular arc shapes corresponding to the circular arc portions 17 and 17 of the electrode assembly 1. The present invention is not limited thereto. For instance, the electrode-assembly facing surface 51a may be formed into a shape (e.g., a planar shape) different from the peripheral shape of the electrode assembly 1.

In the embodiment, the undersurface of the spacer 5 (the surface opposite to the surface facing the electrode assembly 1) is formed into the entirely planar shape. However, the present invention is not limited thereto. For instance, a plurality of leg portions with a distance in the first direction may be provided on the undersurface of the spacer 5. This configuration also allows the spacer 5 to be stably disposed on the bottom portion 34 of the case 3.

In the embodiment, the bridge portion 51 of the spacer 5 includes the less thickness portions 51b. However, the bridge portion 51 of the spacer 5 may be configured without the less thickness portions 51b.

In the embodiment, the spacer 5 interferes with the inner surface of the case 3 while being held inserted in the case 3, thereby regulating the movement of the spacer 5 in the first direction and the movement in the second direction. However, the present invention is not limited thereto. For instance, the spacer 5 may be configured so as to form a spacing with the inner surface of the case 3 in the configuration of being disposed in the case 3. This configuration also allows the bridge portion 51 to maintain the first connecting portions 20 and 20 of the current collectors 2 and 2 connected to the pair of couplers 50 and 50 to be disposed with a constant or substantially constant distance.

In the embodiment, the external terminals 4 and 4 the rivets 6 and 6 have the independent configurations. However, the present invention is not limited thereto. For instance, the external terminals 4 and 4 and the rivets 6 and 6 may be formed in an integrated manner. In this case, the turn stoppers 42 and 42 and the connection strips 7 and 7 are not required. Accordingly, it is preferred that the external gaskets 9 and 9 and the external terminals 4 and 4 (or the rivets 6 and 6) be provided with a function of preventing rotation.

In the embodiment, the slits are formed in the intermediate positions of the rectangular metal plates configuring the current collectors 2 and 2, and both outsides of the slit are subjected to a twisting process, thereby forming the pair of the connection pieces 22 and 22. However, the present invention is not limited thereto. For instance, the slit may be formed from the intermediate position of the metal plate to the bottom end (the other end), and the both outsides of the slit may be subjected to a twisting process, thereby forming bifurcated connection pieces 22 and 22. The present invention is not limited to the formation of connection pieces 22 and 22 by twisting the metal plate. For instance, metal plates that are to be the connection pieces 22 and 22 may be formed by welding.

<Basic Configurations of Second to Fifth Embodiments>

Figure 8:
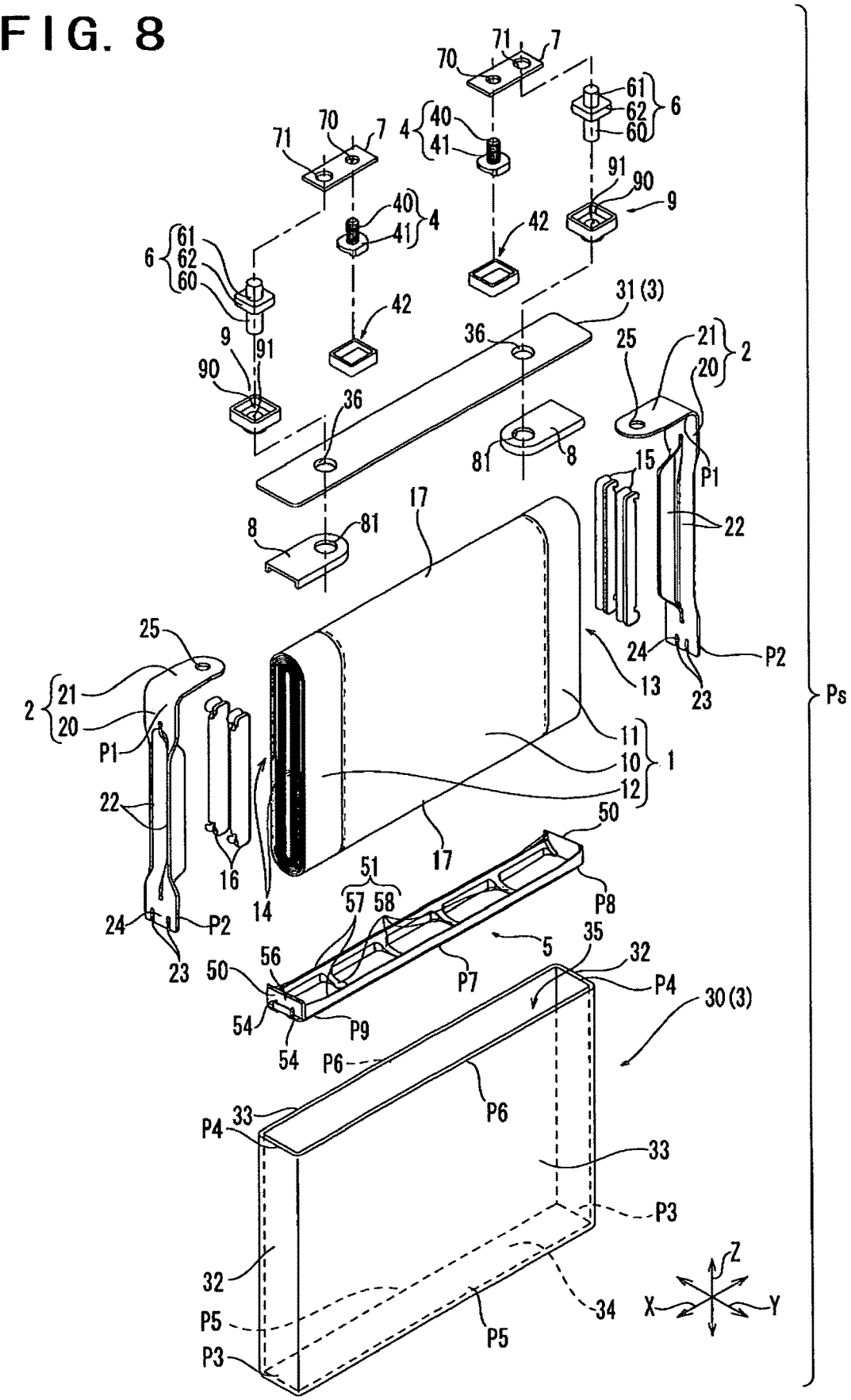
FIG. 8 is an exploded perspective view of the battery cell.
Figure 9:
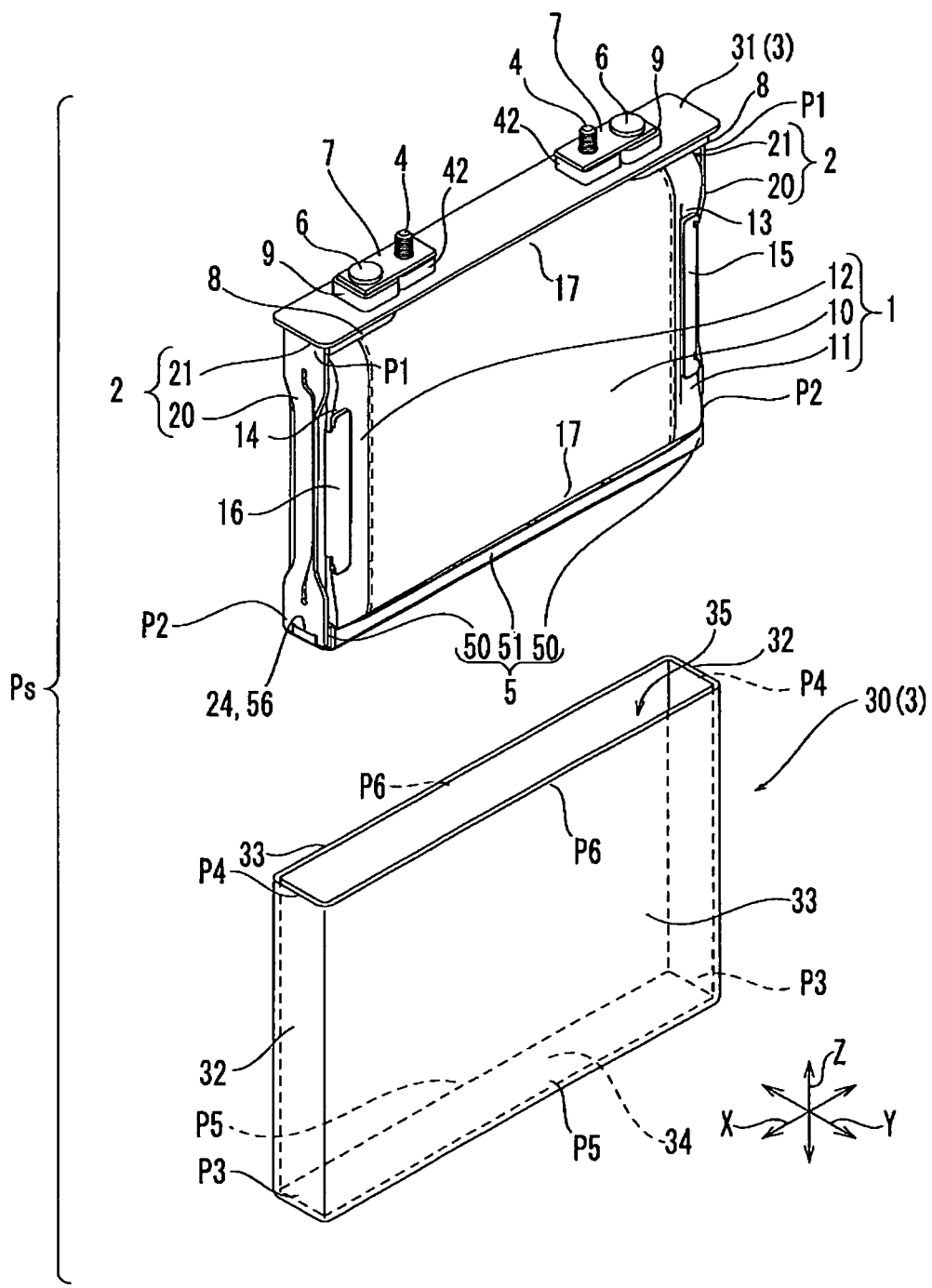
FIG. 9 is a partially exploded perspective view of the battery cell in which an electrode assembly, current collectors and a spacer are taken out of a case body.

An overall configuration of a battery cell Ps according to each of second to fifth embodiments are shown in common in FIGS. 7 to 9. That is, the battery cell Ps according to each of the second to fifth embodiments has the same basic configuration. The batteries Ps according to the second to fifth embodiments are different in structures of the spacers 5 so that in each following embodiment, the spacer 5 is mainly described.

In each of the second to the fifth embodiments, the structure of the spacer different from the spacer 5 of the structure of the battery cell Ps according to the first embodiment. Along therewith, a part of structure of the current collectors 2, 2 is also different from that of the current collectors 2, 2 of the battery cell Ps according to the first embodiment. This point will be described as follows.

The second end portion P2 of the positive electrode first connecting portion 20 is provided with two notches 23 and 23 extending in the third direction with a distance in the second direction. The notch 23 may hereinafter be referred to as a fitting portion 23. The two notches 23 and 23 each are formed into a slit, and extend in the third direction and open at the distal portion of the second end portion P2. Accordingly, a piece of divided center portion 24 is formed between the two notches 23 and 23 at the second end portion P2 of the positive electrode first connecting portion 20.

Another two notches 23 and 23 are formed at the second end portion P2 of the negative electrode first connecting portion 20 of the negative electrode current collector 2. The notch 23 may hereinafter be referred to as a fitting portion 23. The distance between the notches 23 and 23 of the negative electrode current collector 2 in the second direction is different from the distance between the two notches 23 and 23 of the positive electrode current collector 2 in the second direction. That is, the distance between the two notches 23 and 23 of the negative electrode current collector 2 in the second direction is set wider than the distance between the notches 23 and 23 of the positive electrode current collector 2 in the second direction. Also at the negative electrode current collector 2, each notch 23 is formed into a slit-like shape, extends in the third direction, and opens at the distal portion of the second end portion P2. Accordingly, also at the second end portion P2 of the negative electrode first connecting portion 20, the piece of divided center portion 24 is formed between the two notches 23 and 23.

Second Embodiment

Figure 10:
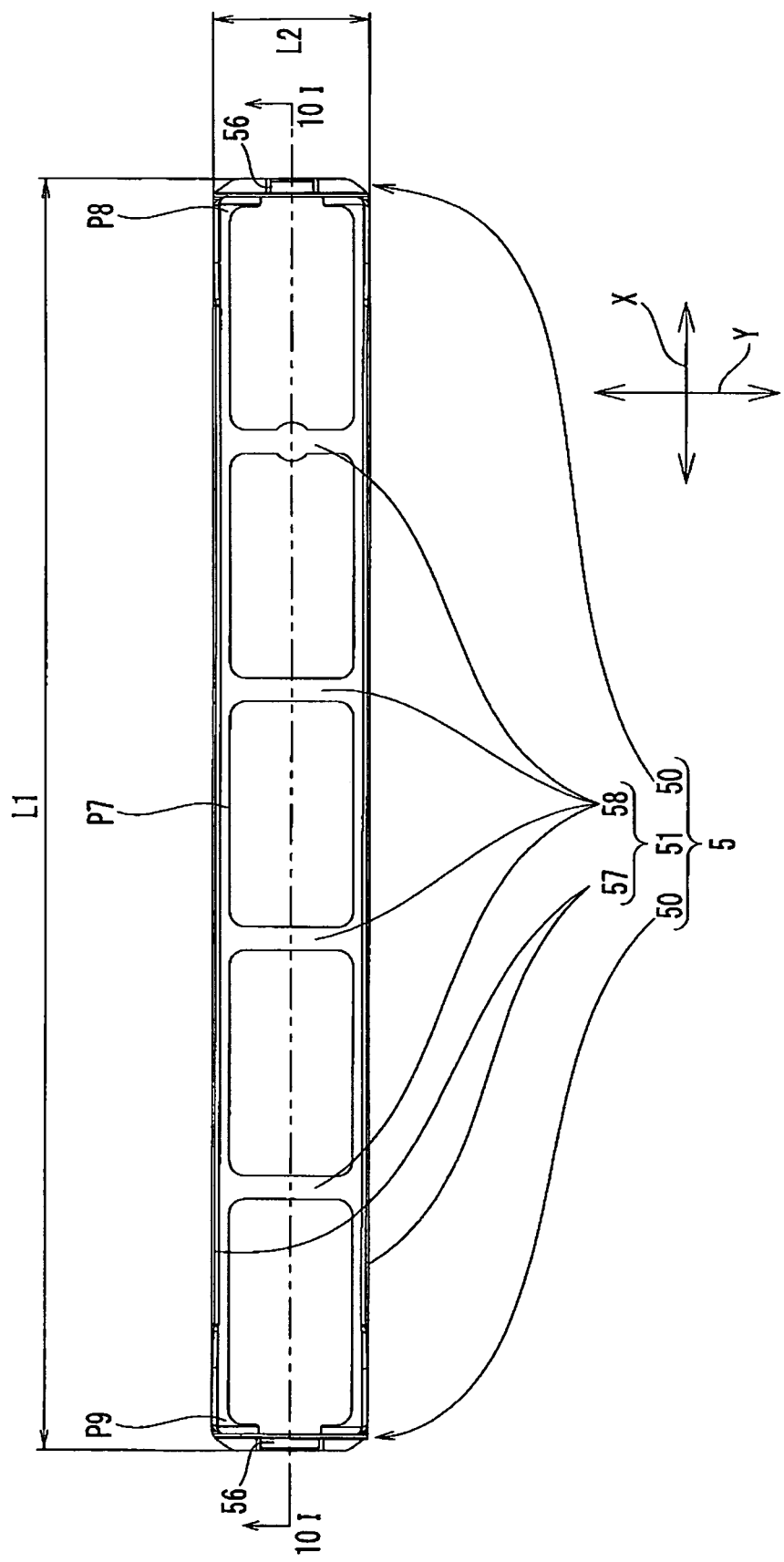
FIG. 10 is a plan view of a spacer of a battery cell according to the second embodiment.
Figure 11:
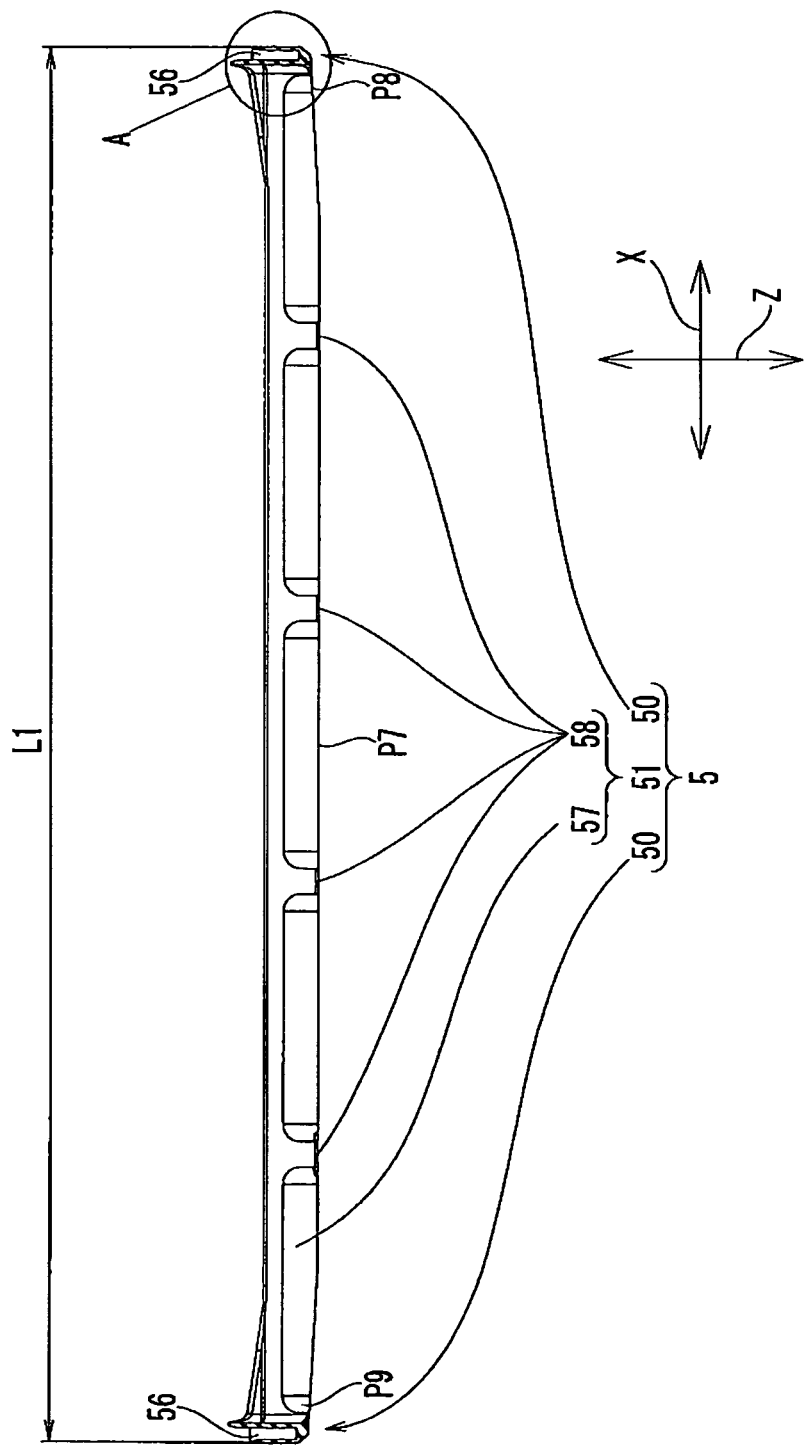
FIG. 11 is a sectional view of FIG. 10 taken along 10I-10I.

A spacer 5 is a plastic molded product having electrically insulating properties. As shown in FIGS. 10 and 11, the spacer 5 includes: a pair of couplers 50 and 50 each of which is connected to the second end portion P2 of the first connecting portion 20 of a corresponding one of the pair of current collectors 2 and 2; and a bridge portion 51 that extends in the first direction, connects the pair of couplers 50 and 50 to each other and is flexible (deformable) at least in the third direction.

The total length of the spacer 5 (the length in the first direction) L1 is set shorter than the distance between the first walls 32 and 32 of the case body 30. The total width of the spacer 5 (the width in the second direction) L2 is set shorter than the distance between the second walls 33 and 33 of the case body 30.

One coupler (hereinafter, referred to as a positive electrode coupler) 50 is provided with a receiving portion 56 into which the divided center portion 24 of the second end portion P2 of the first connecting portion 20 of the positive electrode current collector 2 is inserted.

Figure 12:
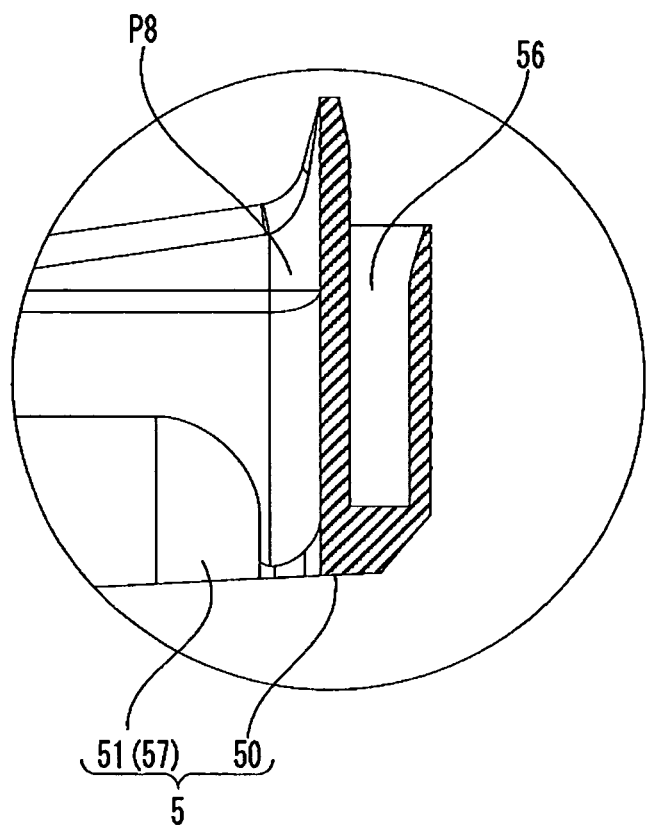
FIG. 12 is an enlarged view of an A part in FIG. 11.

As shown in FIG. 12, the receiving portion 56 is a non-through-hole extending from the surface facing the cover plate 31 toward the surface facing the bottom portion 34 in the state where the spacer 5 is housed in the case 3. The depth of the receiving portion 56 in the third direction is shorter than the length of the divided center portion 24 of the second end portion P2 of the first connecting portion 20 of the positive electrode current collector 2 in the third direction. That is, the depth of the receiving portion 56 in the third direction is set such that, in the state where the divided center portion 24 is inserted into the receiving portion 56, the distal end of the divided center portion 24 is in contact with the bottom portion of the receiving portion 56. Accordingly, the positive electrode coupler 50 is subjected to a force (force toward the bottom portion 34 of the case 3) in the third direction acting on the positive electrode current collector 2.

The other coupler (hereinafter, referred to as a negative electrode coupler) 50 is formed into a shape identical to that of the positive electrode coupler 50. Accordingly, the description on the positive electrode coupler 50 can serve as description on the negative electrode coupler 50 by means of changing "positive electrode" in the sentences into "negative electrode". The description on the positive electrode coupler 50 thus serves as description on the negative electrode coupler 50.

Referring again to FIGS. 10 and 11, the bridge portion 51 is formed such that a central portion P7 in the first direction is displaced to one side in the third direction with respect to the pair of couplers 50 and 50. More specifically, the central portion P7 of the bridge portion 51 is displaced to be the leading portion (first inserted portion) in comparison with the pair of couplers 50 and 50 when being inserted into the case body 30.

The bridge portion 51 includes a first end portion P8 and a second end portion P9 in the first direction. The bridge portion 51 is formed into a curved shape such that the central portion P7 is displaced to the one side in the third direction (the direction facing the bottom portion 34) with respect to the first end portion P8 and the second end portion P9. That is, the bridge portion 51 is formed into the curved shape such that the surface facing the bottom portion 34 of the case body 30 is convex and the surface facing the cover plate 31 is concave.

The positive electrode coupler 50 is connected to the first end portion P8 of the bridge portion 51. The negative electrode coupler 50 is connected to the second end portion P9 of the bridge portion 51. Accordingly, the central portion P7 of the bridge portion 51 is displaced more than the positive electrode coupler 50 and the negative electrode coupler 50 to the one side in the third direction. That is, the spacer 5 is formed into the curved shape convex to the one side in the third direction.

The bridge portion 51 includes a pair of beam portions 57 and 57 arranged with a distance therebetween in the second direction, and a plurality of beam connecting portions 58, . . . connecting the pair of beam portions 57 and 57 to each other. The beam portion 57 is formed so as to align the longitudinal direction with the first direction. The beam portion 57 is formed in a curved shape convex to the one side in the third direction viewed from the second direction.

Each beam connecting portion 58 is formed to have a planar surface facing the bottom portion 34. Meanwhile, the surface facing the cover plate 31 is formed to have a circular arc surface in conformity with the circular arc portion of the periphery of the electrode assembly 1. The beam connecting portions 58, . . . are disposed along the edges of the beam portions 57 and 57 having a curved convex shape.

As described above, the total length L1 of the spacer 5 is set shorter than the distance between the first walls 32 and 32. However, the total length along the curved direction of the spacer 5 is set longer than the distance between the first walls 32 and 32. Accordingly, in the state where the bridge portion 51 is bent (the case where the bridge portion 51 extends straightly or the case where the bridge portion 51 extends so as to increase the radius of curvature of the bridge portion 51), the total length L1 of the spacer 5 is longer than the distance between the first walls 32 and 32.

As to the spacer 5 having the above configuration, before being housed in the case body 30, the second end portion P2 of the positive electrode first connecting portion 20 of the positive electrode current collector 2 fixed to the cover plate 31 is connected to the receiving portion 56 of the positive electrode coupler 50, and the second end portion P2 of the negative electrode first connecting portion 20 of the negative electrode current collector 2 fixed to the cover plate 31 is connected to the receiving portion 56 of the negative electrode coupler 50.

At this time, as described above, as to the spacer 5, the total length L1 is shorter than the distance between the first walls 32 and 32 of the case body 30, and the total width of L2 is narrower than the distance between the second walls 33 and 33 of the case body 30. Accordingly, the spacer 5 is smoothly inserted into the case body 30 in the state where the positive electrode current collector 2 and the negative electrode current collector 2 are connected thereto.

Figure 13:
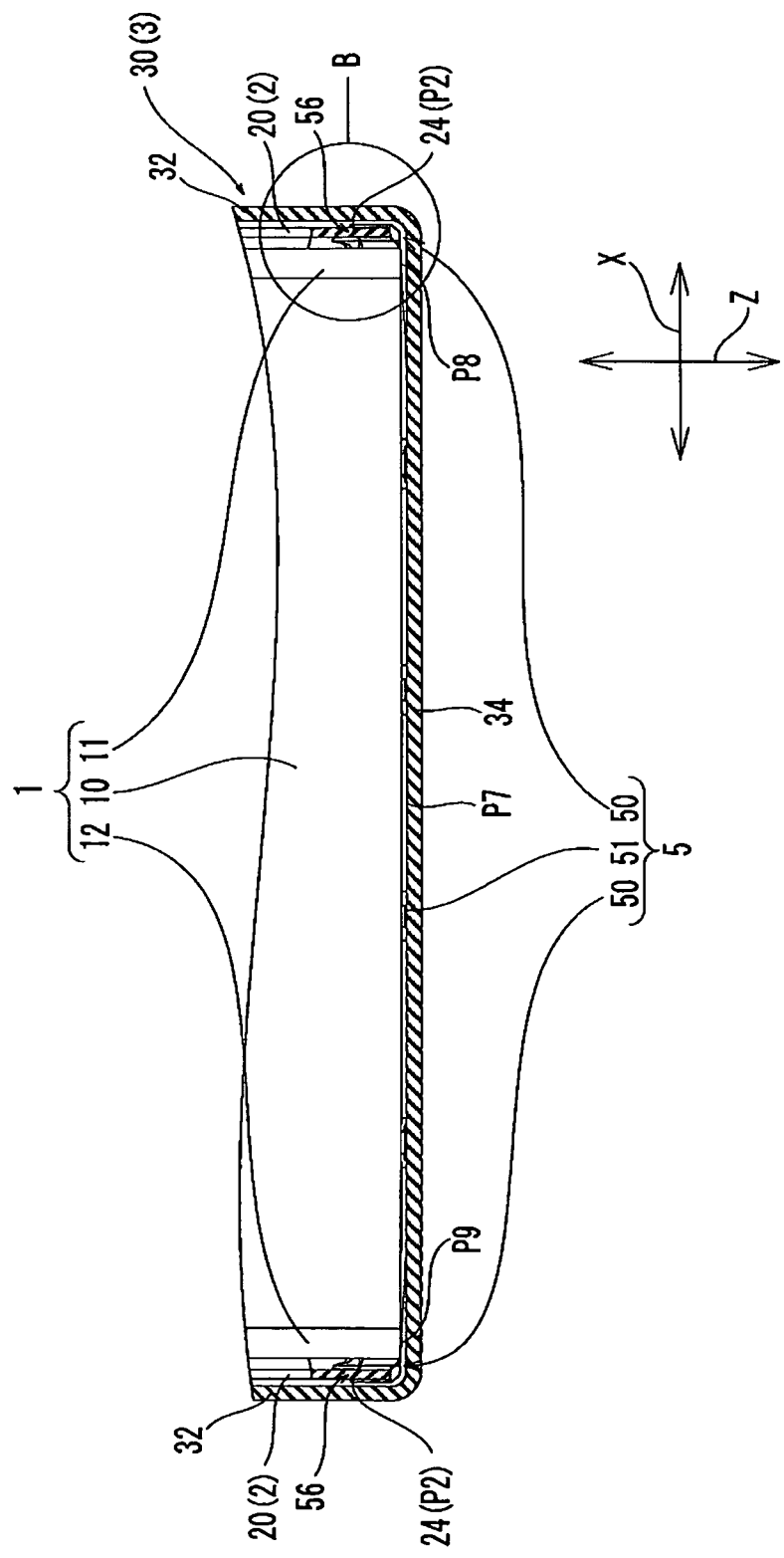
FIG. 13 is a partially sectional view of the battery cell in which the spacer is held inserted in the case body (the state before an opening of the case body is closed with a cover plate)

As shown in FIG. 13, when the spacer 5 reaches the innermost portion of the case body 30, the central portion P7 is supported by the bottom portion 34. The electrode assembly 1, the positive electrode current collector 2, the negative electrode current collector 2 and the spacer 5 are wrapped in a sheet or a bag (not shown) that has electrically insulating properties, and then inserted into the case body 30. Accordingly, the central portion P7 is supported by the bottom portion 34 sandwiching the sheet or bag therebetween.

Figure 14:
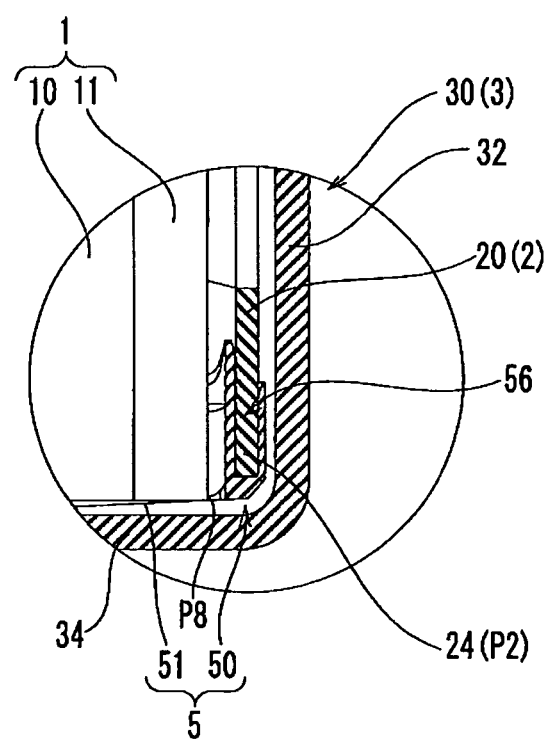
FIG. 14 is an enlarged view of a B part in FIG. 13.

Meanwhile, as shown in FIGS. 13 and 14, the positive electrode coupler 50 and the negative electrode coupler 50 are in the state of being separated from the first wall 32 and the bottom portion 34 (the state with a spacing). In this state, the cover plate 31 is arranged to secure spacings with the second end portions P4 and P4 of the first walls 32 and 32 and the second end portions P6 and P6 of the second walls 33 and 33 of the case body 30.

Figure 15:
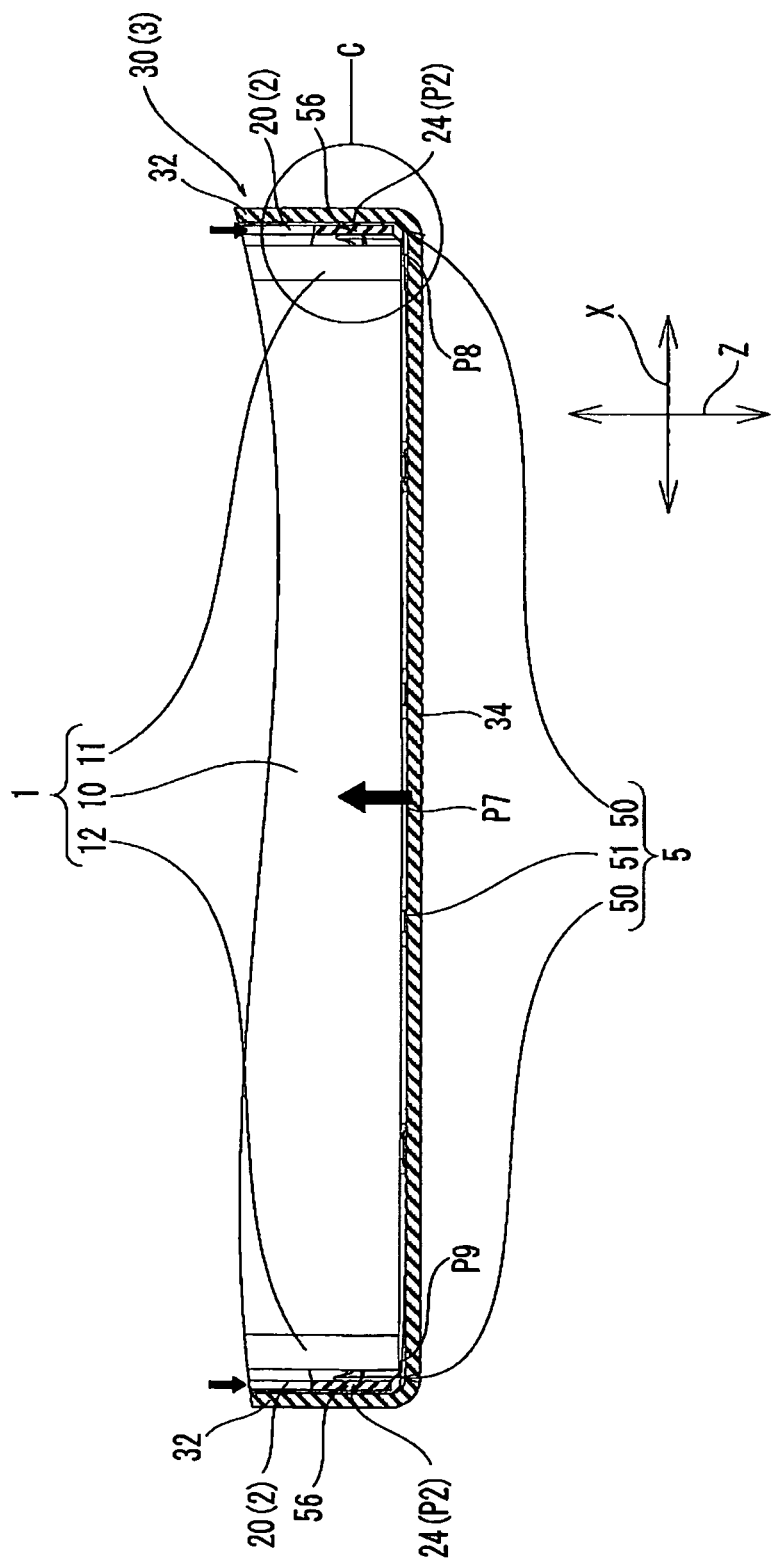
FIG. 15 is a partially sectional view of the battery cell in which the spacer is disposed at an appropriate position in the case body (in the state where the opening of the case body is closed with the cover plate)
Figure 16:
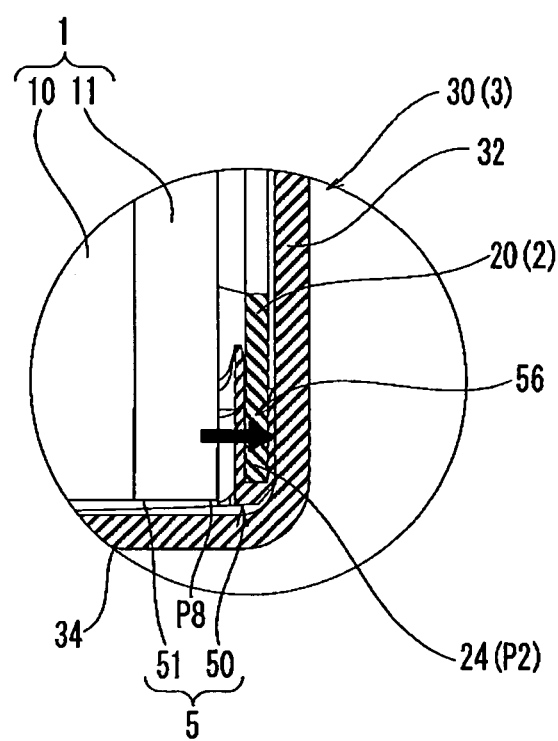
FIG. 16 is an enlarged view of a C part in FIG. 15.

The cover plate 31 is pressed against the case body 30, and brought into close contact with the second end portions P4 and P4 of the first walls 32 and 32 and the second end portions P6 and P6 of the second walls 33 and 33 of the case body 30. Along therewith, as shown in FIGS. 15 and 16, the positive electrode first connecting portion 20 of the positive electrode current collector 2 and the negative electrode first connecting portion 20 of the negative electrode current collector 2, which are fixed to the cover plate 31, are brought into the state of pressing the positive electrode coupler 50 and the negative electrode coupler 50 of the spacer 5 against the bottom portion 34 of the case body 30. Accordingly, the bridge portion 51 of the spacer 5 is bent (to extend), thereby allowing the total length of the spacer 5 to be longer than the total length L1 in ordinary states.

Along therewith, the positive electrode coupler 50 presses one first wall 32 of the case body 30 to the outside. The negative electrode coupler 50 presses the other first wall 32 of the case body 30 to the outside. As described above, the electrode assembly 1, the positive electrode current collector 2, the negative electrode current collector 2 and spacer 5 are wrapped in the sheet or bag having electrically insulating properties and then inserted into the case body 30. Accordingly, the positive electrode coupler 50 presses the one first wall 32 to the outside in the state of sandwiching the sheet or bag having electrically insulating properties therebetween, and the negative electrode coupler 50 presses the other first wall 32 to the outside in the state of sandwiching the sheet or bag having electrically insulating properties therebetween. Accordingly, the spacer 5 is brought into the state of fitting tightly against the first walls 32 and 32 of the case body 30.

The periphery of the cover plate 31 is welded to the case body 30. As shown in FIG. 7, the opening 35 of the case body 30 is sealed with the cover plate 31. Accordingly, the positive electrode current collector 2 (positive electrode first connecting portion 20) and the negative electrode current collector 2 (negative electrode first connecting portion 20) that are fixed to the cover plate 31 press the opposite end portions (the positive electrode coupler 50 and the negative electrode coupler 50) of the spacer 5 against the bottom portion 34 of the case body 30, thereby extending the spacer 5. That is, the opening 35 of the case body 30 is sealed with the cover plate 31, which brings the spacer 5 into the state of fitting tightly against the first walls 32 and 32 of the case body 30 and thereby being fixed in the case 3.

When the spacer 5 is fixed in the case 3, the second end portion P2 of the positive electrode first connecting portion 20 of the positive electrode current collector 2 and the second end portion P2 of the negative electrode first connecting portion 20 of the negative electrode current collector 2 are brought into the state of being fixed to the case 3 via the spacer 5 in the battery cell Ps having the above configuration. This fixation prevents or reduces swaying or movement of the positive electrode current collector 2 and the negative electrode current collector 2. Furthermore, this fixation also prevents or reduces swaying or movement of the electrode assembly 1 connected to the positive electrode current collector 2 and the negative electrode current collector 2, of which swaying or movement is prevented or reduced.

Accordingly, even when vibrations are applied from the outside to the battery cell Ps, the relative arrangement between the positive electrode current collector 2 and the electrode assembly 1 and the relative arrangement between the negative electrode current collector 2 and the electrode assembly 1 are kept constant or substantially constant. As a result, in the positive electrode current collector 2 and the negative electrode current collector 2, bending actions hardly occur at the second connecting portion 21 fixed to the cover plate 31 and in proximity to the boundary between the second connecting portion 21 and the first connecting portion 20. Furthermore, the connecting portion between the electrode assembly 1 and the first connecting portion 20 of the current collector 2 is hardly twisted. This prevents the positive electrode current collector 2, the negative electrode current collector 2 and the electrode assembly 1 from being broken, even when the battery cell Ps is used in a vibrating environment.

As described above, the battery cell Ps according to this embodiment can exert an excellent effect capable of securely preventing breakage of the current collector 2 and the electrode assembly 1 due to vibrations.

The spacer 5 is configured such that, with the cover plate 31 covering the opening 35 of the case body 30, the positive electrode coupler 50 and the negative electrode coupler 50 are not in contact with the bottom portion 34. This reduces sites at which the case 3 and the spacer 5 are in contact with each other.

The present invention is not limited to the second embodiment. Instead, it is a matter of course that the present invention can be appropriately modified within a scope without departing from the gist of the present invention.

For instance, in the second embodiment, the spacer 5 is configured such that the central portion P7 of the bridge portion 51 is displaced to the one side in the third direction with respect to the positive electrode coupler 50 and the negative electrode coupler 50. However, the configuration of the spacer 5 is not limited thereto. The spacer 5 may be formed such that the positive electrode coupler 50 and the negative electrode coupler 50 are displaced to the one side in the third direction with respect to the central portion P7. In this case, the central portion P7 is pressed by the electrode assembly 1 toward the bottom portion 34 of the case 3.

Figure 17:
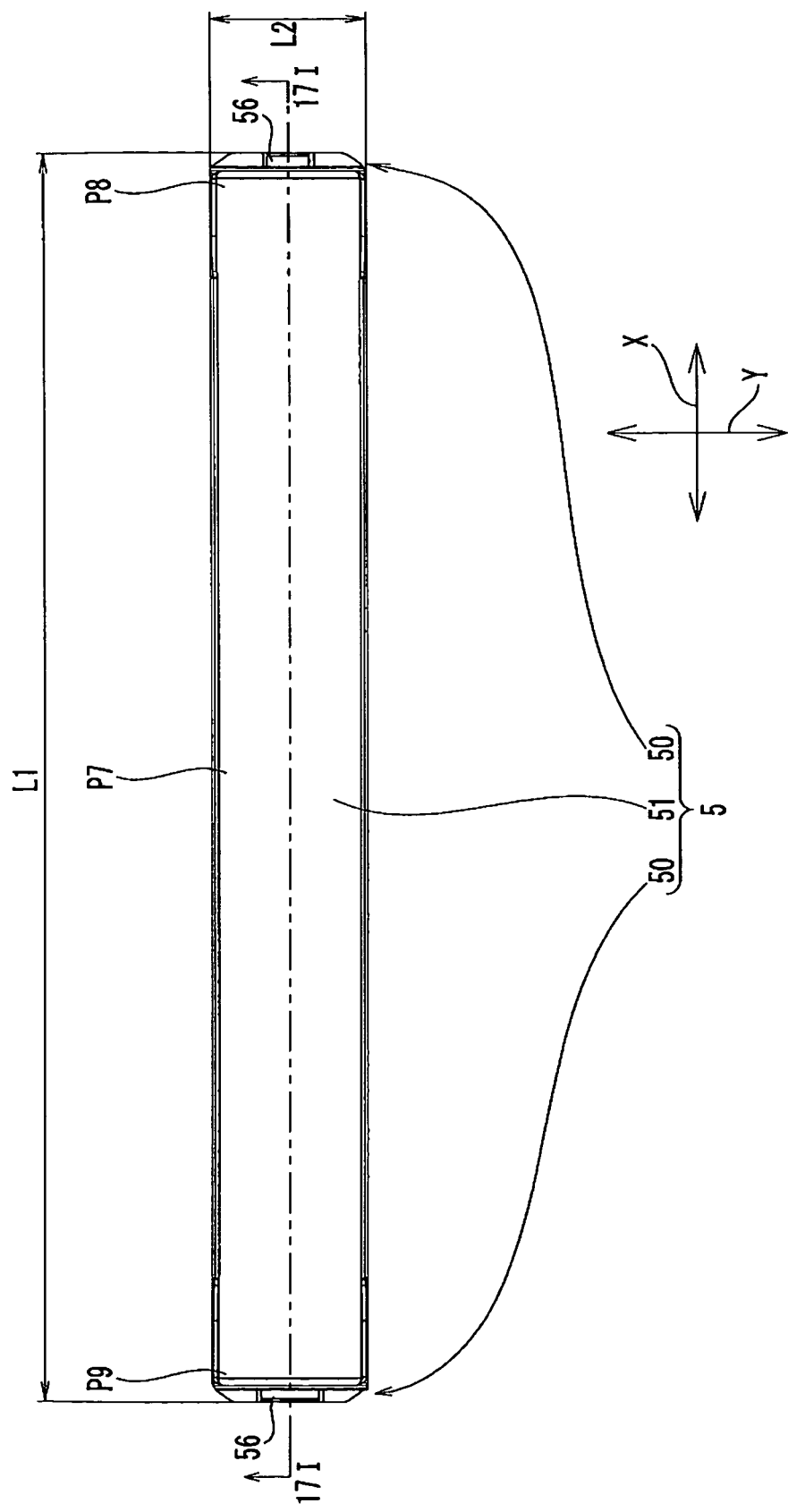
FIG. 17 is a plan view of a spacer according to another example.
Figure 18:
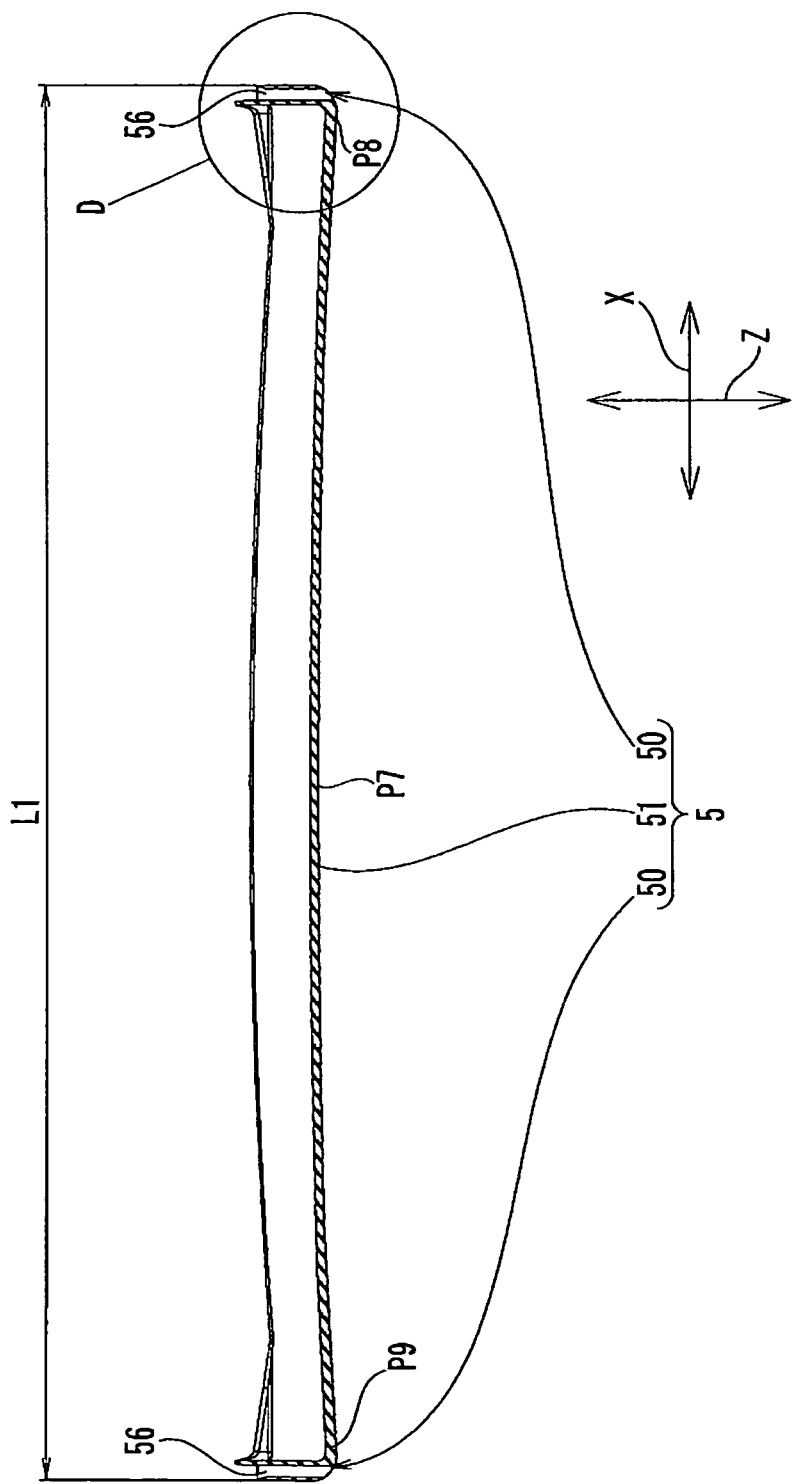
FIG. 18 is a sectional view of FIG. 17 taken along 17I-17I.

More specifically, as shown in FIGS. 17 and 18, the total length L1 of the spacer 5 is set shorter than the distance between the first walls 32 and 32 of the case body 30. The total width of L2 of the spacer 5 is set narrower than the distance between the second walls 33 and 33 of the case body 30. Based on this configuration, as shown in FIG. 18, the spacer 5 is formed into a curved shape concave to the one side in the third direction. That is, the bridge portion 51 is formed into a shape concave toward the other side in the third direction.

Figure 19:
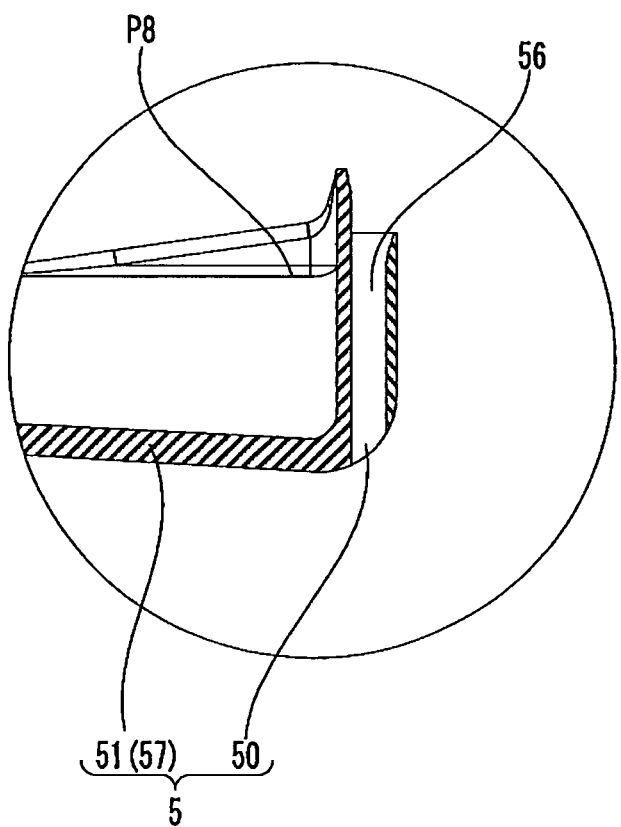
FIG. 19 is an enlarged view of a D part in FIG. 18.

This allows the positive electrode coupler 50 and the negative electrode coupler 50 to be disposed on the one side in the third direction with respect to the central portion P7 of the bridge portion 51. In this case, as shown in FIGS. 18 and 19, the receiving portion 56 of each of the positive electrode coupler 50 and the negative electrode coupler 50 is a non-through hole or a through-hole (a through-hole in the Figure) formed from the other side to the one side in the third direction (with the spacer 5 housed in the case 3, formed from the surface facing the cover plate 31 toward the surface facing the bottom portion 34).

That is, the positive electrode current collector 2 and the positive electrode coupler 50 can be relatively moved in the third direction such that, with the divided center portion 24 of the second end portion P2 of the positive electrode first connecting portion 20 of the positive electrode current collector 2 held inserted into the receiving portion 56, the positive electrode coupler 50 is not subjected to the force in the third direction acting on the positive electrode current collector 2 (the force toward the bottom portion 34 of the case 3). The negative electrode current collector 2 and the negative electrode coupler 50 can be relatively moved in the third direction such that, with the divided center portion 24 of the second end portion P2 of the negative electrode first connecting portion 20 of the negative electrode current collector 2 being held inserted into the receiving portion 56, the negative electrode coupler 50 is not subjected to the force in the third direction acting on the negative electrode current collector 2 (the force toward the bottom portion 34 of the case 3).

When the positive electrode current collector 2 and the negative electrode current collector 2 fixed to the cover plate 31 are kept connected to the electrode assembly 1, the second end portion P2 of the positive electrode first connecting portion 20 of the positive electrode current collector 2 is connected to the receiving portion 56 of the positive electrode coupler 50, and the second end portion P2 of the negative electrode first connecting portion 20 of the negative electrode current collector 2 is connected to the receiving portion 56 of the negative electrode coupler 50. In this state, the spacer 5 is housed in the case body 30.

Here, the spacer 5 has the total length L1 shorter than the distance between the first walls 32 and 32 of the case body 30, and the total width L2 narrower than the second walls 33 and 33 of the case body 30. Accordingly, with the positive electrode current collector 2 and the negative electrode current collector 2 kept inserted, the spacer 5 is smoothly inserted into the case body 30.

Figure 20:
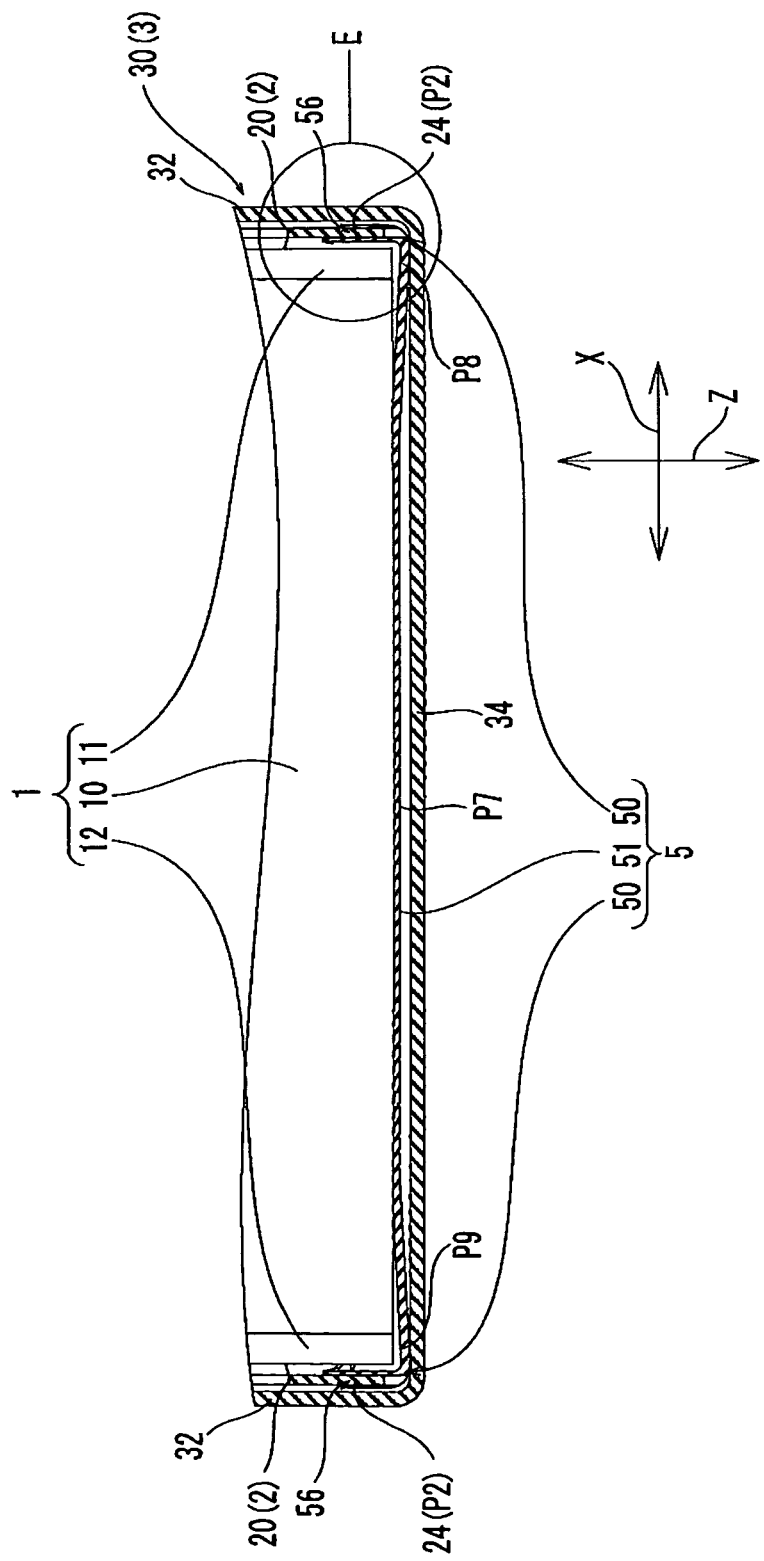
FIG. 20 is a partially sectional view of the battery cell in which the spacer is held inserted in the case body (the state before an opening of the case body is closed with a cover plate)
Figure 21:
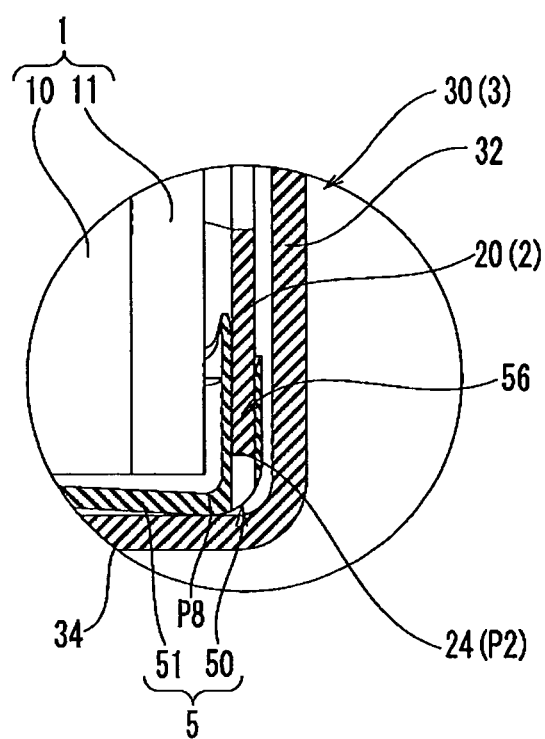
FIG. 21 is an enlarged view of an E part in FIG. 20.

As shown in FIG. 20, when the spacer 5 reaches the innermost portion of the case body 30, the central portion P7 is brought into the state where the central portion P7 is not supported by the bottom portion 34. Meanwhile, as illustrated in FIG. 21, the positive electrode coupler 50 and the negative electrode coupler 50 are supported by the bottom portion 34 while being separated from the first wall 32 (with a spacing).

Figure 22:
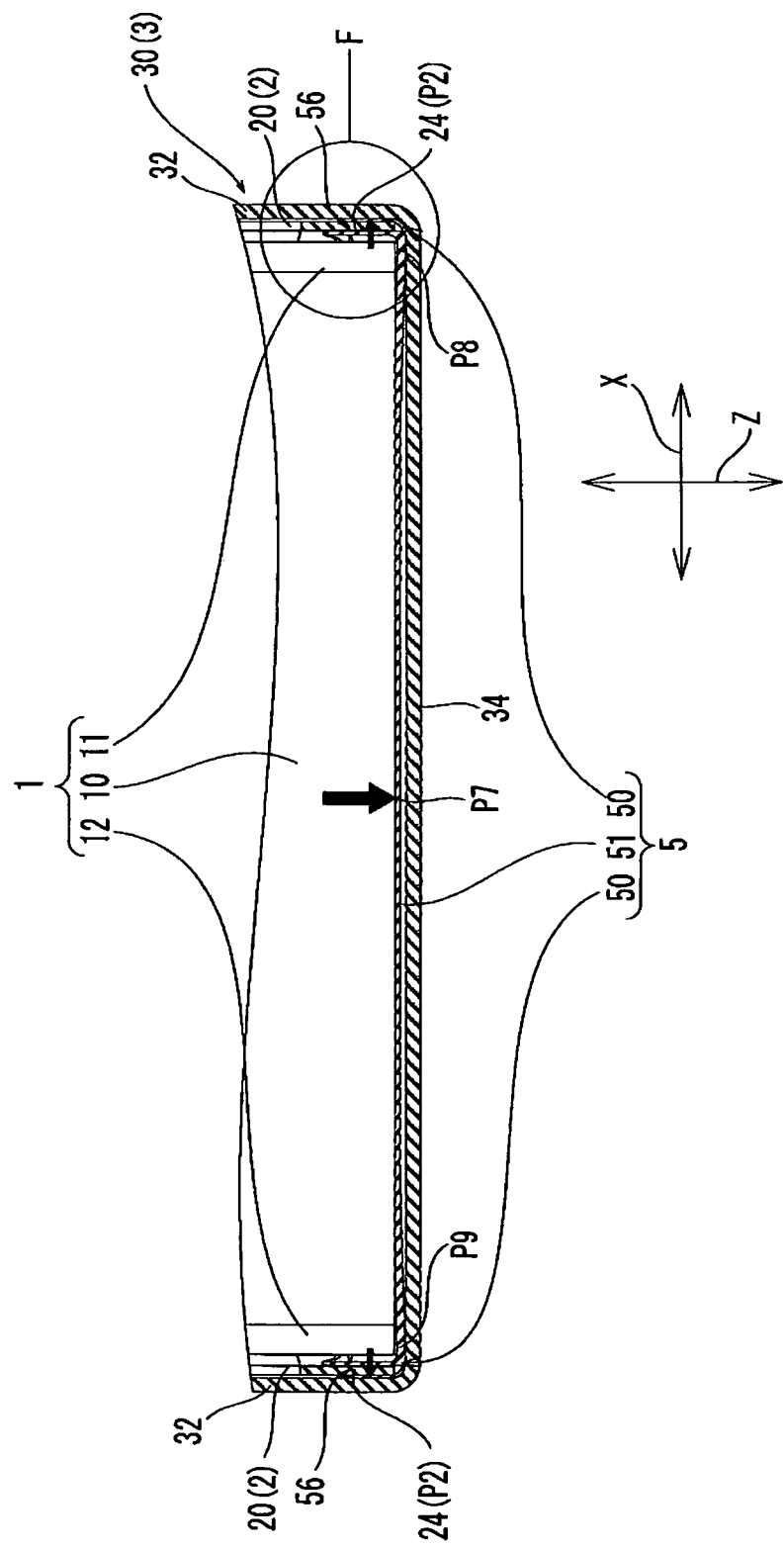
FIG. 22 is a partially sectional view of the battery cell in which the spacer is disposed at an appropriate position in the case body (in the state where the opening of the case body is closed with the cover plate)
Figure 23:
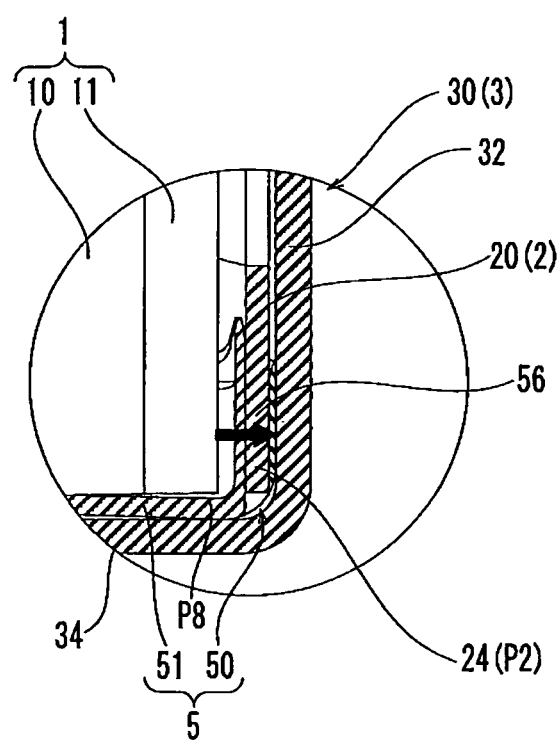
FIG. 23 is an enlarged view of an F part in FIG. 22.

The cover plate 31 is pressed against the case body 30 to be brought into close contact with the second end portions P4 and P4 of the first walls 32 and 32 and the second end portions P6 and P6 of the second walls 33 and 33 of the case body 30. Along therewith, as shown in FIGS. 22 and 23, the electrode assembly 1, which is connected to the positive electrode first connecting portion 20 of the positive electrode current collector 2 and the negative electrode first connecting portion 20 of the negative electrode current collector 2, is brought into the state of pressing the central portion P7 of the bridge portion 51 of the spacer 5 toward the bottom portion 34 of the case body 30.

As described above, the positive electrode current collector 2 and the positive electrode coupler 50 are relatively movable in the third direction, and the negative electrode current collector 2 and the negative electrode coupler 50 are relatively movable in the third direction. The positive electrode current collector 2 and the negative electrode current collector 2 do not directly press the spacer 5 toward the bottom portion 34. Thus, only the electrode assembly 1 presses the spacer 5 toward the bottom portion 34. This arrangement causes bending of the bridge portion 51 of the spacer 5 (to extend), thereby allowing the total length of the spacer 5 to extend more than the total length L1 in ordinary states.

Along therewith, the positive electrode coupler 50 presses one first wall 32 of the case body 30 to the outside. The negative electrode coupler 50 presses the other first wall 32 of the case body 30 to the outside. Accordingly, the spacer 5 is brought into the state of fitting tightly against the first walls 32 and 32 of the case body 30.

The opening 35 of the case body 30 is sealed with the cover plate 31. Accordingly, the positive electrode current collector 2 (positive electrode first connecting portion 20) fixed to the cover plate 31, and the electrode assembly 1 fixed to the negative electrode current collector 2 (negative electrode first connecting portion 20) press the central portion (the central portion P7 of the bridge portion 51) of the spacer 5 toward the bottom portion 34 of the case body 30, thereby extending the spacer 5. That is, the opening 35 of the case body 30 is thus sealed with the cover plate 31, which brings the spacer 5 into the state of fitting tightly against the first walls 32 and 32 of the case body 30 and fixed in the case 3.

Accordingly, also in the battery cell Ps having the above configuration, the swaying or movement of the positive electrode current collector 2 and the negative electrode current collector 2 is prevented or reduced. The swaying or movement of the electrode assembly 1 connected to the positive electrode current collector 2 and the negative electrode current collector 2, of which swaying or movement is prevented or reduced, is also prevented or reduced.

In the second embodiment, the distal portion (divided center portion 24) of the first connecting portion 20 of each of the positive electrode current collector 2 and the negative electrode current collector 2 is thus inserted into the corresponding receiving portion 56 of the spacer 5, thereby allowing the spacer 5 to be coupled to the positive electrode current collector 2 and the negative electrode current collector 2. However, the present invention is not limited thereto. For instance, the entirety of the second end portion P2 of the first connecting portion 20 of each of the positive electrode current collector 2 and the negative electrode current collector 2 may be inserted into the receiving portion 56 of the spacer 5, thereby allowing the spacer 5 to be coupled to the positive electrode current collector 2 and the negative electrode current collector 2.

In the second embodiment, the spacer 5 is formed into the curved shape. However, the present invention is not limited thereto. For instance, the bridge portion 51 of the spacer 5 may include: a straight portion extending straightly in the first direction; and a pair of inclined portions that are arranged symmetrically with respect to the center of the straight portion and extend from the opposite ends of the straight portion to the outsides. The bridge portion 51 of the spacer 5 may include a pair of inclined portions each of which includes a first end portion and a second end portion and in which the first end portions are connected to each other while the second end portions are located away from each other in the first direction. These configurations also allow any one of the pair of couplers 50 and 50 and the central portion P7 of the bridge portion 51 to be positioned nearer to the bottom portion 34 of the case 3 than the residual one of the pair of couplers 50 and 50 and the central portion P7 of the bridge portion 51.

Accordingly, while the total length L1 of the spacer 5 is reduced more than the distance between the first walls 32 and 32 of the case body 30, the substantial total length of the spacer 5 can be secured to be equal to or greater than the distance between the first walls 32 and 32 of the case body 30. Accordingly, the other of the pair of couplers 50 and 50 and the central portion P7 of the bridge portion 51 is pressed by the pair of current collectors 2 and 2 or the electrode assembly 1 toward the bottom portion 34 of the case 3. This allows the couplers 50, 50 to press the first walls 32, 32 to the outsides, thereby firmly fixing the spacer 5 in the case 3. Accordingly, the battery cell having such a configuration can also achieve functions and advantageous effects analogous to those of the second embodiment.

In the second embodiment, the electrode assembly 1, the positive electrode current collector 2, the negative electrode current collector 2 and the spacer 5 are thus wrapped in the sheet or bag having electrically insulating properties and then inserted into the case body 30. However, the present invention is not limited thereto. For instance, based on this configuration that the spacer 5 has electrically insulating properties, the electrode assembly 1, the positive electrode current collector 2 and the negative electrode current collector 2 may be wrapped in the sheet or hag having electrically insulating properties and then inserted into the case body 30. In this case, the central portion P7 of the bridge portion 51 is supported directly by the bottom portion 34, and the coupler 50 directly presses the first wall 32 to the outside, which allows the spacer 5 to be firmly fixed in the case 3. Accordingly, the battery cell having such a configuration can also achieve functions and advantageous effects analogous to those of the second embodiment.

Third Embodiment

Figure 24:
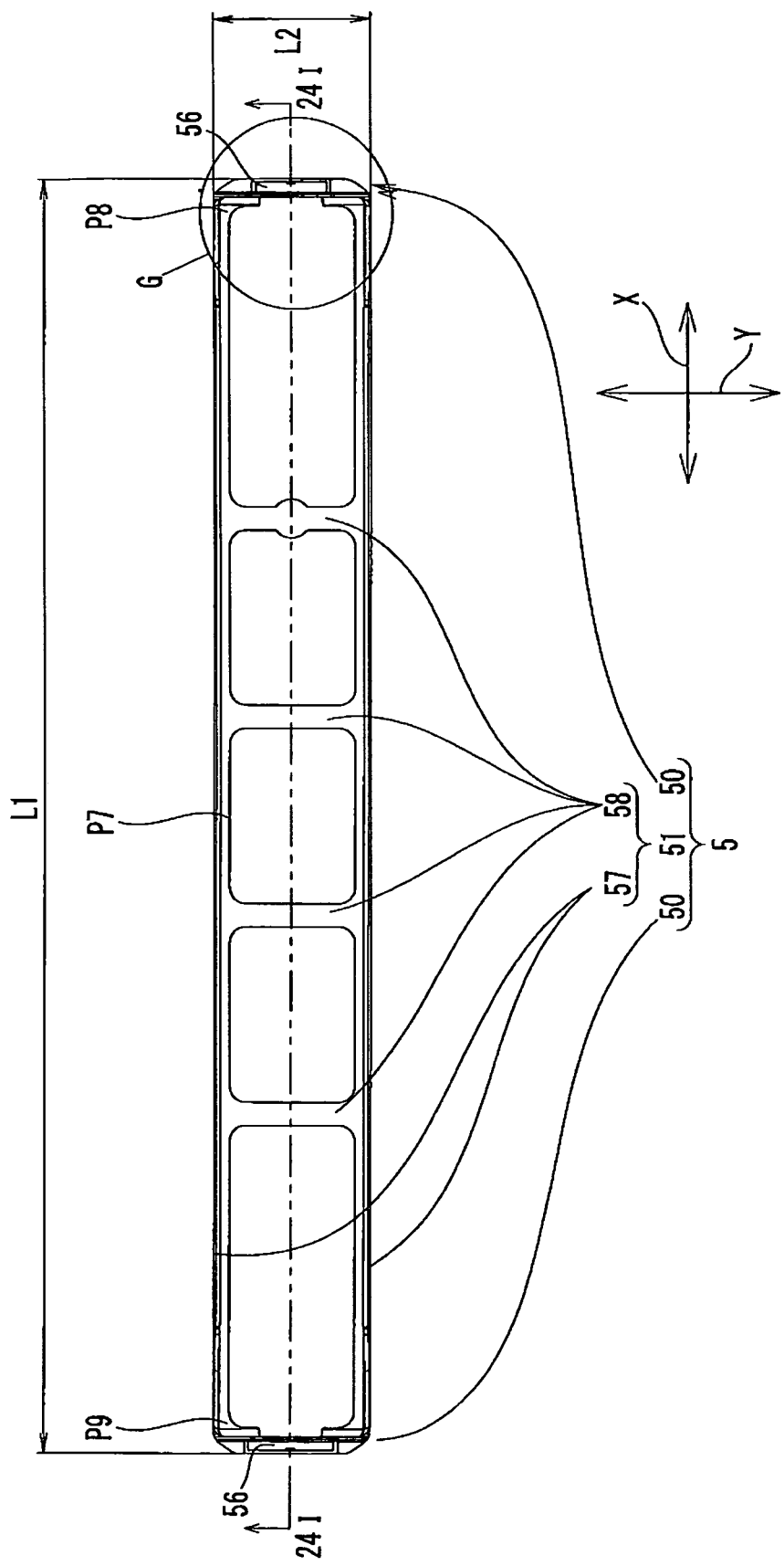
FIG. 24 is a plan view of a spacer of a battery cell according to a third embodiment.
Figure 25:
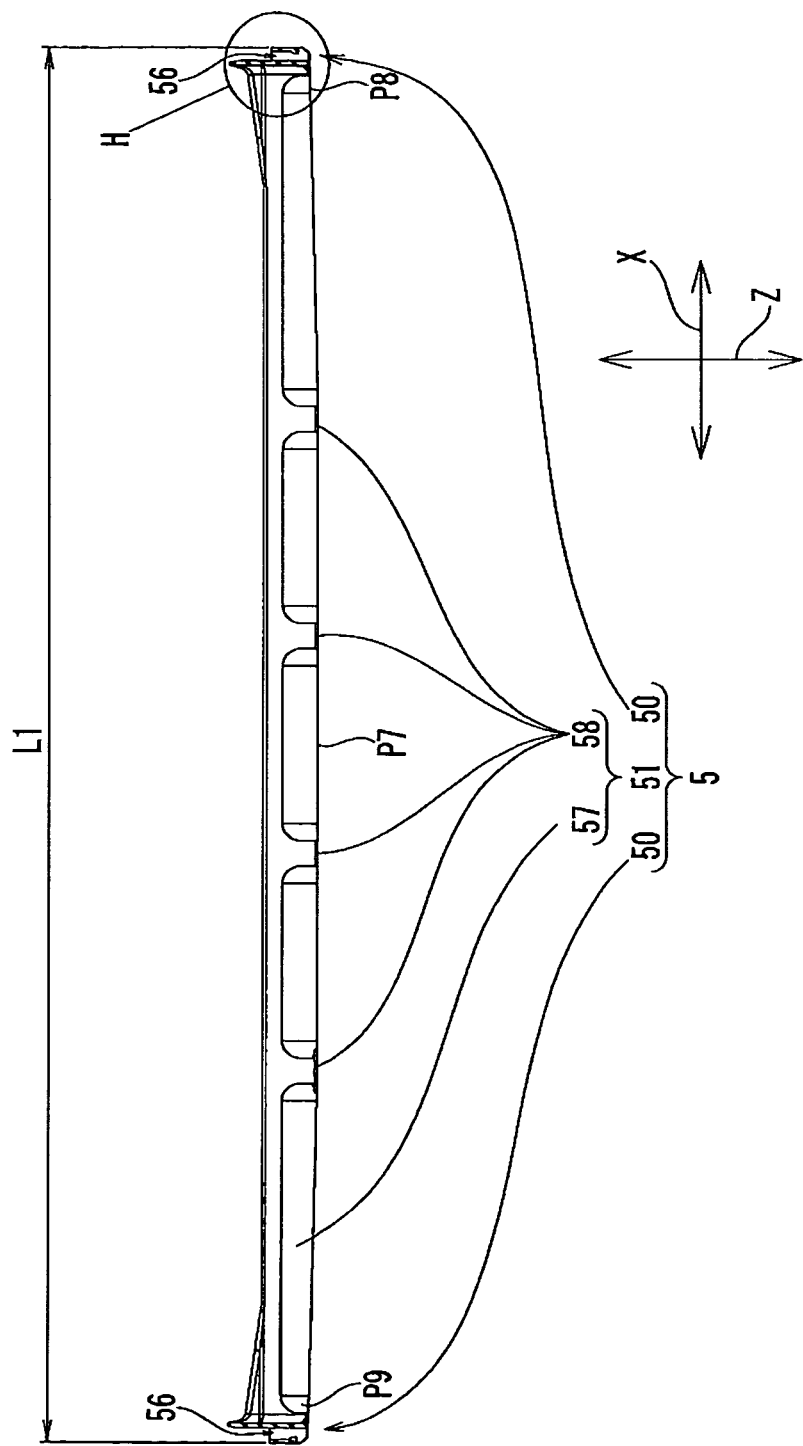
FIG. 25 is a sectional view of FIG. 24 taken along 24I-24I.

A spacer 5 is a plastic molded product having electrically insulating properties. As shown in FIGS. 24 and 25, the spacer 5 includes: a pair of couplers 50 and 50 each of which is connected to the second end portion P2 of the first connecting portion 20 of a corresponding one of the pair of current collectors 2 and 2; and a bridge portion 51 that extends in the first direction and connects the pair of couplers 50 and 50.

The total length of the spacer 5 (the length in the first direction) L1 is set shorter than the distance between the first walls 32 and 32 of the case body 30. The total width of the spacer 5 (the width in the second direction) L2 is set shorter than the distance between the second walls 33 and 33 of the case body 30.

Figure 26:
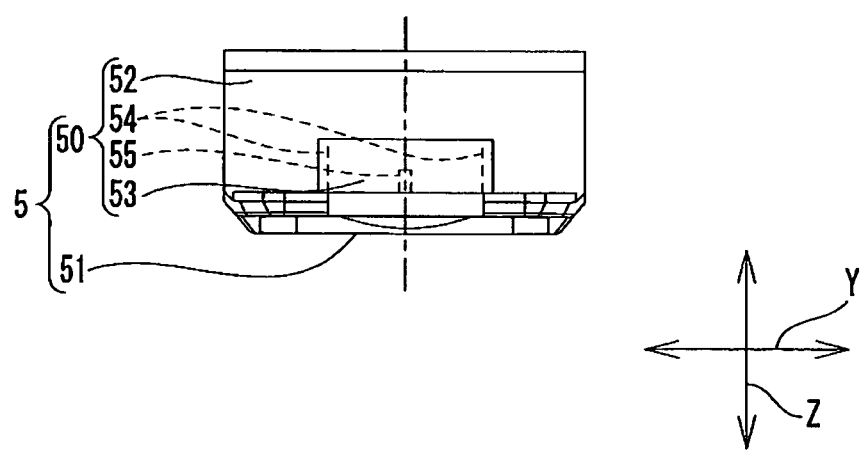
FIG. 26 is a side view of the spacer.
Figure 28:
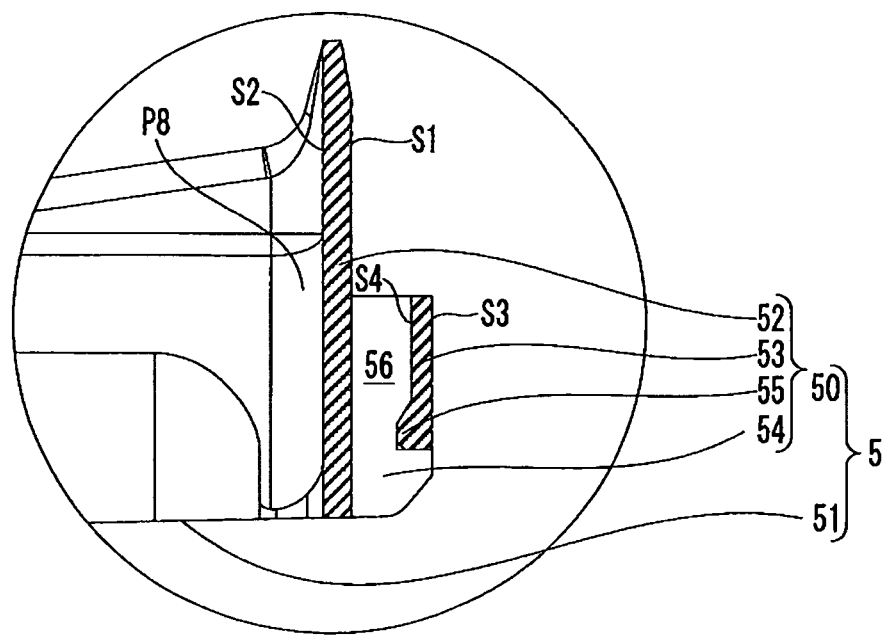
FIG. 28 is an enlarged view of an H part in FIG. 25.

As shown in FIGS. 26 to 28, one coupler (hereinafter, referred to as a positive electrode coupler) 50 includes: a main wall portion 52 coupled to the bridge portion 51; and an external wall 53 that faces the main wall portion 52 with a distance in the first direction at the outside in the first direction and is deformable at least in the first direction; a side portion 54 connecting the main wall portion 52 and the external wall 53; and a protrusion 55 provided for at least one of the main wall portion 52 and the external wall 53 so as to protrude toward the other of the main wall portion 52 and the external wall 53.

The main wall portion 52 is formed into a plate shape. The main wall portion 52 has a first surface S1 facing the outside in the first direction; and a second surface S2 on the opposite side of the first surface S1. The length of the main wall portion 52 in the second direction is set longer than the length of the positive electrode first connecting portion 20 in the second direction, and shorter than the distance between the second walls 33 and 33 of the case body 30.

The external wall 53 is formed into a plate shape. The external wall 53 has a first surface S3 facing the outside in the first direction, and a second surface S4 on the opposite side of the first surface S3. The external wall 53 is formed thinner than the main wall portion 52. This allows the external wall 53 to be deformable in the first direction. The length of the external wall 53 in the second direction is formed longer (in actuality, slightly longer) than the length of the divided center portion 24 of the positive electrode first connecting portion 20 in the second direction. In contrast, the length of the external wall 53 in the third direction is set less than or equal to half the length of the main wall portion 52 in the third direction. The external wall 53 is disposed facing a bottom-half region of the main wall portion 52 in the third direction. The external wall 53 is disposed with a distance to the main wall portion 52. This distance is equal to or greater than the thickness of the positive electrode first connecting portion 20 of the positive electrode current collector 2 in the first direction. The external wall 53 is disposed with a distance to the main wall portion 52. This distance is slightly wider than the thickness of the positive electrode first connecting portion 20.

The side portion 54 includes a first end portion (no reference numeral assigned), and a second end portion (no reference numeral assigned) on the opposite side of the first end portion. The side portion 54 extends from the external wall 53 toward the main wall portion 52. The first end portion of the side portion 54 is connected to the second surface S4 of the external wall 53. The second end portion of the side portion 54 is connected to the first surface S1 of the main wall portion 52.

Two side portions 54 are disposed with a distance therebetween in the second direction. Each side portion 54 is provided in conformity with the arrangement of the notch 23 provided at the second end portion P2 of the positive electrode first connecting portion 20. The side portion 54 is formed to have a thickness in the second direction smaller than the width (slit width) of the notch 23 of the positive electrode first connecting portion 20. Accordingly, the side portion 54 is insertable into the notch 23 provided at the second end portion P2 of the positive electrode first connecting portion 20. That is, the two side portions 54 and 54 allow the divided center portion 24 formed at the second end portion P2 of the positive electrode first connecting portion 20 to be inserted therebetween.

Accordingly, the main wall portion 52, the external wall 53 and the side portion 54 of the positive electrode coupler 50 form a receiving portion 56 into which the second end portion P2 of the first connecting portion 20 of the positive electrode current collector 2 penetrates in the third direction.

The protrusion 55 is partially provided for at least any one of the main wall portion 52 and the external wall 53. In this embodiment, the protrusion 55 is provided on the second surface S4 of the external wall 53. More specifically, the protrusion 55 is provided at a position displaced to one side in the third direction (the side facing the bottom portion 34) at the central portion of the external wall 53 in the second direction. The protrusion amount (length) of the protrusion 55 is set smaller than the distance between the main wall portion 52 and the external wall 53. In this embodiment, the protrusion amount (length) of the protrusion 55 is set to be about half or one third of the distance between the main wall portion 52 and the external wall 53.

The protrusion 55 is formed such that the protrusion amount (length) gradually decreases toward the opposite direction (the side opposite to the cover plate 31) of the direction in which the second end portion P2 of the positive electrode first connecting portion 20 is inserted into between the main wall portion 52 and the external wall 53.

The other coupler (hereinafter, referred to as a negative electrode coupler) 50 is formed into a shape identical to that of the positive electrode coupler 50. Accordingly, the description on the positive electrode coupler 50 can serve as description on the negative electrode coupler 50 by means of changing "positive electrode" in the sentences into "negative electrode". The description on the positive electrode coupler 50 thus serves as description on the negative electrode coupler 50.

Referring again to FIGS. 24 and 25, the bridge portion 51 extends in the first direction. The bridge portion 51 includes a first end portion P8 in the first direction, and a second end portion P9 in the first direction. The bridge portion 51 includes: the pair of beam portions 57 and 57 disposed with a distance therebetween in the second direction; and a plurality of beam connecting portions 58, . . . that connect the pair of beam portions 57 and 57 to each other. The beam portion 57 is formed so as to align the longitudinal direction with the first direction. In each beam connecting portion 58, the surface facing the bottom portion 34 is formed into the planar shape, and on the other hand, the surface facing the cover plate 31 is formed into the circular arc shape in conformity with the circular arc portion at the periphery of the electrode assembly 1. The beam connecting portion 58 is disposed along the edges of the beam portions 57 and 57.

The bridge portion 51 is formed such that a central portion P7 in the first direction is displaced to the one side in the third direction with respect to the first end portion P8 and the second end portion P9. That is, the bridge portion 51 is formed such that, while the bridge portion 51 is kept housed in the case body 30, the portion including the central portion P7 in the first direction is supported by the bottom portion 34, and the first end portion P8 and the second end portion P9 of the bridge portion 51, the positive electrode coupler 50 and the negative electrode coupler 50 are disposed with a distance to the bottom portion 34.

The first end portion P8 of the bridge portion 51 is connected to the second surface S2 of the main wall portion 52 of the positive electrode coupler 50. The second end portion P9 of the bridge portion 51 is connected to the second surface S2 of the main wall portion 52 of the negative electrode coupler 50.

As described above, the total length L1 of the spacer 5 is set shorter than the distance between the first walls 32 and 32 of the case body 30. In contrast, as described above, the total width of L2 of the spacer 5 is set shorter than the distance between the second walls 33 and 33 of the case body 30.

According to the spacer 5 having the above configuration, the second end portion P2 of the positive electrode first connecting portion 20 is inserted into between the main wall portion 52 and the external wall 53 of the positive electrode coupler 50. This allows the second end portion P2 of the positive electrode first connecting portion 20 to interfere with the protrusion 55 of the positive electrode coupler 50, thereby deforming (expanding) the external wall 53 of the positive electrode coupler 50 to the outside in the first direction. The second end portion P2 of the negative electrode first connecting portion 20 is inserted into between the main wall portion 52 and the external wall 53 of the negative electrode coupler 50. This allows the second end portion P2 of the negative electrode first connecting portion 20 to interfere with the protrusion 55 of the negative electrode coupler 50, thereby deforming (expanding) the external wall 53 of the negative electrode coupler 50 to the outside in the first direction.

That is, the second end portion P2 of the positive electrode first connecting portion 20 is connected to the positive electrode coupler 50, and the second end portion P2 of the negative electrode first connecting portion 20 is connected to the negative electrode coupler 50, thereby allowing the total length L1 of the spacer 5 having the above configuration to be longer than the total length L1 in ordinary states. Thus, the total length L1 of the spacer 5 is changed to a length more than the distance between the first walls 32 and 32 of the case body 30. Accordingly, in the case body 30, the external wall 53 of the positive electrode coupler 50 presses the one first wall 32 of the case body 30 to the outside, and the external wall 53 of the negative electrode coupler 50 presses the other first wall 32 of the case body 30 to the outside.

Figure 29:
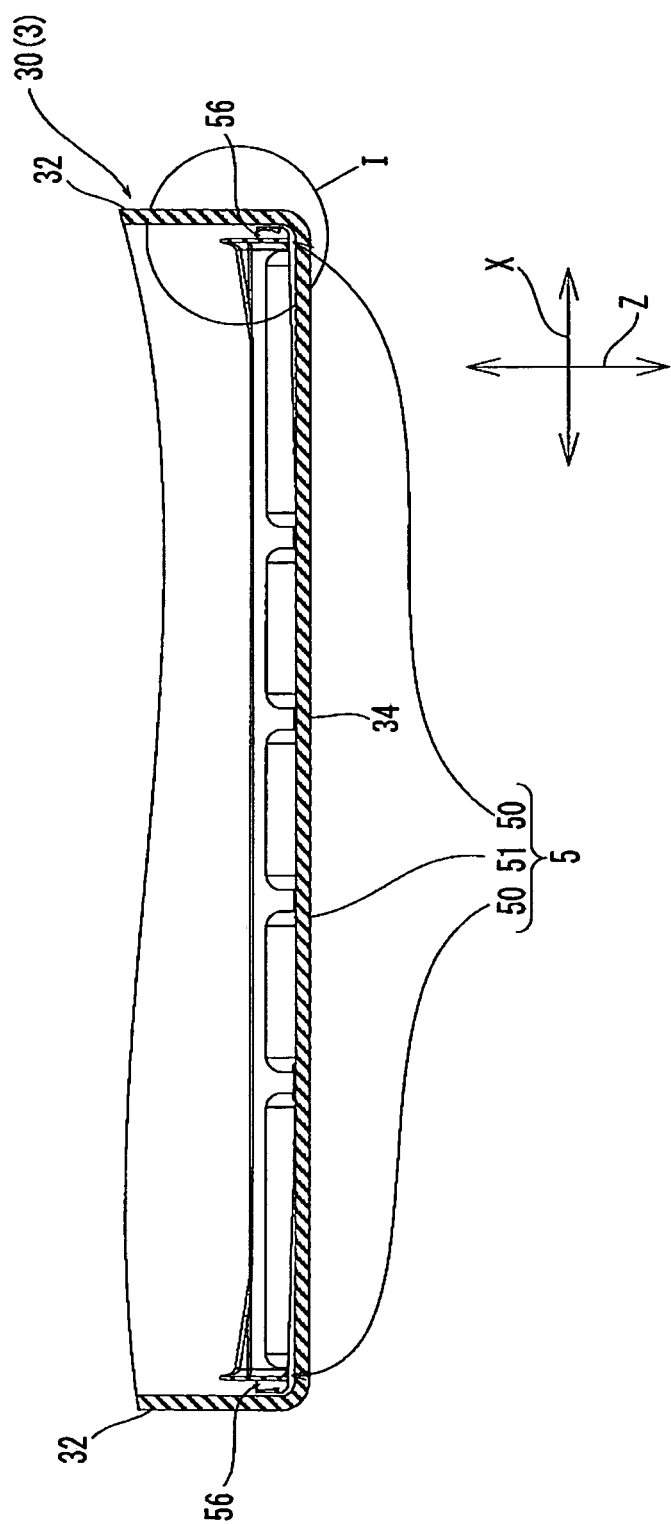
FIG. 29 is a partially sectional view of the battery cell in which only a spacer is disposed in a case body (in the state before an electrode assembly is arranged in the case body)
Figure 30:
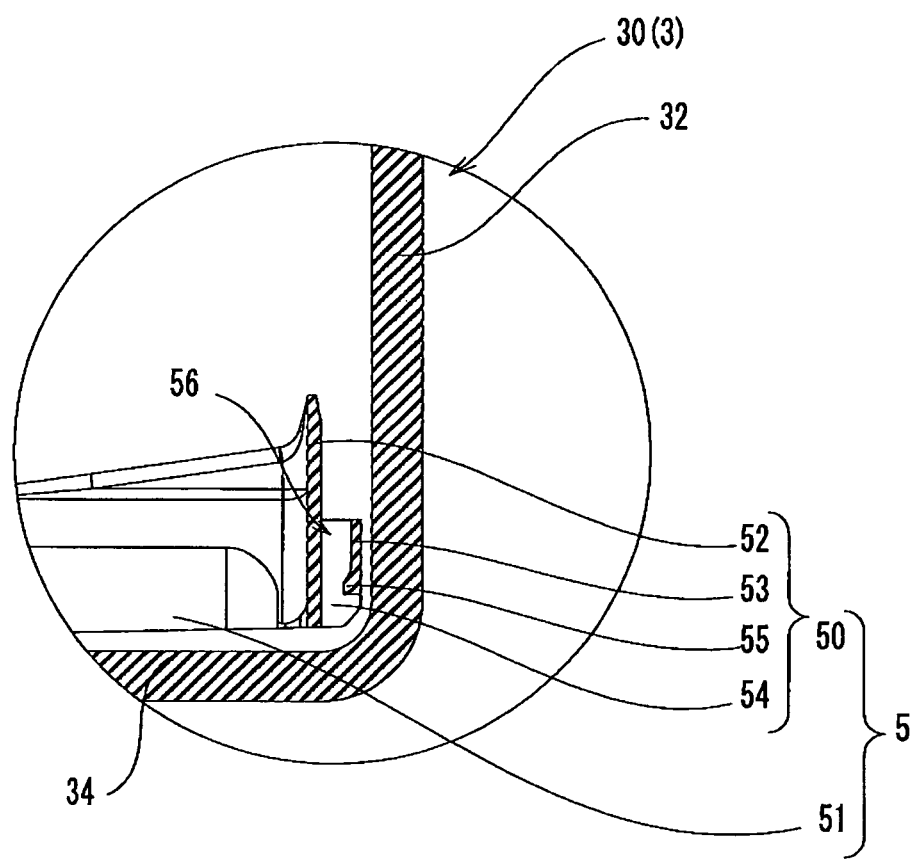
FIG. 30 is an enlarged view of an I part in FIG. 29.

More specifically, as shown in FIG. 29, the spacer 5 is housed in the case body 30 before being coupled to the positive electrode current collector 2 and the negative electrode current collector 2. As described above, the spacer 5 has the total length L1 shorter than the distance between the first walls 32 and 32, and the total width L2 shorter than the distance between the second walls 33 and 33. Accordingly, the spacer 5 does not interfere with the case body 30, and is smoothly inserted into the case body 30. As shown in FIG. 30, the spacer 5 in the case body 30 is therefore disposed so as to form a spacing with the first wall 32 and a spacing with the second wall 33.

Figure 31:
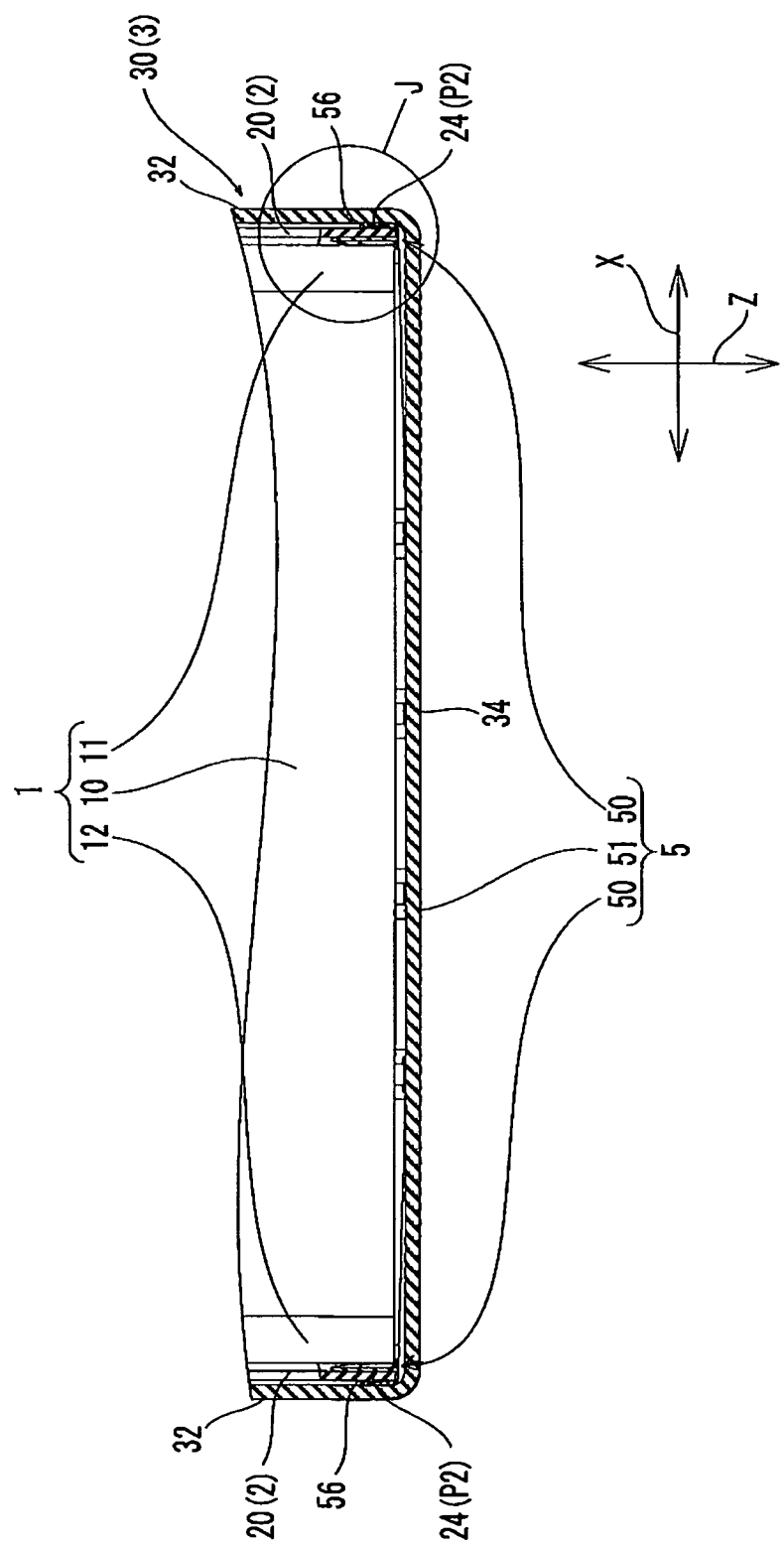
FIG. 31 is a partially sectional view of the battery cell in which the electrode assembly, the current collectors and the spacer are disposed at appropriate positions in the case body (in the state where the opening of the case body is closed with the cover plate).

As shown in FIG. 31, the second end portion P2 of the positive electrode first connecting portion 20 of the positive electrode current collector 2 that is fixed to the cover plate 31 is coupled to the receiving portion 56 of the positive electrode coupler 50 of the spacer 5. The second end portion P2 of the negative electrode first connecting portion 20 of the negative electrode current collector 2 that is fixed to the cover plate 31 is coupled to the receiving portion 56 of the negative electrode coupler 50 of the spacer 5.

Figure 32:
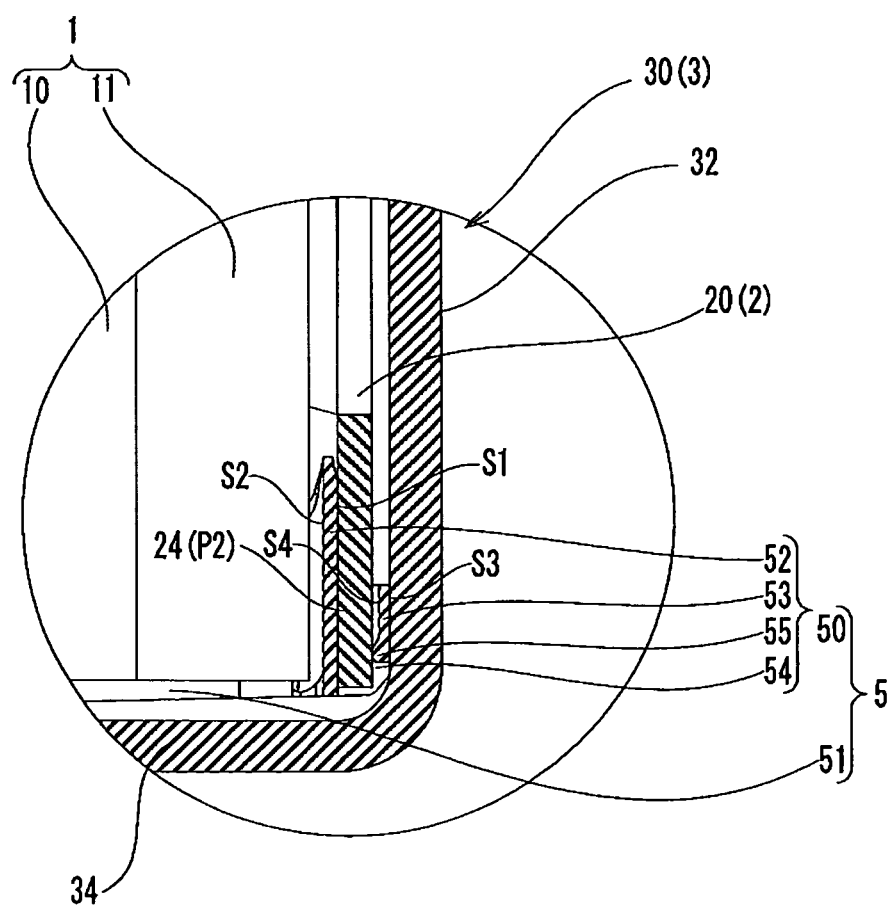
FIG. 32 is an enlarged view of a J part in FIG. 31.

Here, as shown in FIG. 32, the second end portion P2 of the positive electrode first connecting portion 20 is inserted into the receiving portion 56, while interfering with the protrusion 55 of the positive electrode coupler 50. That is, the second end portion P2 of the positive electrode first connecting portion 20 advances in the receiving portion 56, while pressing the protrusion 55 to the outside in the first direction. Accordingly, the external wall 53 is pressed by the force applied from the protrusion 55 to the outside in the first direction, and deformed so as to dispose the portion corresponding to the protrusion 55 at the outermost site.

The second end portion P2 of the negative electrode first connecting portion 20 is inserted into the receiving portion 56, while interfering with the protrusion 55 of the negative electrode coupler 50. That is, the second end portion P2 of the negative electrode first connecting portion 20 advances in the receiving portion 56, while pressing the protrusion 55 to the outside in the first direction. Accordingly, the external wall 53 is pressed by the force applied from the protrusion 55 to the outside in the first direction, and deformed so as to dispose the portion corresponding to the protrusion 55 at the outermost site.

Accordingly, the spacer 5 is brought into the state where the external wall 53 of the positive electrode coupler 50 and the external wall 53 of the negative electrode coupler 50 protrude in the respective opposite directions. Thus, the total length L1 of the spacer 5 is longer than the total length L1 in the ordinary states. However, since the case body 30 has rigidity, the total length L1 of the spacer 5 retrains the length equal to the distance between the first walls 32 and 32 of the case body 30. That is, the external wall 53 of the positive electrode coupler 50 and the external wall 53 of the negative electrode coupler 50 protrude in the respective opposite directions, which allows the external wall 53 of the positive electrode coupler 50 to press the one first wall 32 of the case body 30 to the outside, while allowing the external wall 53 of the negative electrode coupler 50 to press the other first wall 32 of the case body 30 to the outside. Accordingly, as shown in FIG. 31, the spacer 5 is brought into the state of fitting tightly against the first walls 32 and 32 of the case body 30.

As shown in FIG. 7, the cover plate 31 is tightly welded to the second end portions P4 and P4 of the first walls 32 and 32 and the second end portions P6 and P6 of the second walls 33 and 33 of the case body 30. This allows the positive electrode current collector 2 and the negative electrode current collector 2 to be disposed at predetermined positions in the case 3, and prevents falling out of the spacer 5. Accordingly, the spacer 5 coupled with the positive electrode current collector 2 and the negative electrode current collector 2 is brought into the state of being fixed in the case body 30.

The electrode assembly 1, the positive electrode current collector 2 and the negative electrode current collector 2 are wrapped in the sheet or bag having electrically insulating properties and then inserted into the case body 30. Accordingly, the second end portion P2 of the positive electrode first connecting portion 20 and the second end portion P2 of the negative electrode first connecting portion 20 penetrate the sheet or bag having electrically insulating properties and are coupled to the spacer 5. Since the spacer 5 is not wrapped in the sheet or bag, the external wall 53 of the positive electrode coupler 50 and the external wall 53 of the negative electrode coupler 50 are brought into the state of being in contact directly with the first wall 32. Instead, before the spacer 5 is inserted into the case body 30, the sheet or bag having electrically insulating properties may preliminarily be inserted into the case body 30. In this case, the external wall 53 of the positive electrode coupler 50 presses the one first wall 32 to the outside while sandwiching the sheet or bag having electrically insulating properties therebetween, and the external wall 53 of the negative electrode coupler 50 presses the other first wall 32 to the outside while sandwiching the sheet or bag having electrically insulating properties therebetween.

As described above, when the spacer 5 is fixed in the case 3, the second end portion P2 of the positive electrode first connecting portion 20 of the positive electrode current collector 2 and the second end portion P2 of the negative electrode first connecting portion 20 of the negative electrode current collector 2 are brought into the state of being fixed to the case 3 via the spacer 5. This fixation prevents or reduces swaying or movement of the positive electrode current collector 2 and the negative electrode current collector 2. Furthermore, this fixation also prevents or reduces swaying or movement of the electrode assembly 1 connected to the positive electrode current collector 2 and the negative electrode current collector 2, of which swaying or movement is prevented or reduced.

Accordingly, even when vibrations are applied from the outside to the battery cell Ps, the relative arrangement between the positive electrode current collector 2 and the electrode assembly 1 and the relative arrangement between the negative electrode current collector 2 and the electrode assembly 1 are kept constant or substantially constant. As a result, in the positive electrode current collector 2 and the negative electrode current collector 2, bending actions hardly occur at the second connecting portion 21 fixed to the cover plate 31 and in proximity to the boundary between the second connecting portion 21 and the first connecting portion 20. Furthermore, the connecting portion between the electrode assembly 1 and the first connecting portion 20 of the current collector 2 is hardly twisted. This prevents the positive electrode current collector 2, the negative electrode current collector 2 and the electrode assembly 1 from being broken, even when the battery cell Ps is used in a vibrating environment.

As described above, the battery cell Ps according to this embodiment can exert an excellent effect capable of securely preventing breakage of the current collector 2 and the electrode assembly 1 due to vibrations.

In the battery cell Ps according to this embodiment, the size (mold size) of the spacer 5 in the first direction and the size in the second direction in ordinary states are set smaller than the inner dimensions of the case body 30. This setting allows the spacer 5 to be smoothly inserted into the case body 30. Accordingly, deterioration in working efficiency during assembly can be prevented.

In the battery cell Ps according to this embodiment, both the protrusion 55 of the positive electrode coupler 50 and the protrusion 55 of the negative electrode coupler 50 are formed such that the protruding amount (length) of the protrusions gradually decrease in the directions opposite to the directions in which the first connecting portion 20 of the current collectors 2 is inserted into the respective receiving portions 56. This facilitates insertion of the first connecting portion 20 of the current collector 2 into the receiving portion 56.

The present invention is not limited to the third embodiment. Instead, it is a matter of course that the present invention can be appropriately modified within a scope without departing from the gist of the present invention.

For instance, in the third embodiment, the distal portions (divided center portions 24) of the first connecting portions 20 of the positive electrode current collector 2 and the negative electrode current collector 2 are inserted into the respective receiving portions 56 of the spacer 5. This enables coupling of the spacer 5 to the positive electrode current collector 2 and the negative electrode current collector 2. However, the present invention is not limited thereto. For instance, the entirety of the second end portions P2 of the first connecting portions 20 of the positive electrode current collector 2 and the negative electrode current collector 2 may be inserted into the respective receiving portions 56 of the spacer 5, thereby allowing the spacer 5 to be coupled to the positive electrode current collector 2 and the negative electrode current collector 2. In this case, the size of the external wall 53 in the first direction and the distance between the two side portions 54 and 54 are set such that the entirety of the second end portion P2 of the first connecting portion 20 can be inserted.

In the third embodiment, the protrusion 55 is provided at the external wall 53 so as to protrude toward the main wall portion 52. However, the present invention is not limited thereto. For instance, the protrusion 55 may be provided at the main wall portion 52 so as to protrude toward the external wall 53. Accordingly, the second end portion P2 of the first connecting portion 20 of the current collector 2 is inserted into between the main wall portion 52 and the external wall 53, thereby allowing the second end portion P2 of the first connecting portion 20 to interfere with the protrusion 55 and be pressed against the external wall 53. Along therewith, the second end portion P2 of the first connecting portion 20 presses the external wall 53 to the outside to thereby deform (expand) this wall. Also in this case, as with the third embodiment, the external wall 53 is thus pressed against the first wall 32, and the spacer 5 fits tightly against the first walls 32 and 32 of the case body 30 to thereby be fixed at a predetermined position in the case 3.

In the third embodiment, the protrusion 55 is provided at the external wall 53 for each of the positive electrode coupler 50 and the negative electrode coupler 50. However, the present invention is not limited thereto. Instead, one protrusion 55 may be provided at the external wall 53, and the other protrusion 55 may be provided at the main wall portion 52.

The configuration of deforming (expanding) the external wall 53 to the outside is not limited to the protrusion 55. Various configurations can be adopted as this configuration. For instance, a thickened portion at which the thickness in the first position increases may be provided at the second end portion P2 of the first connecting portion 20 of the current collector 2, thereby allowing the external 1 wall 53 to be deformed (expanded) to the outside.

In the third embodiment, the positive electrode coupler 50 and the negative electrode coupler 50 are formed into the same shape. However, the present invention is not limited thereto. Instead, only one of the positive electrode coupler 50 and the negative electrode coupler 50 may be configured such that the external wall 53 as the deformable portion is expanded by cooperation with the first connecting portion 20 of the current collector 2, and the other does not necessarily have the deformable portion.

In the third embodiment, the positive electrode coupler 50 and the negative electrode coupler 50 are provided at the respective opposite end portions of the spacer 5. However, the present invention is not limited thereto. Instead, at least one coupler 50 may be provided at a site displaced to the central portion with reference to the end portion of the spacer 5.

In the third embodiment, the coupler 50 of the spacer 5 is configured by the main wall portion 52, the external wall 53 and the pair of side portions 54 and 54, which form the receiving portion 56 penetrating in the third direction. However, the present invention is not limited thereto. For instance, the coupler 50 of the spacer 5 may include a closure portion that closes the one opening of the receiving portion 56 in addition to the main wall portion 52, the external wall 53 and the pair of side portions 54 and 54. That is, the receiving portion 56 may be a non-through-hole.

In the third embodiment, the configuration where the deformable portion and the current collector interfere with each other is described as the method where the deformable portion expands by cooperation with the current collector. However, the present invention is not limited thereto. For instance, in the configuration of connecting an insulator to a portion of the current collector for retaining insulation between the current collector and the case, it is possible to adopt a configuration where interference between the insulator and the deformable portion causes expansion of the deformable portion.

Fourth Embodiment

Figure 33:
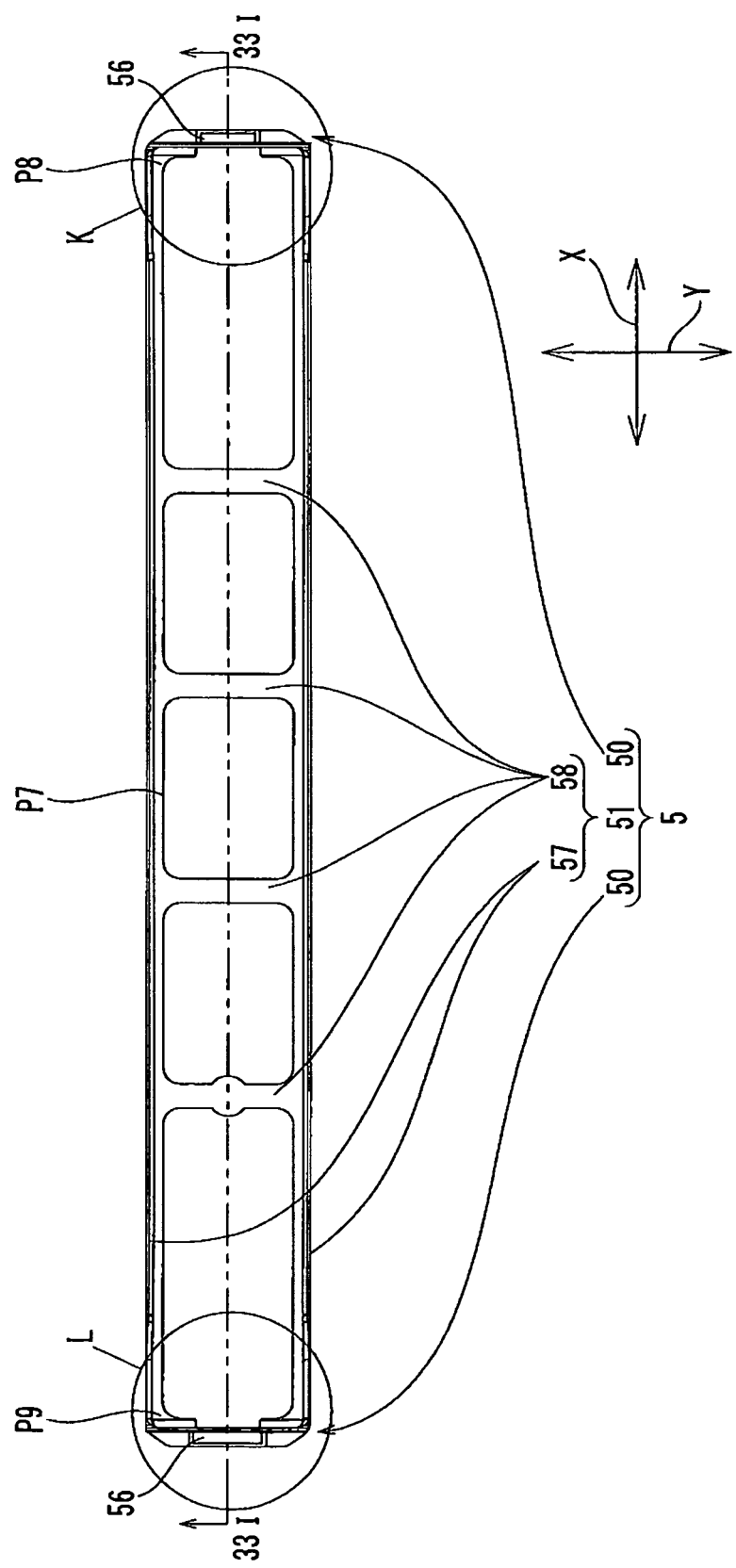
FIG. 33 is a plan view of a spacer of a battery cell according to a fourth embodiment.
Figure 34:
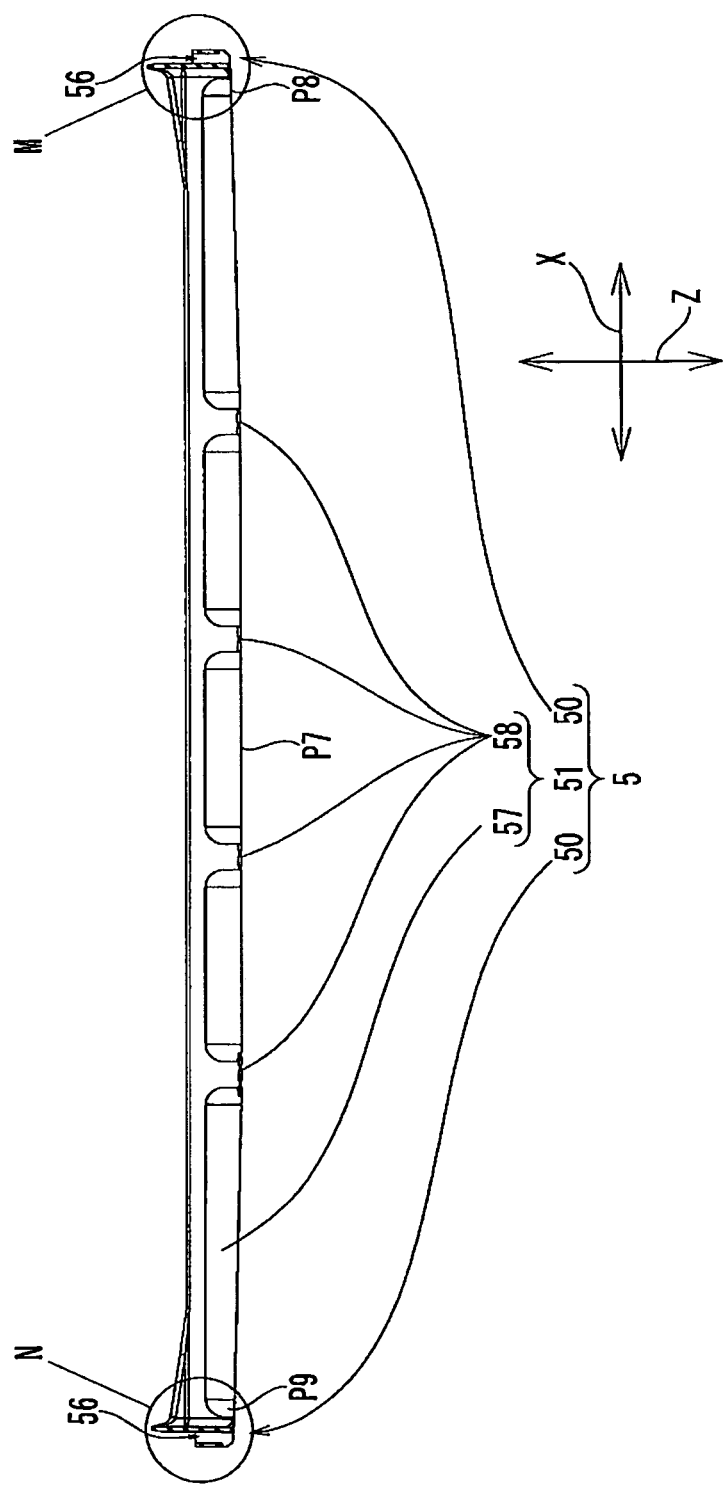
FIG. 34 is a sectional view of FIG. 33 taken along 33I-33I.

A spacer 5 is a plastic molded product having electrically insulating properties. As shown in FIGS. 33 and 34, the spacer 5 includes: a pair of couplers 50 and 50 each of which is connected to the second end portion P2 of the first connecting portion 20 of a corresponding one of the pair of current collectors 2 and 2; and a bridge portion 51 that extends in the first direction and connects the pair of couplers 50 and 50.

Any of the couplers 50, 50 can be coupled only to the second end portion P2 of the first connecting portion 20 of a corresponding one of the pair of current collectors 2 and 2. More specifically, one coupler (hereinafter, referred to as a positive electrode coupler) 50 can be coupled only to the second end portion P2 of the first connecting portion 20 of the positive electrode current collector 2. The other coupler (hereinafter, referred to as a negative electrode coupler) 50 can be coupled only to the second end portion P2 of the first connecting portion 20 of the negative electrode current collector 2.

Figure 35:
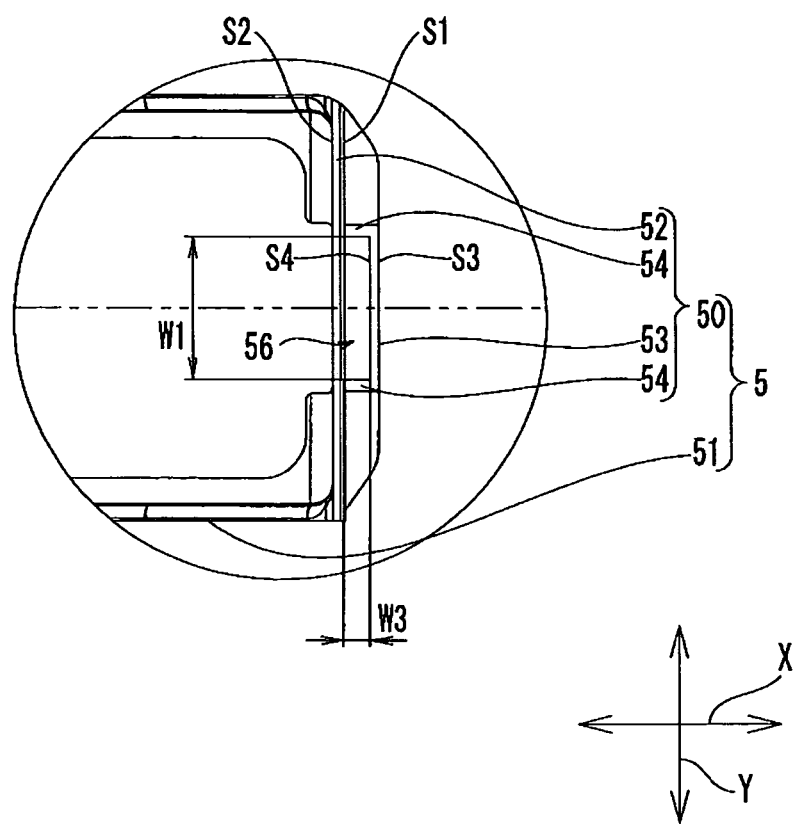
FIG. 35 is an enlarged vie of a K part in FIG. 33.
Figure 36:
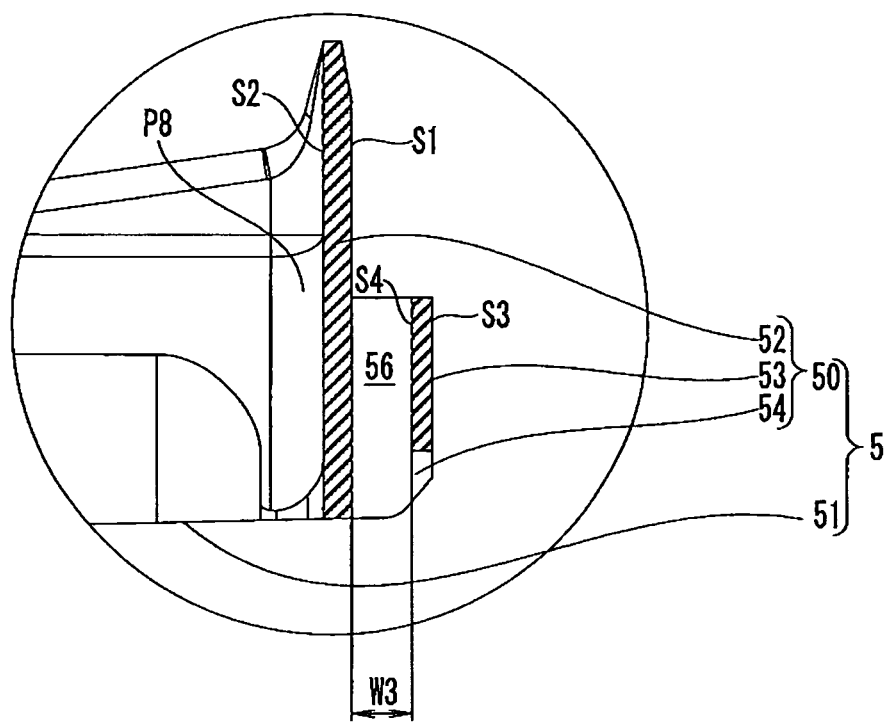
FIG. 36 is an enlarged view of an M part in FIG. 34.

As shown in FIGS. 35 and 36, the positive electrode coupler 50 includes: a main wall portion 52 connected to the bridge portion 51; and at least one side portion 54 extending from the main wall portion 52 to the outside in the first direction. More specifically, the positive electrode coupler 50 includes: the main wall portion 52 coupled to the bridge portion 51; the side portion 54 extending from the main wall portion 52 to the outside in the first direction; and an external wall 53 facing the main wall portion 52 with a distance W3 at the outside in the first direction.

The main wall portion 52 is formed into a plate shape. The main wall portion 52 includes; a first surface S1 facing to the outside in the first direction; and a second surface S2 on the opposite side of the first surface S1.

The side portion 54 is formed into a plate shape. The side portion 54 includes a first end portion (no reference numeral assigned) and a second end portion (no reference numeral assigned) on the opposite side of the first end portion. The side portion 54 is disposed along the third direction. The side portion 54 couples the main wall portion 52 and the external wall 53 to each other. That is, the first end portion of the side portion 54 is coupled to the first surface S1 of the main wall portion 52, and the second end portion of the side portion 54 is coupled to a later-mentioned second surface S4 of the external wall 53.

The side portion 54 is provided in conformity with the arrangement of the fitting portion 23 provided at the second end portion P2 of the positive electrode first connecting portion 20. The two side portions 54 are disposed with a distance W1 therebetween in the second direction. The side portion 54 is provided in conformity with the arrangement of the fitting portion 23 provided at the second end portion P2 of the positive electrode first connecting portion 20. The two side portions 54 and 54 are disposed at deployed positions (positions opposite to each other with respect to the center line of the bridge portion 51 and apart from the longitudinal direction of the bridge portion 51 by an equal distance) in the second direction with respect to the center line extending in the longitudinal direction of the bridge portion 51. The side portion 54 is formed to have a thickness in the second direction smaller than the width of the fitting portion 23 of the positive electrode first connecting portion 20. This enables the side portion 54 to be fitted with the fitting portion 23 provided at the second end portion P2 of the positive electrode first connecting portion 20. That is, the two side portions 54 and 54 allow the divided center portion 24 formed at the second end portion P2 of the positive electrode first connecting portion 20 to be inserted into between the two side portions 54 and 54.

The external wall 53 is formed into a plate shape. The external wall 53 has a first surface S3 facing to the outside in the first direction, and the second surface S4 on the opposite side of the first surface S3. The external wall 53 is disposed with a distance equal to or greater than the thickness of the positive electrode first connecting portion 20 of the positive electrode current collector 2 with respect to the main wall portion 52. The side portion 54 is connected to each of the opposite end portions of the external wall 53 in the second direction. Thus, the main wall portion 52, the external wall 53 and the two side portions 54 and 54 of the positive electrode coupler 50 form the receiving portion 56 penetrating in the third direction, into which the divided center portion 24 of the second end portion P2 of the first connecting portion 20 of the positive electrode current collector 2 is inserted.

Figure 37:
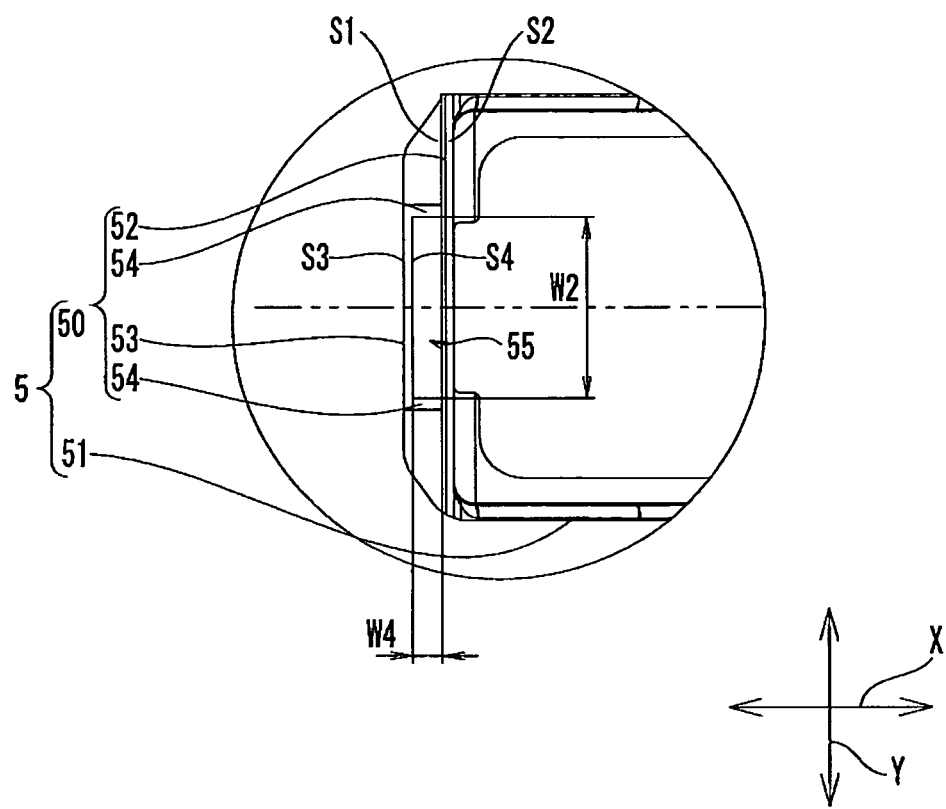
FIG. 37 is an enlarged view of an L part in FIG. 33.
Figure 38:
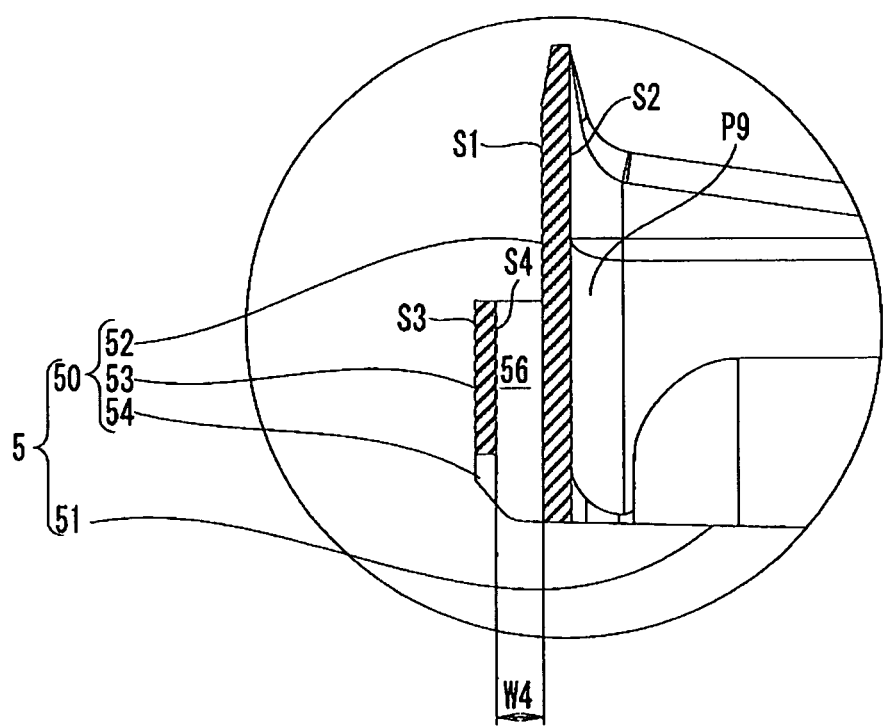
FIG. 38 is an enlarged view of an N part in FIG. 34.

The negative electrode coupler 50 (see FIGS. 37 and 38) has a basic form common to that of the positive electrode coupler 50 (see FIGS. 35 and 36). Accordingly, the description on the positive electrode coupler 50 can serve as description on the negative electrode coupler 50 by means of changing "positive electrode" in the sentences into "negative electrode". Thus, the description on the positive electrode coupler 50 can serve as the description on the negative electrode coupler 50. Along therewith, the matters or features of the negative electrode current collector 2 different from those of the positive electrode current collector 2 will herein be described.

The side portion 54 of the negative electrode coupler 50 is disposed at a position asymmetrical to the side portion 54 of the positive electrode coupler 50 with respect to a virtual axis (center of rotation) extending in the third direction. That is, the side portion 54 of the positive electrode coupler 50 and the side portion 54 of the negative electrode coupler 50 are disposed asymmetrically to each other with respect to the virtual axis (center of rotation) extending in the third direction.

More specifically, the two side portions 54 and 54 of the negative electrode coupler 50 are disposed with a distance W2 therebetween in the second direction. The distance W2 between the two side portions 54 and 54 of the negative electrode coupler 50 is different from the distance between the two side portions 54 and 54 of the positive electrode coupler 50. In this embodiment, the distance W2 between the two side portions 54 and 54 of the negative electrode coupler 50 is wider than the distance W1 between the two side portions 54 and 54 of the positive electrode coupler 50.

Also in the negative electrode coupler 50, the external wall 53 is disposed facing the main wall portion 52 with a distance corresponding to the thickness of the current collector 2 to be coupled. As described above, the thickness of the negative electrode current collector 2 is set smaller than that of the positive electrode current collector 2. Accordingly, the distance W4 between the main wall portion 52 and the external wall 53 of the negative electrode coupler 50 is narrower than the distance W3 between the main wall portion 52 and the external wall 53 of the positive electrode coupler 50. Thus, the main wall portion 52, the external wall 53 and the two side portions 54 and 54 of the negative electrode coupler 50 form the receiving portion 56 penetrating in the third direction, into which the divided center portion 24 of the second end portion P2 of the first connecting portion 20 of the negative electrode current collector 2 is inserted.

Referring again to FIGS. 33 and 34, the bridge portion 51 extends in the first direction. The bridge portion 51 includes a first end portion P8 in the first direction, and a second end portion P9 in the first direction. The bridge portion 51 includes: the pair of beam portions 57 and 57 disposed with a distance therebetween in the second direction; and a plurality of beam connecting portions 58, . . . that connect the pair of beam portions 57 and 57 to each other. The beam portion 57 is formed so as to align the longitudinal direction with the first direction. In each beam connecting portion 58, the surface facing the bottom portion 34 is formed into the planar shape, and on the other hand, the surface facing the cover plate 31 is formed into the circular arc shape in conformity with the circular arc portion at the periphery of the electrode assembly 1. The beam connecting portion 58 is disposed along the edges of the beam portions 57 and 57.

The bridge portion 51 is formed such that a central portion P7 in the first direction is displaced to the one side in the third direction (the side facing the bottom portion 34) with respect to the first end portion P8 and the second end portion P9. That is, the bridge portion 51 is formed such that, while the bridge portion 51 is kept housed in the case body 30, the portion including the central portion P7 in the first direction is supported by the bottom portion 34, and the first end portion P8 and the second end portion P9 of the bridge portion 51, the positive electrode coupler 50 and the negative electrode coupler 50 are disposed with a distance to the bottom portion 34.

The first end portion P8 of the bridge portion 51 is connected to the second surface S2 of the main wall portion 52 of the positive electrode coupler 50. The second end portion P9 of the bridge portion 51 is connected to the second surface S2 of the main wall portion 52 of the negative electrode coupler 50.

The battery cell Ps according to this embodiment is as described above. Subsequently, assembly of this battery cell Ps will be described. In order to clarify the arrangement of each configuration, for the sake of convenience, in FIGS. 39 and 40, + (plus) signs are assigned before signs 20 and 50 concerning the positive electrode first connecting portion 20 and the positive electrode coupler 50, and − (minus) signs are assigned before signs 20 and 50 concerning the negative electrode first connecting portion 20 and the negative electrode coupler 50.

Figure 39:
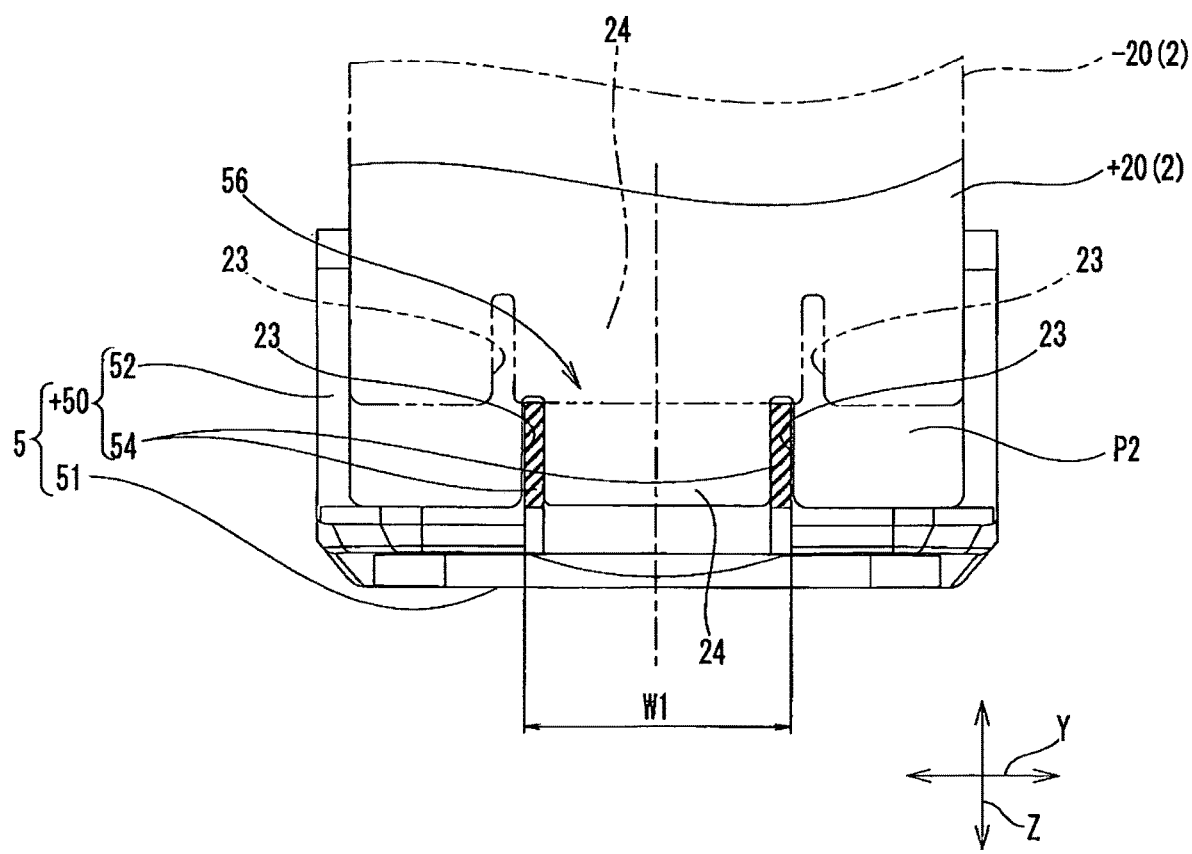
FIG. 39 shows a sectional view of a positive electrode coupler of the spacer including the current collector of the battery cell, viewed from a first direction, in which the state of connecting a positive electrode first connecting portion to a positive electrode coupler is indicated by solid lines and in which the state of a negative electrode first connecting portion to be connected to the positive electrode coupler is indicated by chain double-dashed lines.
Figure 40:
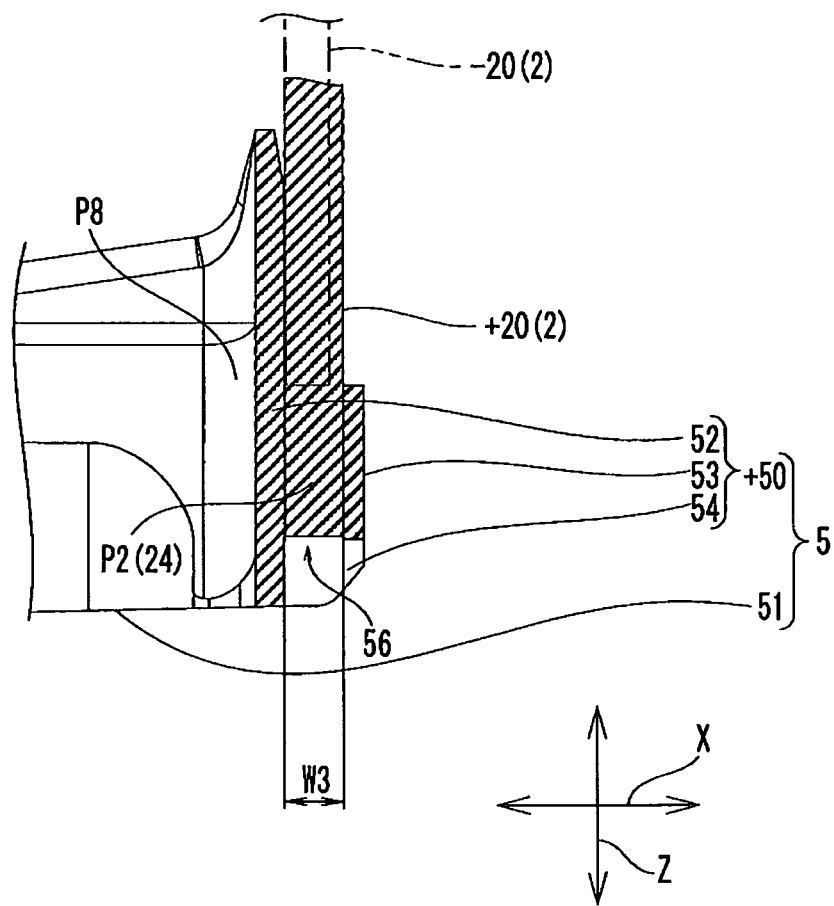
FIG. 40 shows a sectional view of a positive electrode coupler of the spacer including the current collector of the battery cell, viewed from a second direction, in which the state of connecting a positive electrode first connecting portion to a positive electrode coupler is indicated by solid lines and in which the state of a negative electrode first connecting portion to be connected to the positive electrode coupler is indicated by chain double-dashed lines.

First, as shown in FIGS. 39 and 40, the second end portion P2 of the positive electrode first connecting portion 20 of the positive electrode current collector 2 that is fixed to the cover plate 31 is coupled to the receiving portion 56 of the positive electrode coupler 50, and the second end portion P2 of the negative electrode first connecting portion 20 of the negative electrode current collector 2 that is fixed to the cover plate 31 is coupled to the receiving portion 56 of the negative electrode coupler 50. That is, the divided center portion 24 of the second end portion P2 of the positive electrode first connecting portion 20 is inserted into between the main wall portion 52 and the external wall 53 of the positive electrode coupler 50, and the divided center portion 24 of the second end portion P2 of the negative electrode first connecting portion 20 is inserted into between the main wall portion 52 and the external wall 53 of the negative electrode coupler 50.

Figure 41:
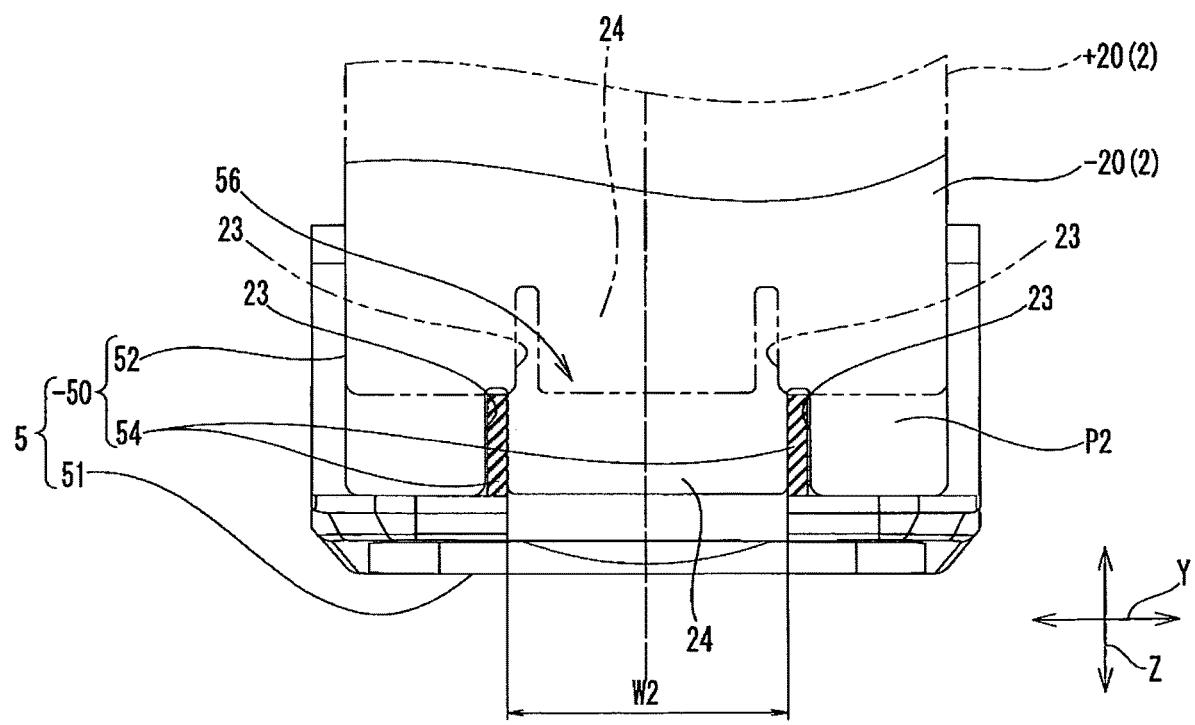
FIG. 41 shows a sectional view of a negative electrode coupler of the spacer including the current collector of the battery cell, viewed from the first direction, in which the state of connecting a negative electrode first connecting portion to a negative electrode coupler is indicated by solid lines and in which the state of a positive electrode first connecting portion to be connected to the negative electrode coupler is indicated by chain double-dashed lines.

Here, when the spacer 5 is disposed in the state where the arrangement of the second end portion P2 of the negative electrode first connecting portion 20 corresponds to the positive electrode coupler 50 and the arrangement of the second end portion P2 of the positive electrode first connecting portion 20 corresponds to the negative electrode coupler 50, the arrangement of the fitting portions 23 and 23 of the negative electrode current collector 2 does not match with the arrangement of the side portions 54 and 54 of the positive electrode coupler 50 (the state incapable of being fitted to each other) (see the chain double-dashed lines in FIG. 39). Furthermore, the arrangement of the fitting portions 23 and 23 of the positive electrode current collector 2 does not match with the arrangement of the side portions 54 and 54 of the negative electrode coupler 50 (the state incapable of being fitted to each other) (see the chain double-dashed lines in FIG. 41). Accordingly, even if the spacer 5 is erroneously disposed in assembly of the battery cell, the spacer 5 is not coupled (assembled) to the positive electrode current collector 2 and the negative electrode current collector 2.

Figure 42:
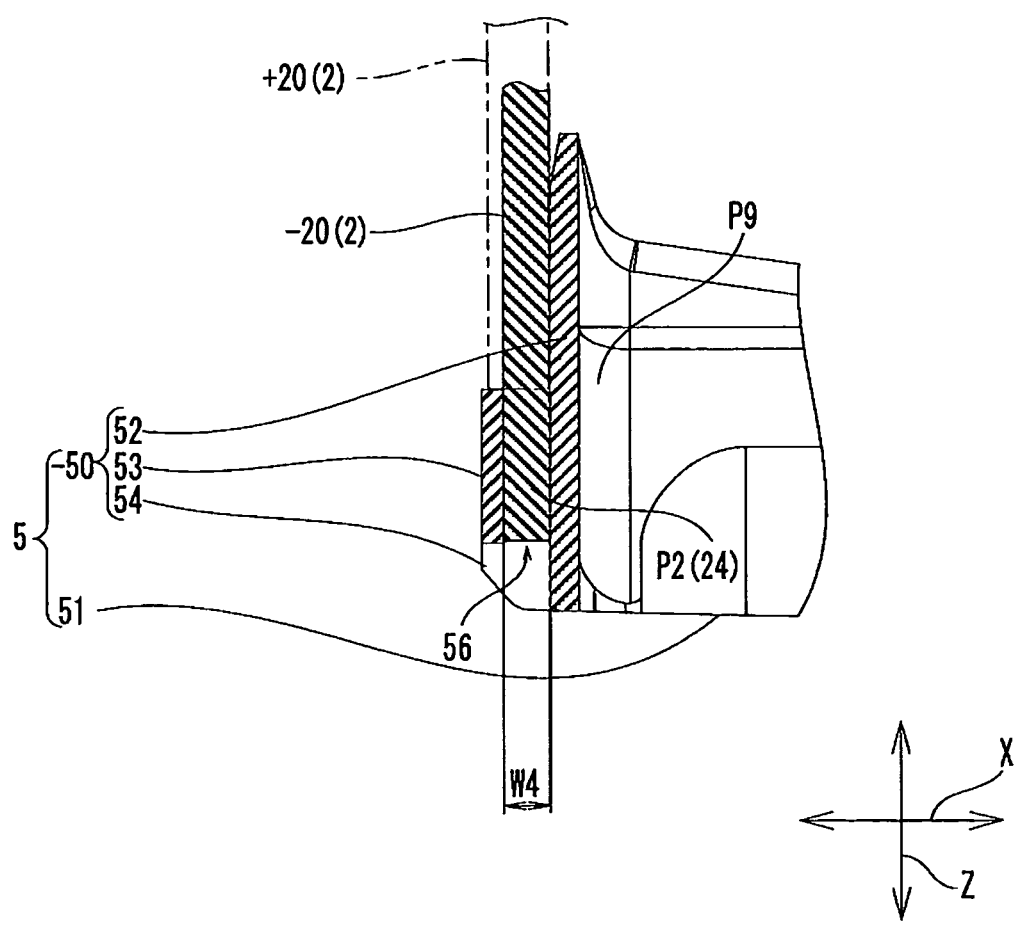
FIG. 42 shows a sectional view of the negative electrode coupler of the spacer including the current collector of the battery cell, viewed from the second direction, in which the state of connecting a negative electrode first connecting portion to a negative electrode coupler is indicated by solid lines and in which the state of a negative electrode first connecting portion to be connected to the negative electrode coupler is indicated by chain double-dashed lines.

As described above, in the positive electrode coupler 50 and the negative electrode coupler 50, the distance between the main wall portion 52 and the external wall 53 corresponds to the thickness of the current collector 2 (the thickness of the metal plate). Accordingly, in the coupler (the negative electrode coupler 50 in this embodiment) for the current collector 2 having a small thickness, not only inconformity of the arrangements of the side portion 54 and the fitting portion 23, but also the inconformity between the distance between the main wall portion 52 and the external wall 53 and the thickness of the current collector 2 prevents incorrect coupling between the coupler 50 and the current collector 2 (see the chain double-dashed lines in FIG. 42).

In the event of misarrangement of the spacer 5, rotation of the spacer 5 by 180 degrees about the virtual axis extending in the third direction allows the arrangements of the positive electrode coupler 50 and the second end portion P2 of the positive electrode first connecting portion 20 to correspond to each other, and allows the arrangements of the negative electrode coupler 50 and the second end portion P2 of the negative electrode first connecting portion 20 to correspond to each other. That is, this rotation enables the side portion 54 of the positive electrode coupler 50 and the fitting portion 23 of the positive electrode first connecting portion 20 to be fitted to each other, and enables the side portion 54 of the negative electrode coupler 50 and the fitting portion 23 of the negative electrode first connecting portion 20 to be fitted to each other. This brings the spacer 5 into the state capable of being coupled to the positive electrode current collector 2 and the negative electrode current collector 2.

When the side portion 54 of the positive electrode coupler 50 and the fitting portion 23 of the positive electrode first connecting portion 20 are fitted to each other, the divided center portion 24 of the second end portion P2 of the positive electrode first connecting portion 20 is brought into the state of extending along the main wall portion 52 of the positive electrode coupler 50. That is, the divided center portion 24 of the second end portion P2 of the positive electrode first connecting portion 20 is inserted into between the main wall portion 52 and the external wall 53 of the positive electrode coupler 50. Since the distance between the main wall portion 52 and the external wall 53 corresponds to the thickness of the positive electrode first connecting portion 20, the divided center portion 24 of the second end portion P2 of the positive electrode first connecting portion 20 becomes substantially closely in contact with the main wall portion 52 and the external wall 53. This secures the coupling between the positive electrode coupler 50 and the positive electrode current collector 2.

When the side portion 54 of the negative electrode coupler 50 and the fitting portion 23 of the negative electrode first connecting portion 20 are fitted to each other, the divided center portion 24 of the second end portion P2 of the negative electrode first connecting portion 20 is brought into the state of extending along the main wall portion 52 of the negative electrode coupler 50. That is, the divided center portion 24 of the second end portion P2 of the negative electrode first connecting portion 20 is inserted into between the main wall portion 52 and the external wall 53 of the negative electrode coupler 50. Since the distance between the main wall portion 52 and the external wall 53 corresponds to the thickness of the negative electrode first connecting portion 20, the divided center portion 24 of the second end portion P2 of the negative electrode first connecting portion 20 becomes substantially closely in contact with the main wall portion 52 and the external wall 53. This secures the coupling between the negative electrode coupler 50 and the negative electrode current collector 2.

As shown in FIG. 9, the spacer 5 is coupled to the positive electrode current collector and the negative electrode current collector 2, and then the spacer 5, the positive electrode current collector 2, the negative electrode current collector 2 and the electrode assembly 1 are housed in the case body 30. The cover plate 31 is tightly welded to the second end portions P4 and P4 of the first walls 32 and 32 and the second end portions P6 and P6 of the second walls 33 and 33 of the case body 30. Although not specifically described, it is preferred that the spacer 5 be in contact with at least any one of the first walls 32 and 32 and the second walls 33 and 33 in order to prevent movement of the spacer 5 in the case body 30.

As described above, in the battery cell Ps according to this embodiment, the second end portion P2 of the positive electrode first connecting portion 20 of the positive electrode current collector 2 and the second end portion P2 of the negative electrode first connecting portion 20 of the negative electrode current collector 2 are brought into connection with each other via the spacer 5 in the case 3. Along therewith, the positive electrode first connecting portion 20 constraints the negative electrode first connecting portion 20 via the spacer 5, and the negative electrode first connecting portion 20 constrains the positive electrode first connecting portion 20 via the spacer 5. This prevents or reduces swaying or movement of the positive electrode current collector 2 and the negative electrode current collector 2. Furthermore, this also prevents or reduces swaying or movement of the electrode assembly 1 connected to the positive electrode current collector 2 and the negative electrode current collector 2, of which swaying or movement is prevented or reduced.

Accordingly, even when vibrations are applied from the outside to the battery cell Ps, the relative arrangement between the positive electrode current collector 2 and the electrode assembly 1 and the relative arrangement between the negative electrode current collector 2 and the electrode assembly 1 are kept constant or substantially constant. As a result, in the positive electrode current collector 2 and the negative electrode current collector 2, bending actions hardly occur at the second connecting portion 21 fixed to the cover plate 31 and in proximity to the boundary between the second connecting portion 21 and the first connecting portion 20. Furthermore, the connecting portion between the electrode assembly 1 and the first connecting portion 20 of the current collector 2 is hardly twisted. This prevents the positive electrode current collector 2, the negative electrode current collector 2 and the electrode assembly 1 from being broken, even when the battery cell Ps is used in a vibrating environment.

As described above, the battery cell Ps according to this embodiment can exert an excellent effect capable of securely preventing breakage of the current collector 2 and the electrode assembly 1 due to vibrations.

In the battery cell Ps according to this embodiment, the spacer 5 is not coupled to the positive electrode current collector 2 and the negative electrode current collector 2 in an erroneous arrangement or manner. Accordingly, the battery cell Ps with the appropriately arranged spacer 5 can be assembled.

In the battery cell Ps according to this embodiment, if the current collector 2 and the coupler 50 cannot be coupled to each other, only rotation of the spacer 5 by 180 degrees with respect to the virtual axis extending in the third direction allows the fitting portion 23 of the second end portion P2 of the first connecting portion 20 of the current collector 2 and the side portion 54 of the coupler 50 to be fitted to each other. Accordingly, when the battery cell Ps having the above configuration is assembled, the appropriateness of the arrangement of the spacer 5 is verified and, when the spacer 5 is erroneously arranged, the arrangement can be corrected quickly and simply.

Furthermore, in the battery cell Ps according to this embodiment, when the second end portion P2 of the first connecting portion 20 of the current collector 2 is coupled to the coupler 50, the divided center portion 24 of the second end portion P2 of the first connecting portion 20 intervenes between the main wall portion 52 and the external wall 53 while the side portion 54 and the fitting portion 23 are held in fitting engagement with each other. This prevents or reduces movement of the positive electrode first connecting portion 20 of the positive electrode current collector 2 and the negative electrode first connecting portion 20 of the negative electrode current collector 2 toward the outside. Accordingly, the battery cell Ps allows the spacer 5 to be coupled to the positive electrode current collector 2 and the negative electrode current collector 2.

Each of the positive electrode coupler 50 and the negative electrode coupler 50 includes the two side portions 54 and 54 disposed with a distance therebetween in the second direction. Accordingly, two fitting portions 23 and 23 corresponding to the arrangement of the two side portions 54 and 54 are formed also at the second end portions P2 and P2 of the first connecting portions 20 and 20 of the positive electrode current collector 2 and the negative electrode current collector 2 in an analogous manner. Accordingly, while the second end portion P2 of the positive electrode first connecting portion 20 is kept coupled to the positive electrode coupler 50, the region (divided center portion 24) between the two fitting portions 23 and 23 at the second end portion P2 of the positive electrode first connecting portion 20 is surrounded by the two side portions 54 and 54, the main wall portion 52 and the external wall 53 of the positive electrode coupler 50. While the second end portion P2 of the negative electrode first connecting portion 20 is kept coupled to the negative electrode coupler 50, the region (divided center portion 24) between the two fitting portions 23 and 23 at the second end portion P2 of the negative electrode first connecting portion 20 is surrounded by the two side portions 54 and 54, the main wall portion 52 and the external wall 53 of the negative electrode coupler 50. This securely achieves coupling between the positive electrode current collector 2 and the positive electrode coupler 50, and coupling between the negative electrode current collector 2 and the negative electrode coupler 50.

The present invention is not limited to the fourth embodiment. Instead, it is a matter of course that the present invention can be appropriately modified within a scope without departing from the gist of the present invention.

For instance, in the fourth embodiment, the arrangement of the side portion 54 of the positive electrode coupler 50 and the side portion 54 of the negative electrode coupler 50, which are rotationally asymmetric to each other, allows the fitting portion 23 of the positive electrode first connecting portion 20 to be coupled only to the side portion 54 of the positive electrode coupler 50, and allows the fitting portion 23 of the negative electrode first connecting portion 20 to be coupled to the side portion 54 of the negative electrode coupler 50. However, the present invention is not limited thereto. For instance, as with the fourth embodiment, when the thickness of the positive electrode current collector 2 is different from the thickness of the negative electrode current collector 2, in the positive electrode coupler 50 and the negative electrode coupler 50, the distance between the main wall portion 52 and the external wall 53 may be set to correspond to the thickness of the second end portion P2 of the first connecting portion 20 of the current collector 2, and the entirety of the second end portion P2 of the first connecting portion 20 may be inserted into between the main wall portion 52 and the external wall 53. In this configuration, the second end portion P2 of the first connecting portion 20 of the current collector 2 having the small thickness can be inserted into between the main wall portion 52 and the external wall 53 of the coupler 50 for the current collector 2 having the large thickness. However, the second end portion P2 of the first connecting portion 20 of the current collector 2 having the large thickness cannot inserted into between the main wall portion 52 and the external wall 53 of the coupler 50 for the current collector 2 having the small thickness. Accordingly, if the spacer 5 is erroneously arranged, the spacer 5 is not coupled to the positive electrode current collector 2 and the negative electrode current collector 2.

In the fourth embodiment, each of the positive electrode coupler 50 and the negative electrode coupler 50 is provided with the two side portions 54 and 54. However, the present invention is not limited thereto. For instance, in a configuration where each of the positive electrode coupler 50 and the negative electrode coupler 50 is provided with the side portion(s) 54, it is sufficient that at least one side portion 54 for each coupler is provided. The number of the side portions 54 of the positive electrode coupler 50 does not necessarily match with the number of the side portions 54 of the negative electrode coupler 50.

In a configuration where each of the positive electrode coupler 50 and the negative electrode coupler 50 is provided with the side portion(s) 54, it is a matter of course that the number and arrangement of the fitting portion(s) 23 of the positive electrode current collector 2 correspond to the number and arrangement of the side portion(s) 54 of the positive electrode coupler 50, and the number and arrangement of the fitting portion(s) 23 of the negative electrode current collector 2 correspond to the number and arrangement of the side portion(s) 54 of the negative electrode coupler 50. Furthermore, it is a matter of course that the side portion(s) 54 of the positive electrode coupler 50 and the side portion(s) 54 of the negative electrode coupler 50 are arranged rotationally asymmetrically to each other. In the present invention, "rotational asymmetry" is a concept concerning the entirety of the side portion(s) 54 (the arrangement and the number) of each of the positive electrode coupler 50 and the negative electrode coupler 50. For instance, provided that the number of the side portion(s) 54 of the positive electrode coupler 50 is different from the number of the side portion(s) 54 of the negative electrode coupler 50, the above concept is applicable to an arrangement where a certain side portion 54 of any one of the positive electrode coupler 50 and the negative electrode coupler 50 is rotationally asymmetric to a certain or all of the side portions 54 of the other electrode coupler 50, and the remaining side portions 54 and 54 of the positive and negative electrode couplers 50 and 50 are arranged rotationally symmetrically to each other.

In the fourth embodiment, each of the positive electrode coupler 50 and the negative electrode coupler 50 is constituted by the main wall portion 52, the side portion 54 and the external wall 53. However, the present invention is not limited thereto. For instance, each of the positive electrode coupler 50 and the negative electrode coupler 50 may be constituted by the main wall portion 52 and the side portion 54, only. In this configuration, the side portion 54 of the coupler 50 and the fitting portion 23 of the current collector 2 are fitted to each other, thereby enabling the coupler 50 and the current collector 2 to be coupled to each other.

In the fourth embodiment, the side portions 54 and 54 of the positive electrode coupler 50 and the negative electrode coupler 50 are disposed along the third direction. Based on this configuration, the second end portions P2 and P2 of the positive electrode first connecting portion 20 and the negative electrode first connecting portion 20 are provided with the fitting portions 23 and 23, each having a slit-like shape and extending in the third direction. However, the present invention is not limited thereto. For instance, the side portions 54 and 54 of the positive electrode coupler 50 and the negative electrode coupler 50 each may be formed into a protruding shape, and the second end portions P2 and P2 of the positive electrode first connecting portion 20 and the negative electrode first connecting portion 20 are provided with the fitting portions 23 and 23 that have a slit-like or hole-like shape and can be fitted to the side portion 54. Holes or slits may be provided on the second surfaces S2 and S2 of the main wall portions 52 and 52 of the positive electrode coupler 50 and the negative electrode coupler 50, and protrusions may be provided at the respective second end portions P2 and P2 of the positive electrode first connecting portion 20 and the negative electrode first connecting portion 20, to which the holes or the slits of the positive electrode coupler 50 and the negative electrode coupler 50 can be fitted, may be provided. Even with such a configuration, if the arrangement of the protrusion does not match with the hole or the slit, the coupler 50 and the current collector 2 cannot be coupled to each other. Accordingly, the spacer is not erroneously assembled. In such a hole-protrusion fitting configuration, it is preferred that the coupler 50 be not provided with the external wall 53, or the distance between the main wall portion 52 and the external wall 53 be wider than the thickness of the current collector 2 (first connecting portion 20).

In the fourth embodiment, each of the positive electrode coupler 50 and the negative electrode coupler 50 is constituted by the main wall portion 52, the external wall 53 and the pair of side portions 54 and 54, which form the receiving portion 56 penetrating in the third direction. However, the present invention is not limited thereto. For instance, the couplers 50 of the spacer 5 each may include a closure portion that closes the receiving portion 56 at the bottom portion 34 of the case body 30, in addition to the main wall portion 52, the external wall 53 and the pair of side portions 54 and 54. That is, the receiving portion 56 may be a non-through hole.

Fifth Embodiment

Figure 43:
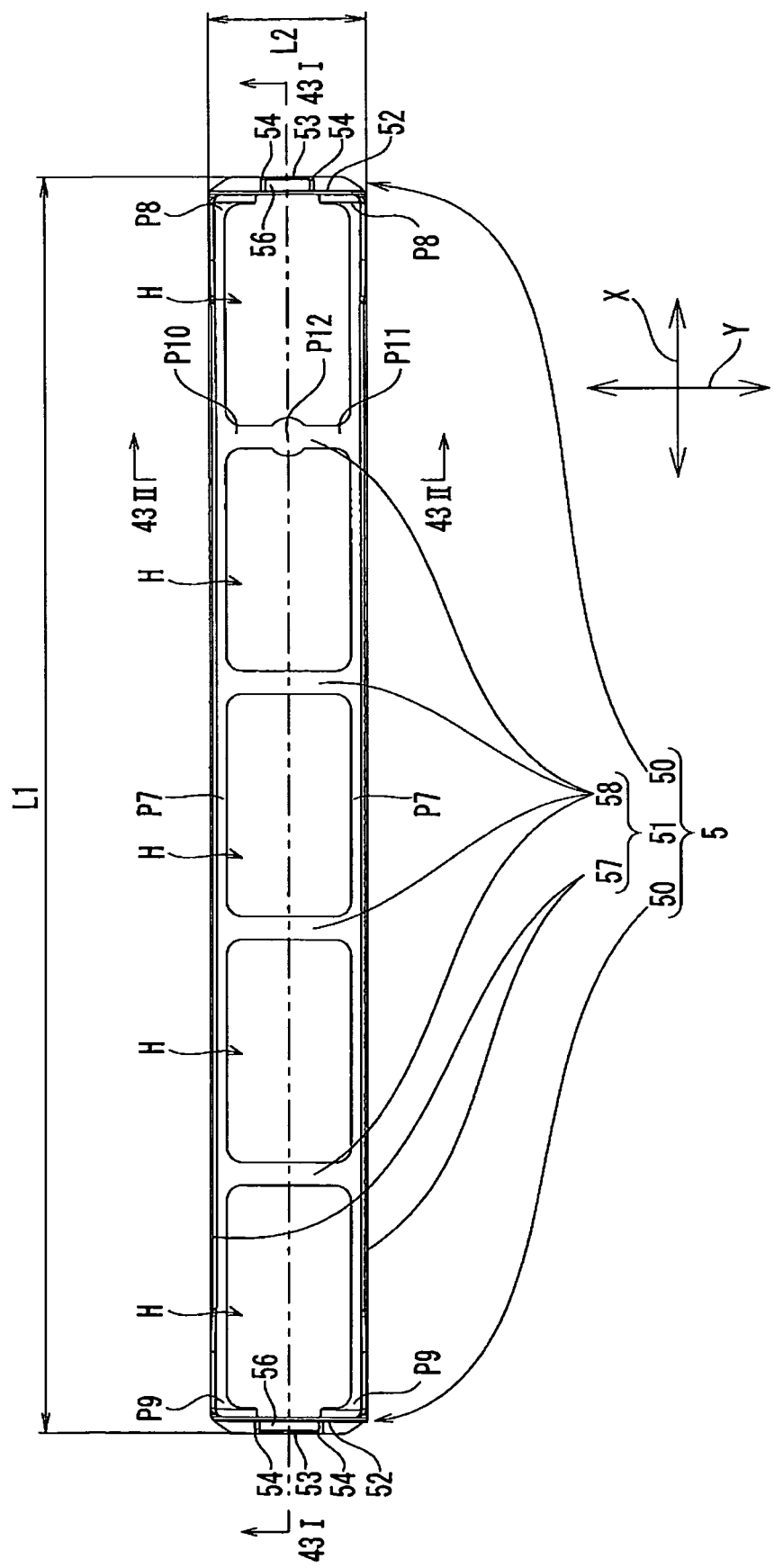
FIG. 43 is a plan view of a spacer of a battery cell according to a fifth embodiment.
Figure 44:
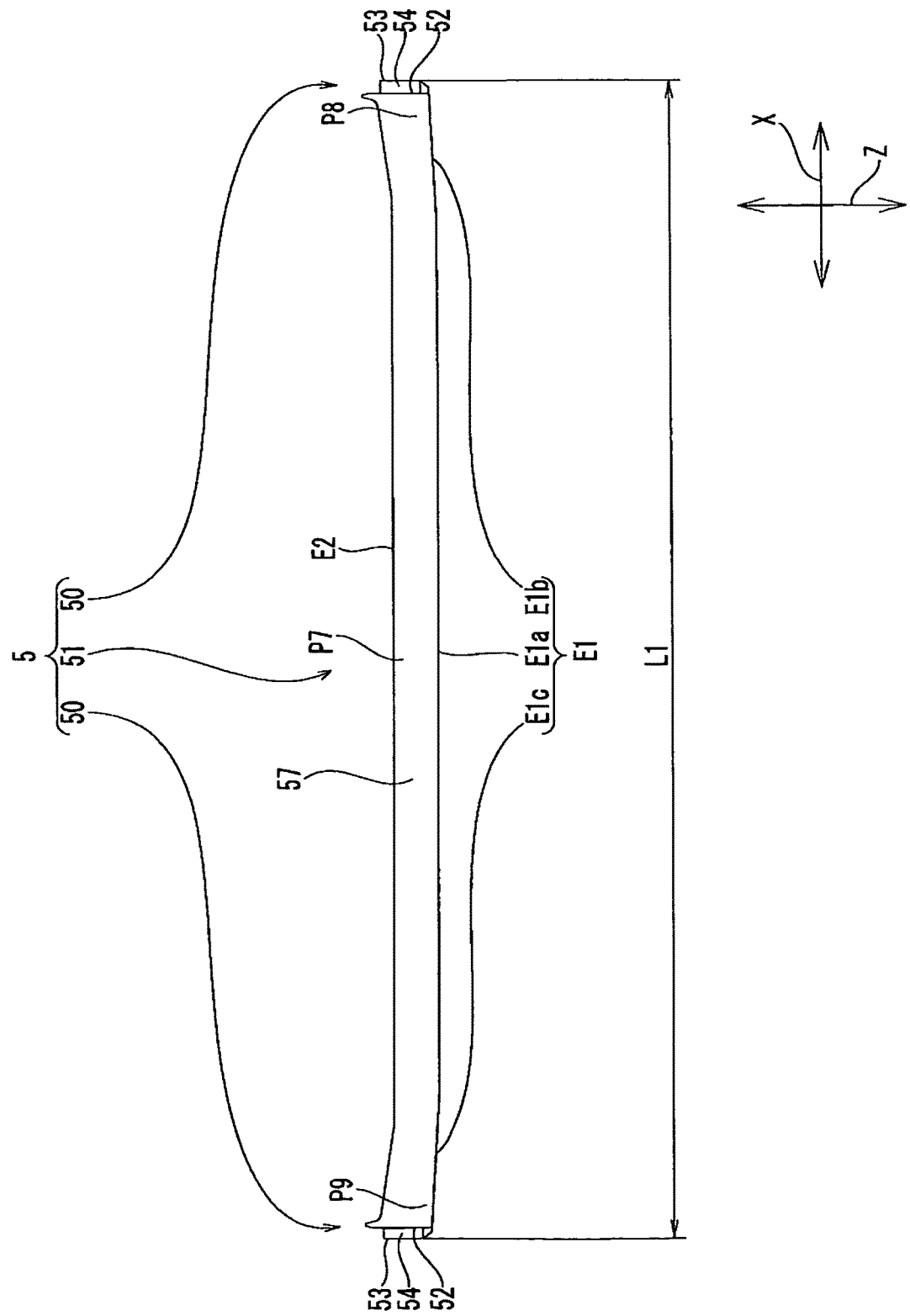
FIG. 44 is a front view of the spacer.
Figure 45:
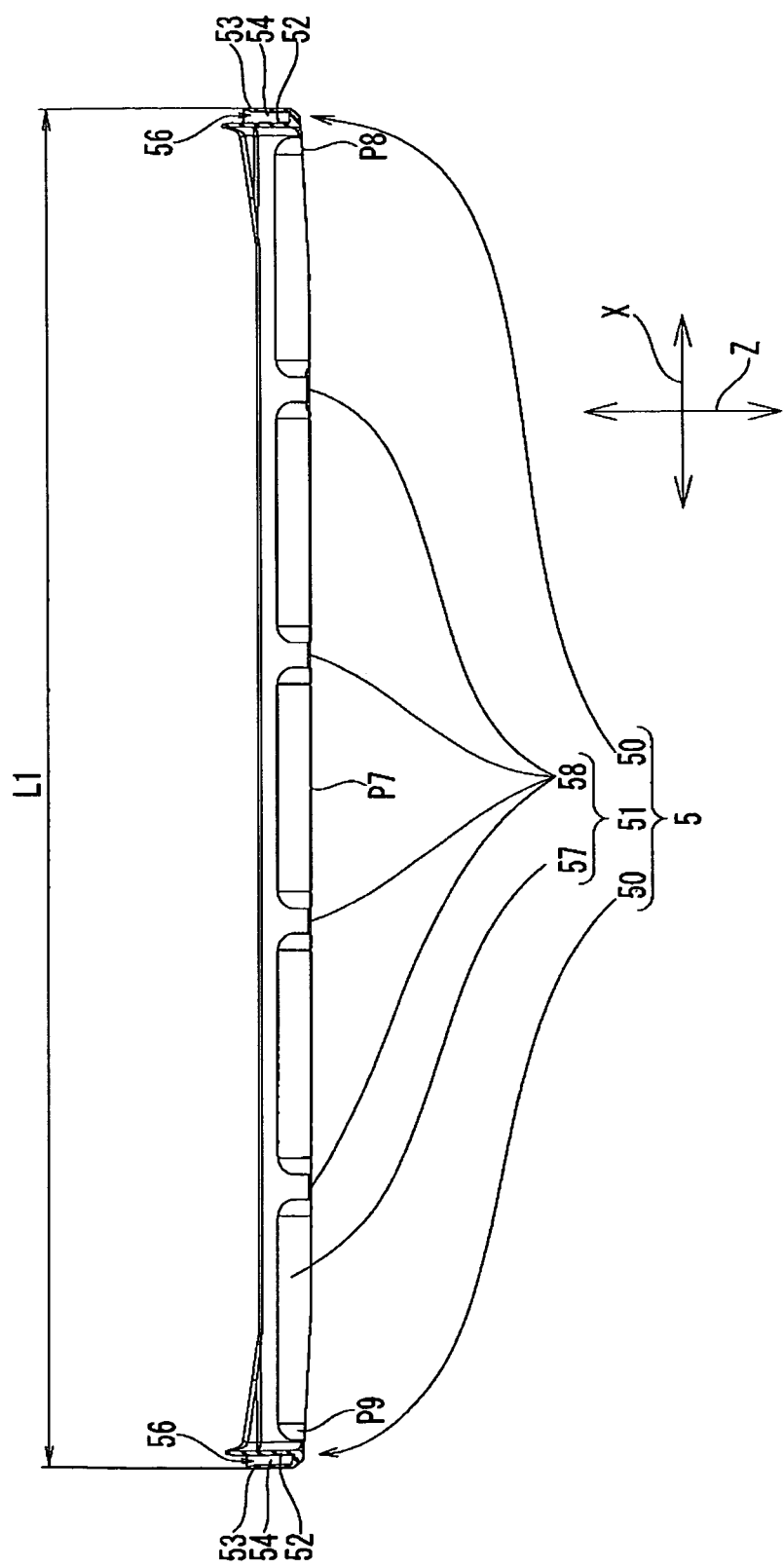
FIG. 45 is a sectional view of FIG. 43 taken along 43I-43I.

A spacer 5 is a plastic molded product having electrically insulating properties. As shown in FIGS. 43 to 45, the spacer 5 includes: a pair of couplers 50 and 50 each of which is connected to the second end portion P2 of the first connecting portion 20 of a corresponding one of the pair of current collectors 2 and 2; and a bridge portion 51 that extends in the first direction and connects the pair of couplers 50 and 50 to each other.

The total length of the spacer 5 (the length in the first direction) L1 is set shorter than the distance between the first walls 32 and 32 of the case body 30. The total width of the spacer 5 (the width in the second direction) L2 is set shorter than the distance between the second walls 33 and 33 of the case body 30.

As shown in FIGS. 43 to 45, one coupler (hereinafter, referred to as a positive electrode coupler) 50 includes: a main wall portion 52 connected to the bridge portion 51; an external wall 53 facing the main wall portion 52 with a distance in the first direction at the outside in the first direction; and the pair of side portions 54 and 54 that are disposed with a distance therebetween in the second direction and connect the main wall portion 52 and the external wall 53 to each other. The two side portions 54 and 54 correspond to the arrangement of the two notches 23 and 23 provided at the second end portion P2 of the positive electrode first connecting portion 20. The side portions 54 and 54 are formed so as to allow the notches 23 and 23 to be fitted from one side in the third direction. In the positive electrode coupler 50, the main wall portion 52, the external wall 53 and the two side portions 54 and 54 form a receiving portion 56 into which the second end portion P2 (divided center portion 24) of the first connecting portion 20 of the positive electrode current collector 2 can be inserted.

The other coupler (hereinafter, referred to as a negative electrode coupler) 50 is formed into a shape identical to that of the positive electrode coupler 50. Accordingly, the description on the positive electrode coupler 50 can serve as description on the negative electrode coupler 50 by means of changing "positive electrode" in the sentences into "negative electrode". The description on the positive electrode coupler 50 thus serves as description on the negative electrode coupler 50.

The bridge portion 51 extends in the first direction. Along therewith, the bridge portion 51 includes a first end portion P8; a second end portion P9 on the opposite side of the first end portion P8, a central portion P7 between the first end portion P8 and the second end portion P9, in the first direction. The bridge portion 51 is formed such that the central portion P7 in the first direction is displaced to one side in the third direction with respect to the first end portion P8 and the second end portion P9.

The bridge portion 51 includes: a pair of beam portions 57 and 57 disposed with a distance therebetween; and at least one beam connecting portion 58 connecting the pair of beam portions 57 and 57 to each other.

The pair of beam portions 57 and 57 are disposed with a distance therebetween in the second direction. Each beam portion 57 includes a first end portion, a second end portion on the opposite side of the first end portion, and an intermediate portion between the first end portion and the second end portion, in the first direction. The first end portion of the beam portion 57 is the first end portion P8 of the bridge portion 51. The second end portion of the beam portion 57 is the second end portion P9 of the bridge portion 51. The central portion of the beam portion 57 is the central portion P7 of the bridge portion 51. The first end portion P8 of the beam portion 57 is connected to the positive electrode coupler 50. The second end portion P9 of the beam portion 57 is connected to the negative electrode coupler 50.

The length of the beam portion 57 in the third direction is set shorter than the length of the beam portion 57 in the first direction. The beam portion 57 is formed to have a thin wall in the second direction. The beam portion 57 is formed into a plate shape, which has a longitudinal axis aligned with the first direction and stands in the third direction. This increases the section modulus of the beam portion 57, and increases the bending strength thereof in the third direction.

The beam portion 57 includes: a first edge E1 that extends in the first direction and disposed on the side of the bottom portion 34 of the case 3; and a second edge E2 that extends in the first direction and disposed on the opposite side of the first edge E1, in the third direction. The first edge E1 includes: a straight portion E1a including the central portion P7; a first inclined portion E1b that extends from the straight portion E1a to the first end portion P8; and a second inclined portion E1c that extends from the straight portion E1a to the second end portion P9. The first inclined portion E1b is inclined to the second edge E2, as approaching the first end portion P8. The second inclined portion E1c is inclined to the second edge E2, as approaching the second end portion P9. Accordingly, with the spacer 5 housed in the case 3, the straight portion E1a of the beam portion 57 is disposed in contact with the bottom portion 34 while the first inclined portion E1b and the second inclined portion E1c are disposed apart from the bottom portion 34. Along therewith, the couplers 50 and 50 are held apart from the bottom portion 34.

Figure 46:
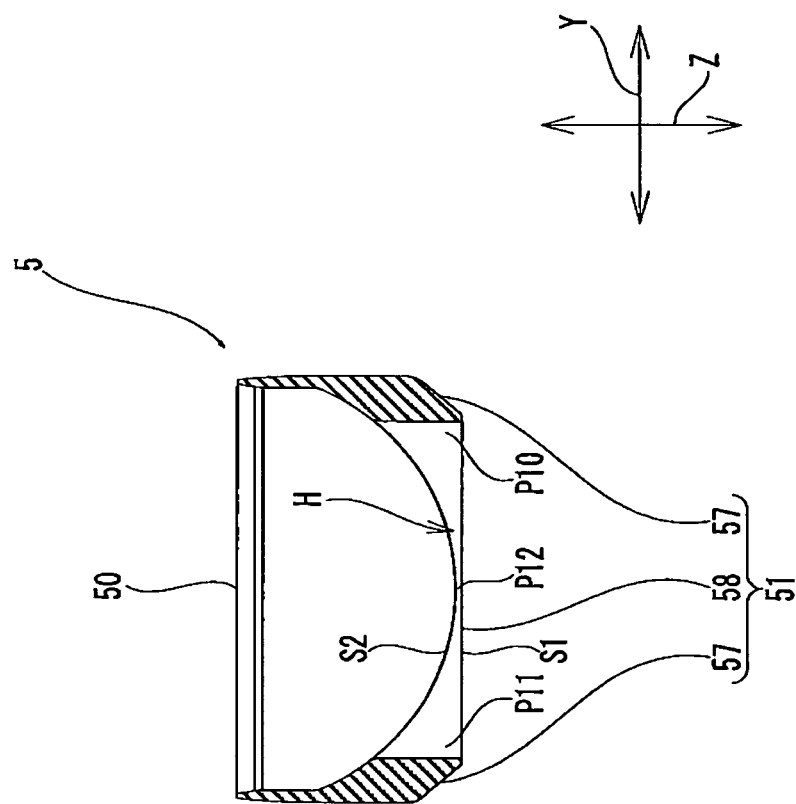
FIG. 46 is a sectional view of FIG. 43 taken along 43II-43II.
Figure 47:
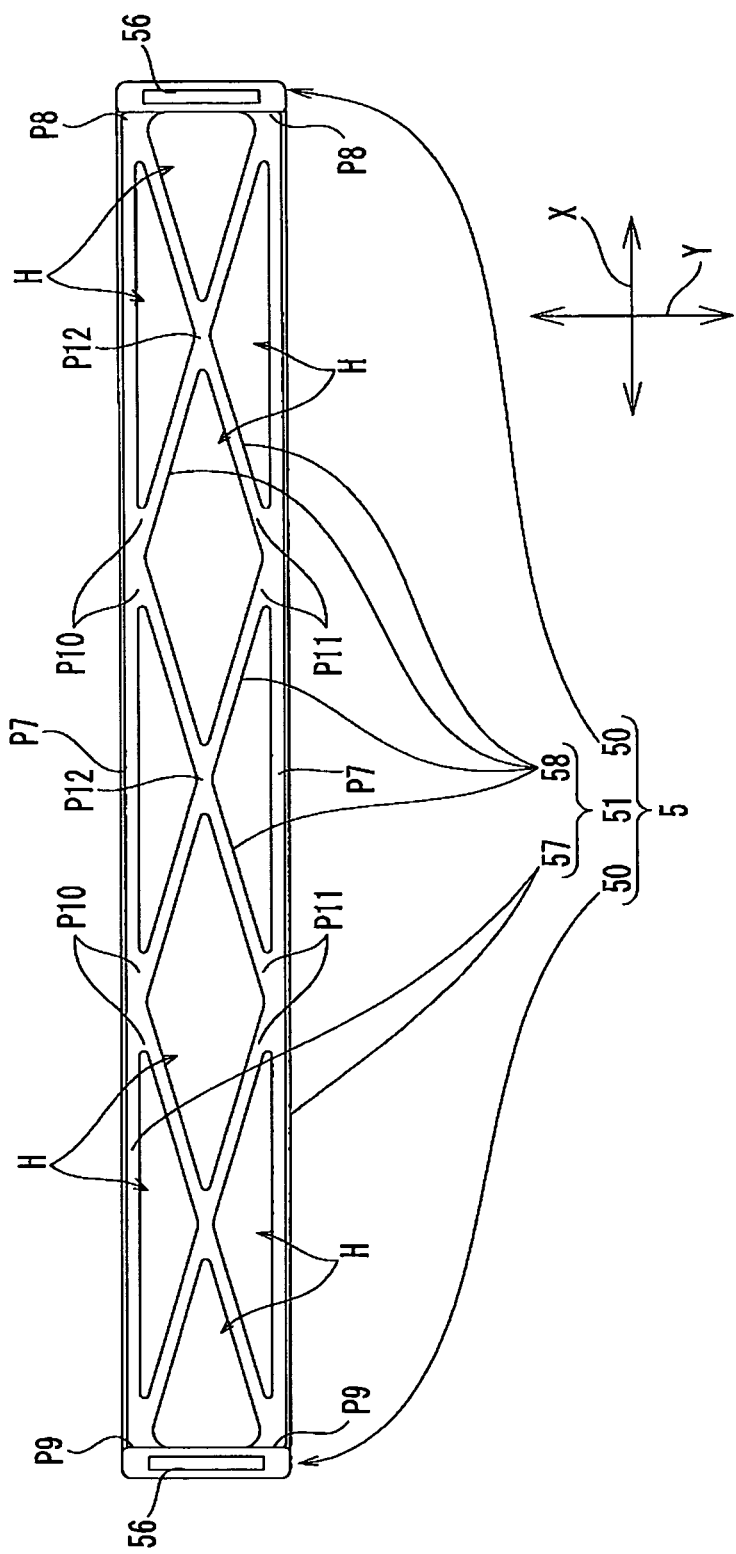
FIG. 47 is a plan view of a spacer according to another example.

The plurality of beam connecting portions 58, . . . are provided and disposed at intervals in the first direction. This forms an opening portion H penetrating in the third direction. The beam connecting portion 58 extends in the second direction. Along therewith, the beam connecting portion 58 includes: a first end portion P10 in the second direction; a second end portion P11 on the opposite side of the first end portion P10; and a central portion P12 between the first end portion P10 and the second end portion P11. As shown in FIG. 46, the beam connecting portion 58 includes a first surface S1 facing the bottom portion 34 of the case 3, and a second surface S2 on the opposite side of the first surface S1, in the third direction. The second surface S2 of the beam connecting portion 58 has a concave circular arc shape in conformity with the peripheral shape of the circular arc portion 17 of the electrode assembly 1. Accordingly, while connecting the first connecting portions 20 and 20 of the pair of current collectors 2 and 2 to each other, the spacer 5 can avoid interference with the one circular arc portion 17 of each of the pair of current collectors 2 and 2.

As described above, in the battery cell Ps according to this embodiment, the second end portion P2 of the positive electrode first connecting portion 20 of the positive electrode current collector 2 and the second end portion P2 of the negative electrode first connecting portion 20 of the negative electrode current collector 2 are brought into the state of being connected in the case 3 via the spacer 5. Along therewith, the positive electrode first connecting portion 20 constraints the negative electrode first connecting portion 20 via the spacer 5, and the negative electrode first connecting portion 20 constrains the positive electrode first connecting portion 20 via the spacer 5. This prevents or reduces swaying or movement of the positive electrode current collector 2 and the negative electrode current collector 2. Furthermore, this also prevents or reduces swaying or movement of the electrode assembly 1 connected to the positive electrode current collector 2 and the negative electrode current collector 2, of which swaying or movement is prevented or reduced.

Accordingly, even when vibrations are applied from the outside to the battery cell Ps, the relative arrangement between the positive electrode current collector 2 and the electrode assembly 1 and the relative arrangement between the negative electrode current collector 2 and the electrode assembly 1 are kept constant or substantially constant. As a result, in the positive electrode current collector 2 and the negative electrode current collector 2, bending actions hardly occur at the second connecting portion 21 fixed to the cover plate 31 and in proximity to the boundary between the second connecting portion 21 and the first connecting portion 20. Furthermore, the connecting portion between the electrode assembly 1 and the first connecting portion 20 of the current collector 2 is hardly twisted. This prevents the positive electrode current collector 2, the negative electrode current collector 2 and the electrode assembly 1 from being broken, even when the battery cell Ps is used in a vibrating environment.

As described above, the battery cell Ps according to this embodiment can exert an excellent effect capable of securely preventing breakage of the current collector 2 and the electrode assembly 1 due to vibrations.

The opening portion H penetrating in the third direction is formed between the pair of beam portions 57 and 57 of the bridge portion 51, which reduces the overall weight of the spacer 5. This prevents the current collectors 2 and the electrode assembly 1 from being broken without increase in overall weight of the battery cell Ps.

The connection of the beam portions 57 and 57 by the beam connecting portion 58 increases the rigidity of the bridge portion 51, thereby preventing the bridge portion 51 from being deformed. In particular, the beam portions 57 and 57 are connected by the plurality of beam connecting portions 58, . . . , which further increases the rigidity of the bridge portion 51, thereby securely preventing the bridge portion 51 from being deformed. Accordingly, the first connecting portion 20 of the current collector 2 is securely constrained. This can more securely prevent the current collector 2 and the electrode assembly 1 from being broken.

The present invention is not limited to the fifth embodiment. Instead, it is a matter of course that the present invention can be appropriately modified within a scope without departing from the gist of the present invention.

For instance, in the fifth embodiment, the plurality of beam connecting portions 58, . . . are provided. However, the present invention is not limited thereto. For instance, only one beam connecting portion 58 may be adopted.

In the fifth embodiment, the beam connecting portion 58 extends straightly in the second direction. However, the present invention is not limited thereto. For instance, as shown in FIG. 17, the beam connecting portion 58 may extend in a direction inclined to the beam portion 57. In this case, the beam connecting portion 58 may be any of directions forming acute and obtuse angles to the beam portion 57. In a configuration where the plurality of beam connecting portion 58 are provided, the beam connecting portions 58 do not necessarily extend in the same direction. Instead, these beam connecting portions may extend in respective directions different from each other. In this configuration, the adjacent beam connecting portions 58 and 58 may intersect with each other. Even with such a configuration, the opening portions H penetrating in the third direction are formed so as to sandwich the beam connecting portions 58, thereby reducing the weight of the spacer 5. As a result, the overall weight of the battery cell (electric storage device) is reduced.

Figure 48:
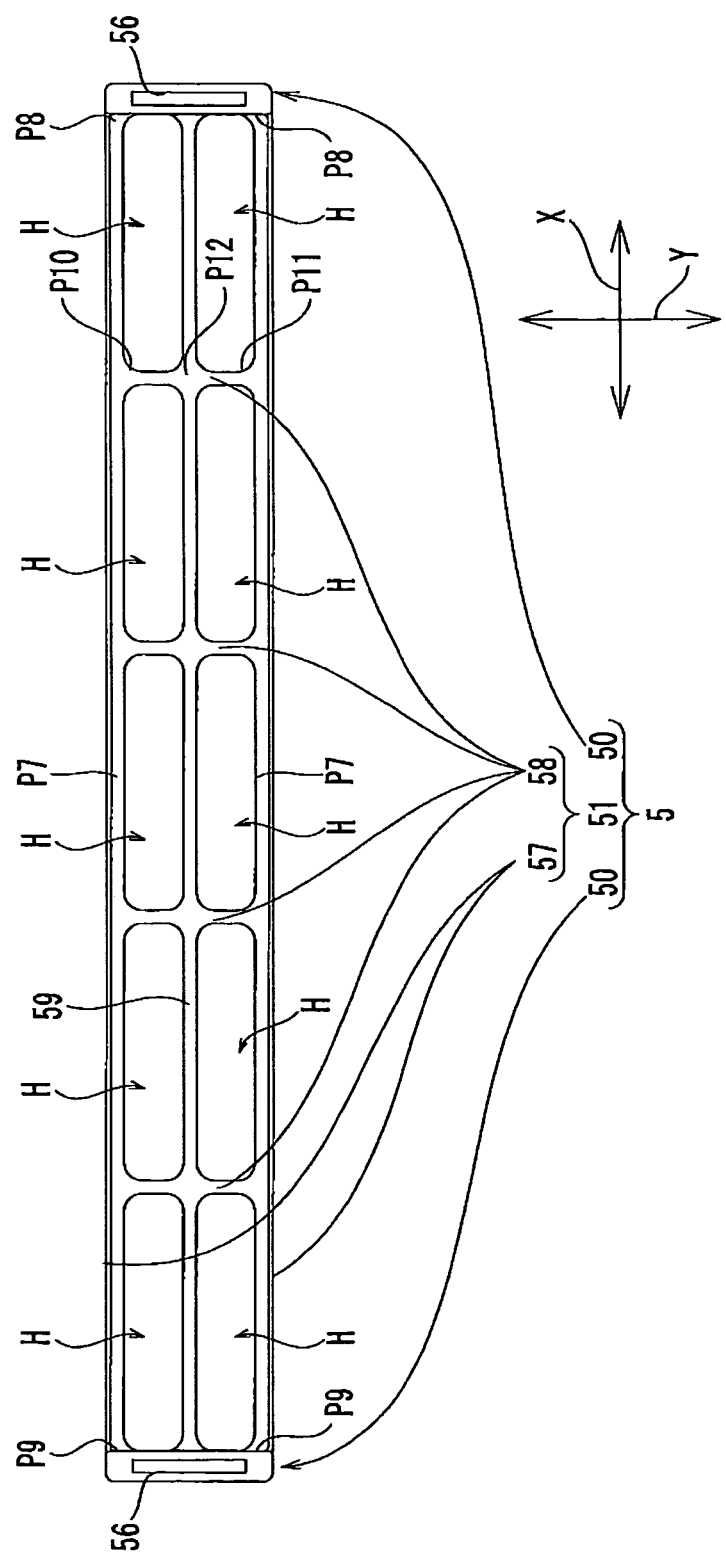
FIG. 48 is a plan view of a spacer according to still another example.

In the fifth embodiment, the beam connecting portions 58 are connected only to the beam portions 57, and disposed parallel or substantially parallel to each other. However, the present invention is not limited thereto. For instance, in a configuration where the plurality of beam connecting portions 58, . . . are provided, as shown in FIG. 48, an auxiliary beam portion 59 extending between the pair of beam portions 57 and 57 in the first direction may be provided. The plurality beam connecting portions 58, . . . are connected to each other via the auxiliary beam portion 59. Provided that the beam connecting portion 58 connects the pair of beam portions 57 and 57 while at the same time the opening portions H penetrating in the third direction are formed on both side of the beam connecting portion 58, the beam connecting portion 58 may be subjected to various modifications.

Sixth Embodiment

Figure 49:
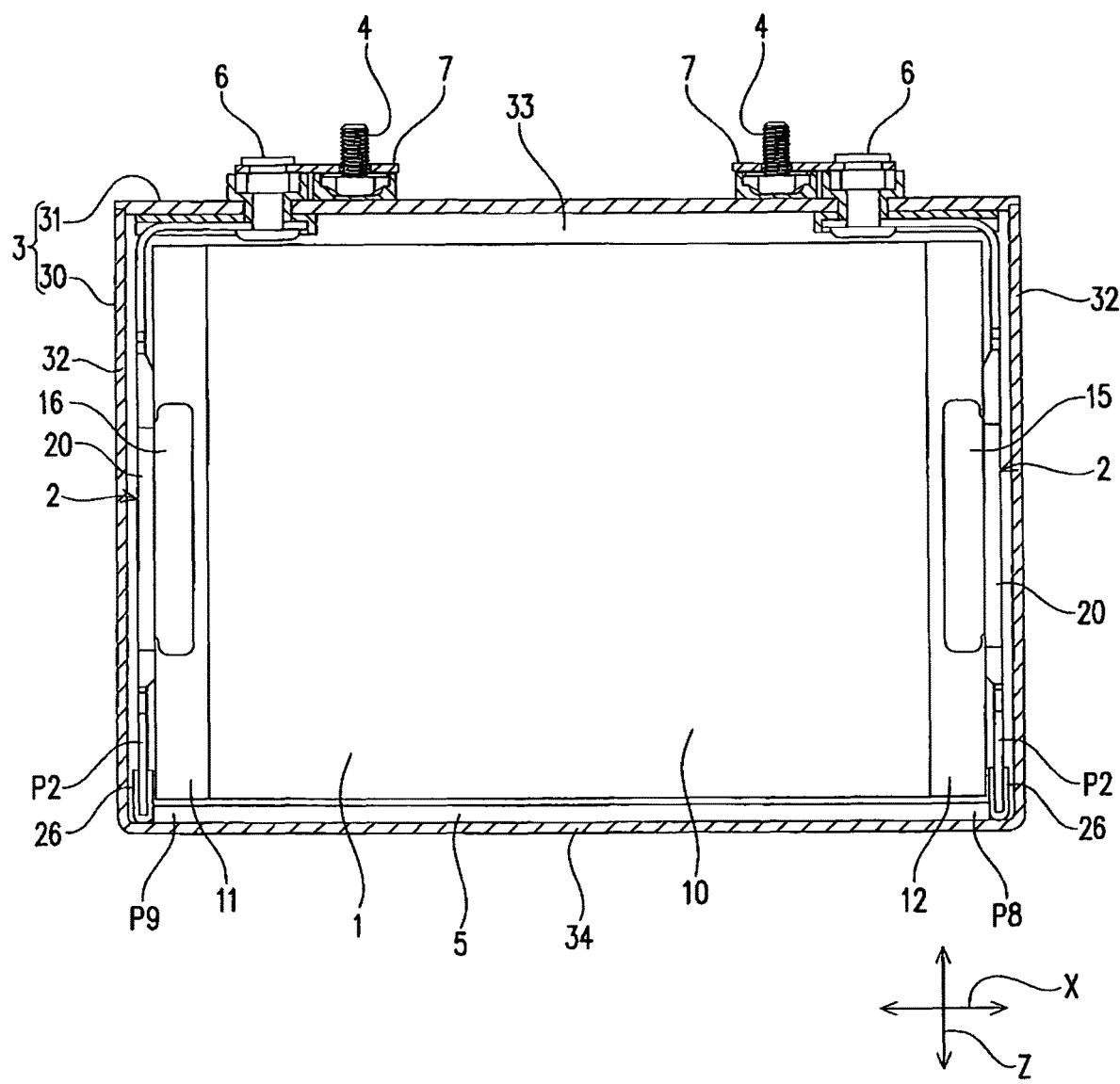
FIG. 49 is a sectional view of a battery cell according to a sixth embodiment.

A battery cell Ps according to the sixth embodiment has a basic configuration identical to each of the embodiments. The different feature or matter of the battery cell Ps according to the sixth embodiment is the configuration of the spacer 5. As shown in FIG. 49, a spacer 5 is different from that of each of the embodiments in that it does not include the pair of couplers 50 and 50. Thus, the spacer 5 does not connect the pair of current collectors 2 and 2. The spacer 5 is disposed between the second end portions P2 and P2 of the first connecting portions 20 and 20 of the pair of current collectors 2 and 2, and for instance, is a plate made of resin. Accordingly, the first end portion P8 of the spacer 5 in the longitudinal direction is disposed in contact with or close to the inner surface of the second end portion P2 of the positive electrode current collector 2. The second end portion P9 of the spacer 5 in the longitudinal direction is disposed in contact with or close to the inner surface of the second end portion P2 of the negative electrode current collector 2.

More specifically, the second end portion P2 of each of the pair of current collectors 2 and 2 is disposed close to the wall of the case body 30. In order to insulate the current collector 2 and the case body 30 from each other, an insulating cover layer 26 is formed on the surface of the second end portion P2. For instance, the cover layer 26 is a cap made of resin. Accordingly, each end portion of the spacer 5 is disposed in contact with or close to the cover layer 26 of the second end portion P2. In a configuration where the current collector 2 and the case body 30 are not required to be insulated from each other, the cover layer 26 is unnecessary.

Thus, in the battery cell Ps according to this embodiment, the distance retaining member for retaining the distance between the first connecting portions 20 and 20 of the pair of current collectors 2 and 2 constant or substantially constant, or, more specifically, the distance retaining member for preventing the first connecting portion 20 from being displaced inward, is the spacer 5 that has the first end portion P8 and the second end portion P9, which respectively fix the surfaces of the second end portions P2 and P2 of the first connecting portions 20 and 20, which surfaces facing the opposite current collectors 2. This retains the relative arrangement between the current collector 2 and the electrode assembly 1. Even in a state where the battery cell Ps is installed in a vibrating environment and the current collector 2 and the electrode assembly 1 vibrate (sway), breakage of the current collector 2 and the electrode assembly 1 connected to the current collector 2 due to vibrations can be prevented.

The external surface of the second end portion P2 of the first connecting portion 20 is disposed in contact with or close to the wall (first wall 32) of the case body 30. This also prevents or reduces the first connecting portion 20 from being displaced outward (in the direction apart from the corresponding current collector 2, i.e., the direction in which the electrode assembly 1 is pulled).

Seventh Embodiment

Figure 50:
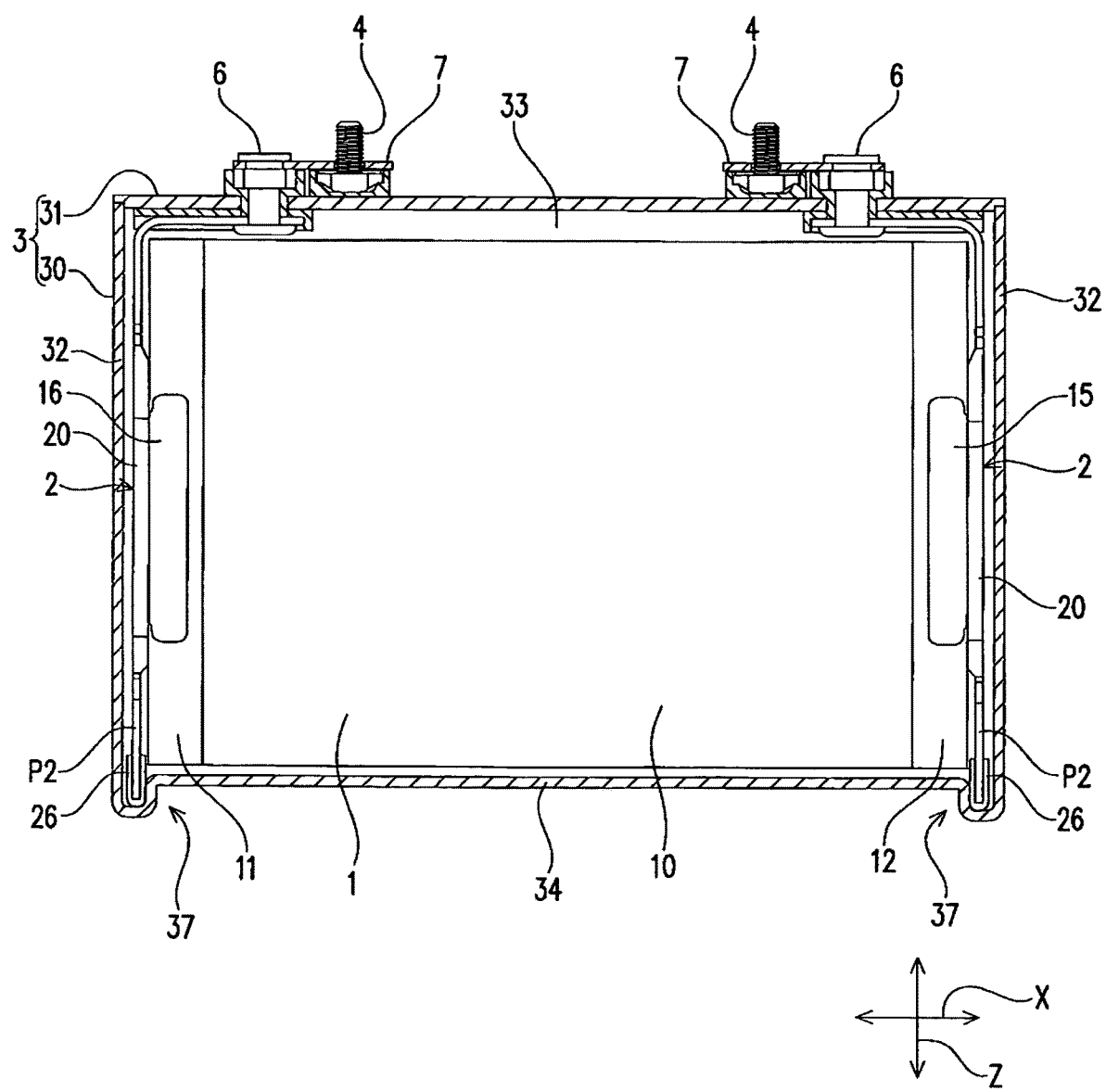
FIG. 50 is a sectional view of a battery cell according to a seventh embodiment.

The battery cell Ps according to the seventh embodiment has a basic configuration identical to each of the embodiments. The different matters or features of the battery cell Ps according to the seventh embodiment lie in that the distance retaining member is not the spacer 5. As shown in FIG. 50, a portion (surface) other than the end portion in the first direction (X-axis in the Figure) in the bottom portion 34 of the case body 30 is offset into the case body 30. Accordingly, the bottom portion 34 of the case body 30 has an inwardly convex shape. Thus, the step portions 37 and 37 are formed at the opposite end portions of the bottom portion 34 of the case body 30. The vertical surface of one step portion 37 is disposed in contact with or close to the inner surface of the second end portion P2 of the positive electrode current collector 2. The vertical surface of the other step portion 37 is disposed in contact with or close to the inner surface of the second end portion P2 of the negative electrode current collector 2.

Thus, in the battery cell Ps according to this embodiment, the distance retaining member for preventing the first connecting portion 20 from being displaced inward is the step portions 37 and 37 formed at the bottom portion 34 of the case body 30. This retains the relative arrangement between the current collector 2 and the electrode assembly 1. Even in a state where the battery cell Ps is installed in a vibrating environment and the current collector 2 and the electrode assembly 1 vibrate (sway), breakage of the current collectors 2 and the electrode assembly 1 connected to the current collector 2 due to vibrations can be prevented.

The external surface of the second end portion P2 of the first connecting portion 20 is disposed in contact with or close to the wall (first wall 32) of the case body 30. This also prevents or reduces the first connecting portion 20 from being displaced to the outside (in the direction apart from the corresponding current collector 2, i.e., the direction in which the electrode assembly 1 is pulled).

Figure 51:
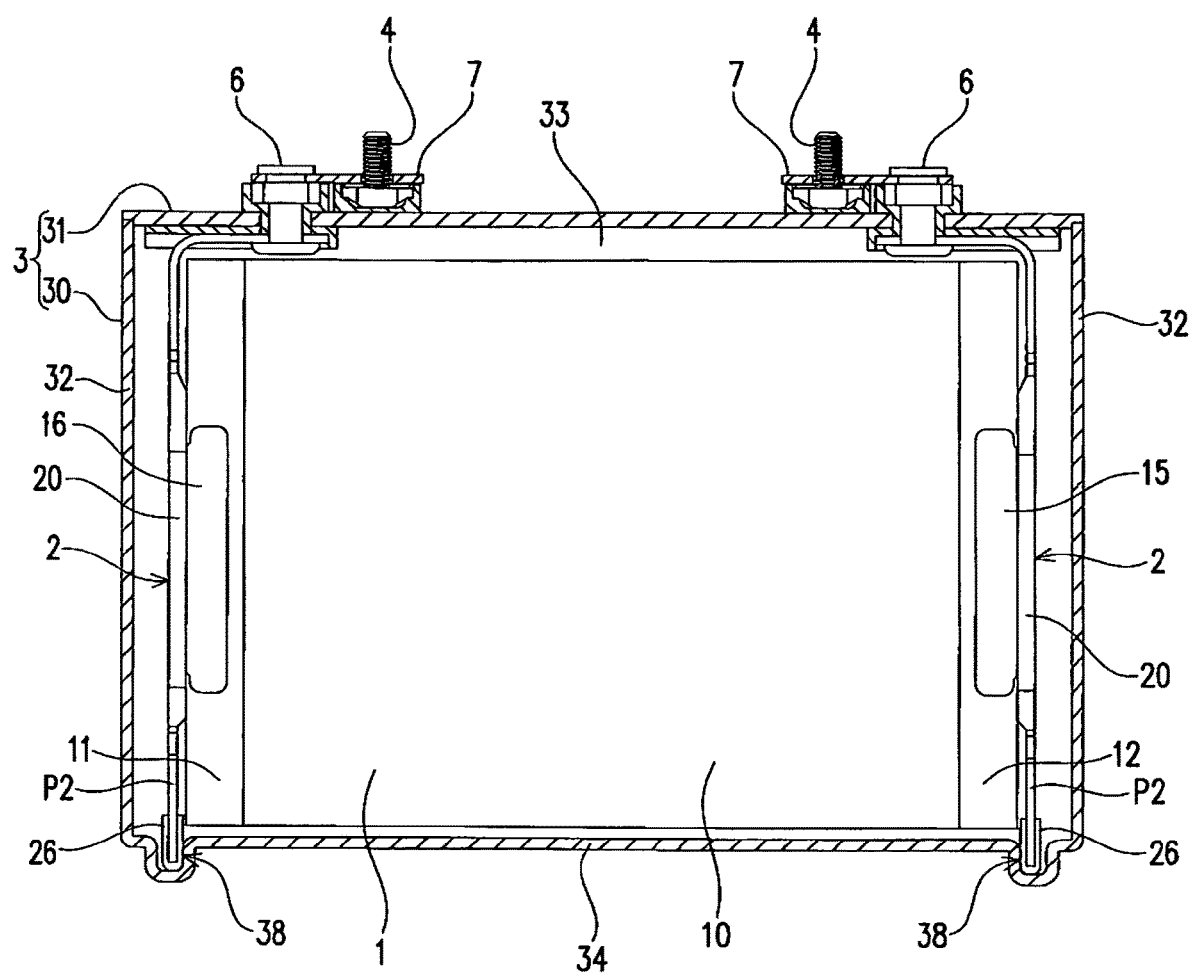
FIG. 51 is a sectional view of a battery cell according to another example.

As shown in FIG. 51, the end portion of the bottom portion 34 of the case body 30 in the first direction (the X-axis direction in the Figure) is offset to the outside the case body 30. This provides the recesses 38 and 38, which are the step portions, at the opposite end portions of the bottom portion 34 of the case body 30. The second end portion P2 of the current collector 2 is inserted into the recess 38. Accordingly, the inner vertical surface of one recess 38 is disposed in contact or close to the inner surface of the second end portion P2 of the positive electrode current collector 2. The inner vertical surface of the other recess 38 is disposed in contact with or close to the inner surface of the second end portion P2 of the negative electrode current collector 2.

Thus, in the battery cell Ps according to this embodiment, the distance retaining member for preventing the first connecting portion 20 from being displaced inward is the recesses 38 and 38 formed in the bottom portion 34 of the case body 30. This retains relative arrangement between the current collector 2 and the electrode assembly 1. Even in a state where the battery cell Ps is installed in a vibrating environment and the current collector 2 and the electrode assembly 1 vibrate (sway), breakage of the current collectors 2 and the electrode assembly 1 connected to the current collectors 2 due to vibrations can be prevented.

The external surface of the second end portion P2 of the first connecting portion 20 is disposed in contact or close to the external vertical surface of the recess 38. This also prevents or reduces the first connecting portion 20 from being displaced to the outside (in the direction apart from the opposite current collector 2, i.e., the direction in which the electrode assembly 1 is pulled).

Eighth Embodiment

Figure 52:
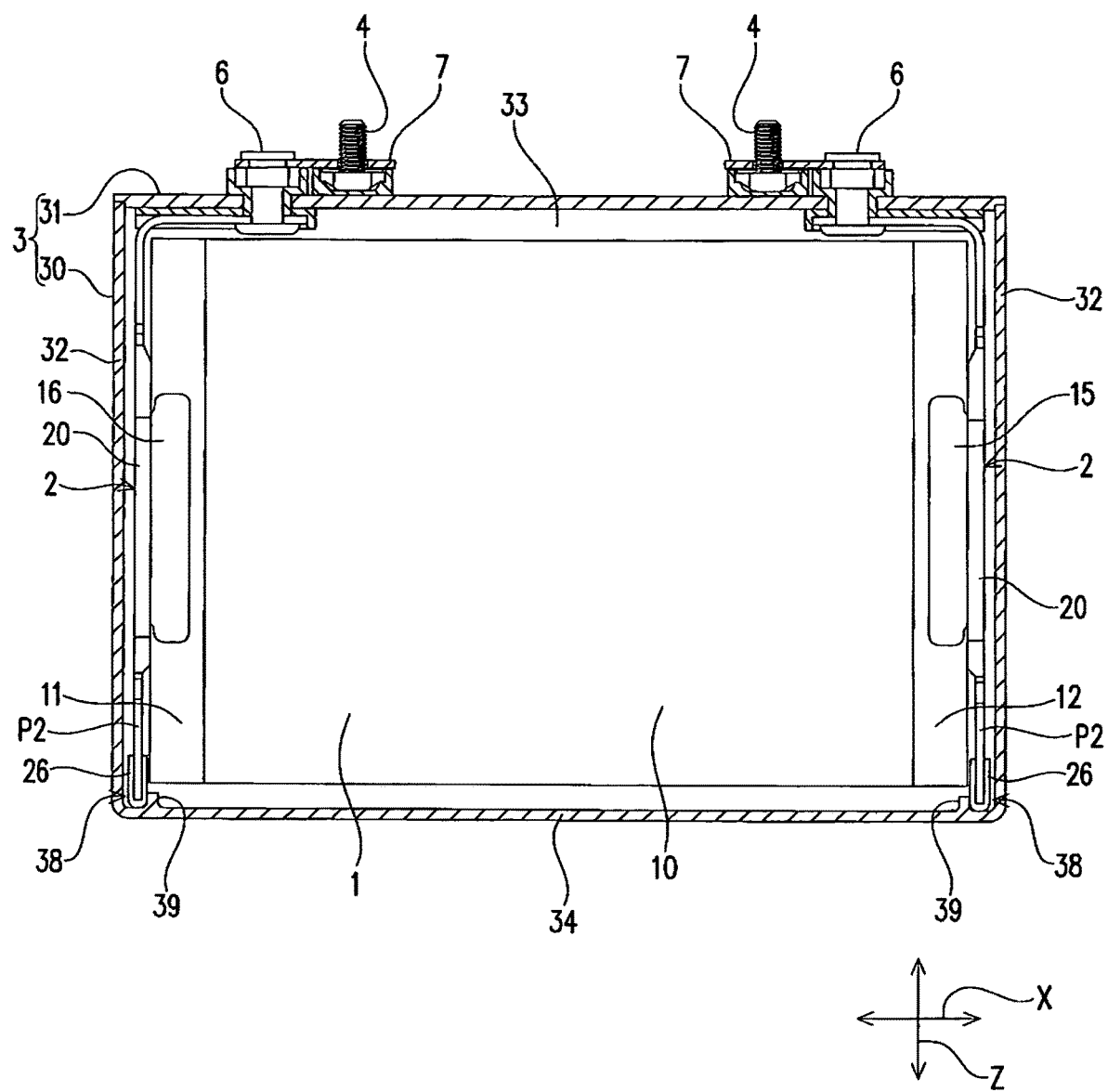
FIG. 52 is a sectional view of a battery cell according to an eighth embodiment.

As shown in FIG. 52, ribs 39 are formed at the end portions of the bottom portion 34 of the case body 30 in the first direction (the X-axis direction in the Figure). This provides recesses 38 and 38, which are step portions, at the respective opposite end portions of the bottom portion 34 of the case body 30. One rib 9 may be formed in a manner integral with the bottom portion 34, or a separate member to be additionally provided at the bottom portion 34. The second end portion P2 of the current collector 2 is inserted into between the first wall 32 and the rib 39 of the case body 30. Accordingly, one rib 39 is disposed in contact or close to the inner surface of the second end portion P2 of the positive electrode current collector 2. The other rib 39 is disposed in contact with or close to the inner surface of the second end portion P2 of the negative electrode current collector 2.

Thus, in the battery cell Ps according to this embodiment, the distance retaining member for preventing the first connecting portion 20 from being displaced inward is the recesses 38 and 38 formed in the bottom portion 34 of the case body 30. This retains relative arrangement between the current collector 2 and the electrode assembly 1. Even in a state where the battery cell Ps is installed in a vibrating environment and the current collector 2 and the electrode assembly 1 vibrate (sway), breakage of the current collectors 2 and the electrode assembly 1 connected to the current collectors 2 due to vibrations can be prevented.

The external surface of the second end portion P2 of the first connecting portion 20 is disposed in contact or close to the wall (first wall 32) of the case body. This also prevents or reduces the first connecting portion 20 from being displaced to the outside (in the direction apart from the corresponding current collector 2, i.e., the direction in which the electrode assembly 1 is pulled). Instead, the pair of ribs 39 and 39 may be provided at the respective end portions of the bottom portion 34 of the case body 30, and the recess 38 may be formed between the pair of ribs 39 and 39, thereby allowing the rib 39 disposed at the outer side to prevent or reduce the first connecting portion 20 from being displaced to the outside.

The present invention is not limited to the configurations of the above embodiments. Furthermore, the present invention is not limited to the above working effects. Instead, it is a matter of course that the present invention can be appropriately modified within a scope without departing from the gist of the present invention.

The present invention intends to allow each embodiment to adopt adoptable configurations in the other embodiments. That is, the configuration in each embodiment is applicable among the embodiments.

Each of the embodiments describes the lithium-ion battery cell as an example of the electric storage device. However, the electric storage device is not limited to the lithium-ion battery cell. For instance, the electric storage device may be another battery cell, such as a nickel-hydrogen battery cell, or a capacitor (electric double layer capacitor, etc.).

The invention claimed is:

1. An electric storage device, comprising:
   an electrode assembly including a positive electrode plate and a negative electrode plate that are insulated from each other;
   a pair of current collectors, each of which includes a connecting portion and is connected to a corresponding one of the positive electrode plate and the negative electrode plate at the connecting portion;
   a case that houses the electrode assembly and the pair of current collectors, the electrode assembly being supported by the pair of current collectors in the case;
   a cover plate which covers a top surface of the case, the cover plate extending above an upper surface of the electrode assembly; and
   a distance retaining member that retains a distance between portions more distal than respective connecting portions of the pair of current collectors,
   wherein each connecting portion includes an outer face that faces an inner surface of the case and an inner face that faces the electrode assembly,
   wherein the distance retaining member comprises a spacer that connects the pair of current collectors in the case while supporting inner faces of the current collectors,
   wherein the spacer includes:
      a first coupler including a first support face that faces the inner surface of the case and abuts the inner face of the current collector of one of the pair of current collectors, and a second support face that faces the electrode assembly and abuts an outer face of the current collector of said one of the pair of current collectors;
      a second coupler including a third support face that faces the inner surface of the case and abuts the inner face of the current collector of an other of the pair of current collectors, and a fourth support face that faces the electrode assembly and abuts an outer face of the current collector of the other one of the pair of current collectors; and
      a bridge portion connecting the first coupler with the second coupler, a bottom surface of the bridge portion extending below a bottom surface of the electrode assembly,
   wherein the first support face protrudes from the distance retaining member in a perpendicular direction to a longitudinal direction of an extension of the electrode assembly,
   wherein the spacer is electrically insulating, and
   wherein the first support face continuously extends from the bottom surface of the bridge portion.

2. The electric storage device according to claim 1, wherein the spacer is disposed in contact directly or indirectly with the inner surface of the case.

3. The electric storage device according to claim 1, wherein the bridge portion includes:
   a pair of beam portions that connect the couplers and are disposed with a distance from each other; and
   at least one beam connecting portion that connects the pair of beam portions to each other.

4. The electric storage device according to claim 1, wherein the first coupler includes:
   a main wall portion connected to the bridge portion;
   a pair of side portions extending from the main wall portion; and
   an external wall facing the main wall portion with a distance, the external wall connected to the pair of side portions, and
   wherein a predetermined portion of said one of the current collectors is inserted in a space defined by the main wall portion, the pair of side portions, and the external wall.

5. The electric storage device according to claim 1, wherein, in the longitudinal direction of the extension of the electrode assembly, the inner face of the current collector of said one of the pair of current collectors and the outer face of the current collector of said one of the pair of current collectors are located on opposing sides of the current collector of said one of the pair of current collectors, and
   wherein, in the longitudinal direction of the extension of the electrode assembly, the second support face, the outer face of the current collector of said one of the pair of current collectors, the inner face of the current collector of said one of the pair of current collectors, and the first support face are arranged sequentially.

6. The electric storage device according to claim 1, wherein the first coupler is coupled to a predetermined portion of said one of the pair of current collectors, and the second coupler is coupled to a predetermined portion of the other of the pair of current collectors, and
   wherein at least one of the first and second couplers is configured to be coupled only to the predetermined portion of a corresponding one of the pair of current collectors rather than being coupled to each of the pair of current collectors.

7. The electric storage device according to claim 6, wherein a thickness of the other of the pair of current collectors is smaller than a thickness of said one of the pair of current collectors.

8. The electric storage device according to claim 6, wherein said one of the pair of current collectors includes two notches at the predetermined portion of said one of the pair of current collectors, and
   wherein the other of the pair of current collectors includes two notches at the predetermined portion of the other of the pair of current collectors, a distance between the notches of the other of the pair of current collectors is wider than a distance between the notches of said one of the pair of current collectors.

9. The electric storage device according to claim 6, wherein the first coupler and the second coupler are disposed with a distance to a bottom portion of the case.

* * * * *